United States Patent
Volin

(10) Patent No.: US 10,426,234 B1
(45) Date of Patent: Oct. 1, 2019

(54) MULTI-ANGLE MULTI-FUNCTION UMBRELLA

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 16/115,663

(22) Filed: Aug. 29, 2018

(51) Int. Cl.
*A45B 11/00* (2006.01)
*A45B 23/00* (2006.01)
(Continued)

(52) U.S. Cl.
CPC .............. *A45B 11/00* (2013.01); *A45B 17/00* (2013.01); *A45B 23/00* (2013.01); *A45B 25/14* (2013.01); *A45B 25/22* (2013.01); *A45B 25/26* (2013.01); *E03B 3/03* (2013.01); *E04H 15/06* (2013.01); *E04H 15/14* (2013.01); *E04H 15/60* (2013.01); *A45B 2023/0012* (2013.01); *A45B 2023/0018* (2013.01); *A45B 2023/0025* (2013.01); *A45B 2023/0031* (2013.01); *A45B 2023/0037* (2013.01); *A45B 2023/0043* (2013.01);
(Continued)

(58) Field of Classification Search
CPC ......... A45B 25/14; A45B 25/18; A45B 25/22; A45B 25/26; A45B 2025/146; A45B 2025/186; A45B 2023/0012; A45B 2023/0018; A45B 2023/0025; A45B 2023/0031; A45B 2023/0037; A45B 2023/0043; A45B 11/00; A45B 15/00; A45B 25/02; A45B 17/00; A45B 23/00; A45B 2200/1036; E04H 15/06; E04H 12/2238; E04H 12/2261; E04H 15/60

USPC ......... 135/90, 93, 94, 97, 98, 20.1, 20.3, 21, 135/25.1, 25.3, 25.32, 25.4, 16, 74, 29, 135/116; 248/514, 519, 523, 346.01, 910
See application file for complete search history.

(56) References Cited

U.S. PATENT DOCUMENTS

| 96,777 | A | * | 11/1869 | Clyde | .................... | A45B 23/00 |
| | | | | | | 135/20.1 |
| 473,649 | A | * | 4/1892 | Whitcomb | ............. | A45B 19/10 |
| | | | | | | 135/25.32 |

(Continued)

FOREIGN PATENT DOCUMENTS

| DE | 202015105277 U1 * 12/2015 | | |
| DE | 202018000481 U1 * 3/2018 | ............. | A45B 23/00 |

(Continued)

*Primary Examiner* — Robert Canfield

(57) ABSTRACT

A multi-angle multi-function umbrella comprises: a first foot, a second foot, a mounting plate bolted to the first and second feet, a lower post attached to the mounting plate, an upper post, a middle post, a first inner core inserted into the lower and middle posts, a second inner core inserted into the middle and upper posts, a central tube, a spool, a crank rotatably attached to the spool, a rope threaded through the central tube, central ribs, central arms pivotably attached to the central ribs, an adjustable central canopy attached to the central ribs to adjust to different heights, an intersector slidably attached to the central tube, first ribs pivotably connected to the intersector and central arms, second ribs, third ribs, first coil caps pivotably connected to the first and second ribs, second coil caps pivotably connected to the second and third ribs, raising arms foldably attached to the intersector, an adjustable ring canopy attached to the first and second ribs, and adjusting flaps sewn to the adjustable ring canopy to adjust it to multiple different sizes.

20 Claims, 70 Drawing Sheets

(51) Int. Cl.
*A45B 25/14* (2006.01)
*A45B 25/26* (2006.01)
*E04H 15/60* (2006.01)
*E04H 15/06* (2006.01)
*E04H 15/14* (2006.01)
*E03B 3/03* (2006.01)
*A45B 25/22* (2006.01)
*A45B 17/00* (2006.01)

(52) U.S. Cl.
CPC . *A45B 2023/0068* (2013.01); *A45B 2025/146* (2013.01); *A45B 2200/1036* (2013.01)

(56) References Cited

U.S. PATENT DOCUMENTS

| | | | |
|---|---|---|---|
| 963,634 A * | 7/1910 | Newmeyer | A45B 17/00 135/74 |
| 1,534,820 A * | 4/1925 | Walmsley | A45B 7/005 135/74 |
| 2,149,059 A * | 2/1939 | Leon | A45B 7/005 135/74 |
| 2,530,765 A * | 11/1950 | Greenup | E04H 15/28 135/120.3 |
| 2,533,322 A | 12/1950 | Kober | |
| 2,633,856 A * | 4/1953 | Weaklend | A45B 7/005 135/20.1 |
| 2,649,104 A * | 8/1953 | Militano | A45B 17/00 135/74 |
| 2,759,486 A | 8/1956 | Pesaturo | |
| 2,906,278 A * | 9/1959 | Small | A45B 17/00 135/20.1 |
| 3,434,484 A | 3/1969 | Dilullo | |
| 4,567,907 A | 2/1986 | Dubinsky | |
| 4,750,509 A * | 6/1988 | Kim | E04H 15/36 135/135 |
| 4,832,304 A | 5/1989 | Morgulis | |
| D306,762 S | 3/1990 | Aquino | |
| 4,945,936 A * | 8/1990 | Surrendi | E04H 15/322 135/126 |
| 5,060,907 A * | 10/1991 | Castano | E04H 12/2238 248/514 |
| 5,249,591 A * | 10/1993 | Gamadi | F16M 11/2021 135/120.3 |
| 5,433,233 A | 7/1995 | Shiran | |
| 5,499,644 A * | 3/1996 | Geniele | A45B 17/00 135/20.1 |
| D371,902 S * | 7/1996 | Lee | D3/5 |
| 5,871,024 A | 2/1999 | Vanderminden | |
| 6,443,172 B2 | 9/2002 | Brumfield | |
| 6,497,242 B1 * | 12/2002 | Lin | A45B 19/10 135/25.3 |
| 6,588,037 B1 | 7/2003 | Eno | |
| 6,604,844 B2 * | 8/2003 | Hussey | E04H 15/28 135/147 |
| 6,612,320 B2 * | 9/2003 | Lin | A45B 25/22 135/33.41 |
| 6,732,985 B1 | 5/2004 | Cantrell | |
| 6,736,151 B2 * | 5/2004 | Lin | A45B 25/22 135/22 |
| D518,286 S | 4/2006 | Santos | |
| 7,111,633 B2 | 9/2006 | Moroney | |
| 7,191,996 B2 | 3/2007 | Patsalaridis | |
| 7,207,343 B2 | 4/2007 | Earnshaw | |
| 7,302,745 B2 | 12/2007 | Stahle | |
| 7,540,561 B2 * | 6/2009 | McWhorter | A45B 11/00 135/16 |
| 7,562,667 B2 * | 7/2009 | Li | A45B 3/04 135/21 |
| 8,191,561 B2 | 6/2012 | Brooks, III | |
| 8,807,513 B2 | 8/2014 | Volin | |
| 8,820,340 B2 * | 9/2014 | Hughes | E04H 15/50 135/131 |
| 8,960,210 B2 | 2/2015 | Bacik | |
| 9,220,325 B2 * | 12/2015 | Ma | A45B 17/00 |
| 9,359,785 B2 | 6/2016 | Catt | |
| 9,493,962 B2 | 11/2016 | Eddy | |
| 9,540,840 B2 * | 1/2017 | Ma | F16M 13/00 |
| 9,624,685 B1 | 4/2017 | Cordle | |
| 9,924,768 B1 * | 3/2018 | Rosenberger | A45B 19/04 |
| 9,957,728 B2 * | 5/2018 | Ma | A45B 23/00 |
| 9,974,366 B2 | 5/2018 | Heim | |
| 2002/0129847 A1 * | 9/2002 | Ma | A45B 23/00 135/98 |
| 2002/0174887 A1 * | 11/2002 | Reese | A45B 11/00 135/20.1 |
| 2003/0079765 A1 | 5/2003 | Lin | |
| 2003/0098050 A1 * | 5/2003 | Lee | A45B 25/02 135/33.7 |
| 2003/0140955 A1 * | 7/2003 | Chou | A45B 23/00 135/98 |
| 2004/0035452 A1 | 2/2004 | Ma | |
| 2004/0056169 A1 * | 3/2004 | Harbaugh | E04H 12/2246 248/519 |
| 2004/0177871 A1 * | 9/2004 | Harbaugh | A45B 19/10 135/20.1 |
| 2005/0016571 A1 * | 1/2005 | Wu | A45B 23/00 135/20.1 |
| 2005/0028852 A1 * | 2/2005 | Reese | A45B 23/00 135/20.1 |
| 2006/0081277 A1 * | 4/2006 | Liu | A45B 23/00 135/20.1 |
| 2007/0074751 A1 * | 4/2007 | Fraser | A45B 3/04 135/98 |
| 2008/0053498 A1 * | 3/2008 | Liu | A45B 19/00 135/25.1 |
| 2010/0051074 A1 * | 3/2010 | Dan | A45B 23/00 135/20.3 |
| 2010/0212705 A1 * | 8/2010 | Tung | A45B 23/00 135/20.1 |
| 2012/0180832 A1 * | 7/2012 | Zheng | A45B 17/00 135/20.1 |
| 2013/0092200 A1 * | 4/2013 | May | A45B 23/00 135/20.1 |
| 2013/0146739 A1 * | 6/2013 | Zhao | E04H 12/2246 248/519 |
| 2013/0206193 A1 * | 8/2013 | Browning | A45B 23/00 135/20.1 |
| 2013/0306828 A1 * | 11/2013 | Volin | A45B 23/00 248/521 |
| 2014/0158173 A1 * | 6/2014 | Li | A45B 17/00 135/20.1 |
| 2014/0230867 A1 * | 8/2014 | Ma | A45B 17/00 135/20.1 |
| 2017/0231340 A1 * | 8/2017 | Nei | A45B 25/02 135/20.1 |
| 2017/0318923 A1 * | 11/2017 | Gharabegian | A45B 25/00 |
| 2018/0334828 A1 * | 11/2018 | Pan | E04H 12/2246 |

FOREIGN PATENT DOCUMENTS

| | | | | |
|---|---|---|---|---|
| EP | 2556767 A1 * | 2/2013 | | A45B 23/00 |
| FR | 1128243 A * | 1/1957 | | E04H 15/60 |
| FR | 2737244 A1 * | 1/1997 | | A45B 23/00 |

* cited by examiner

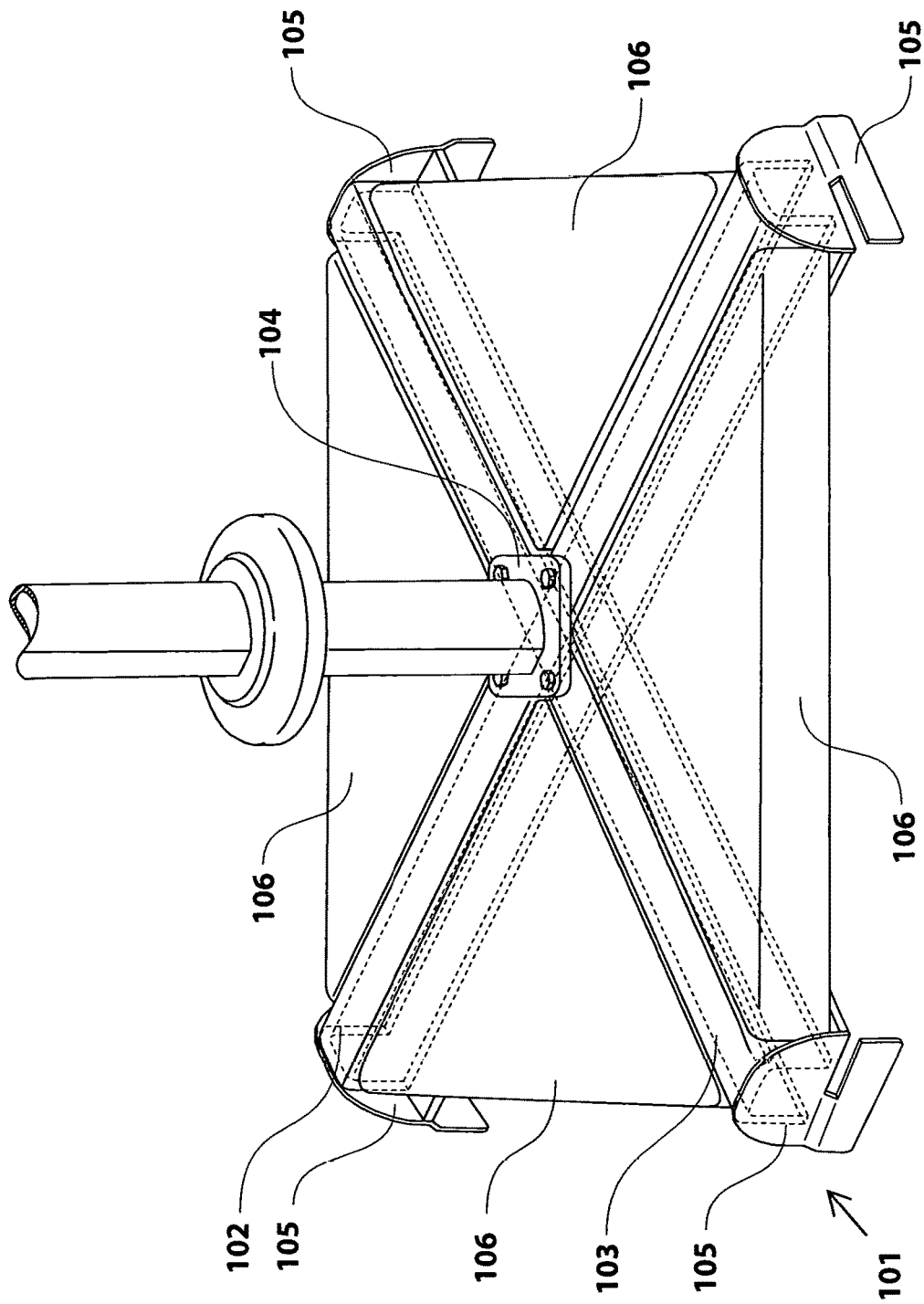

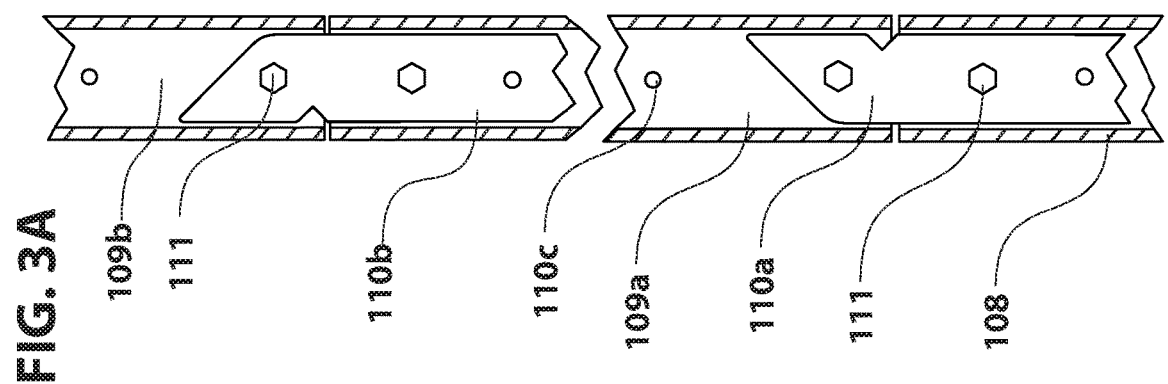

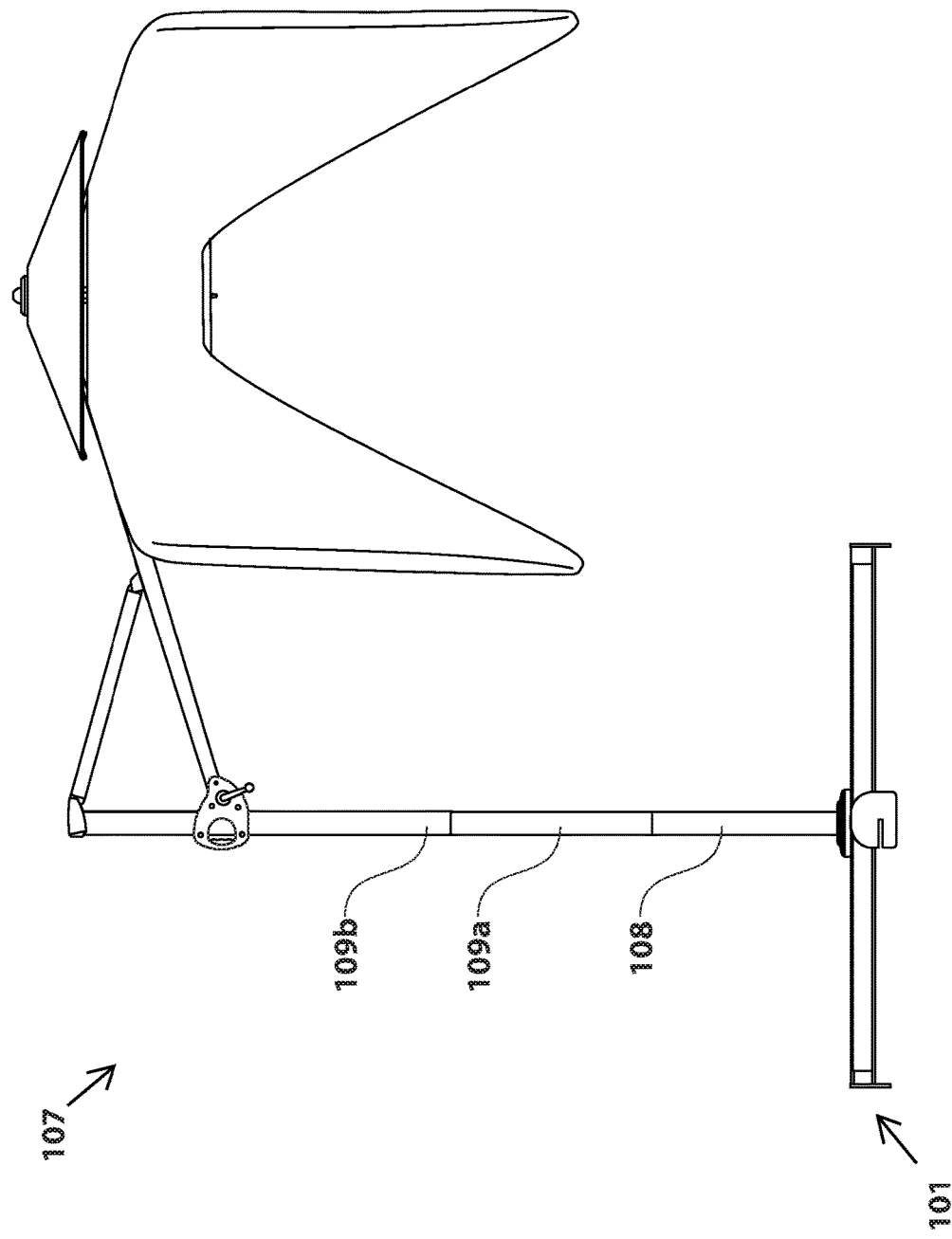

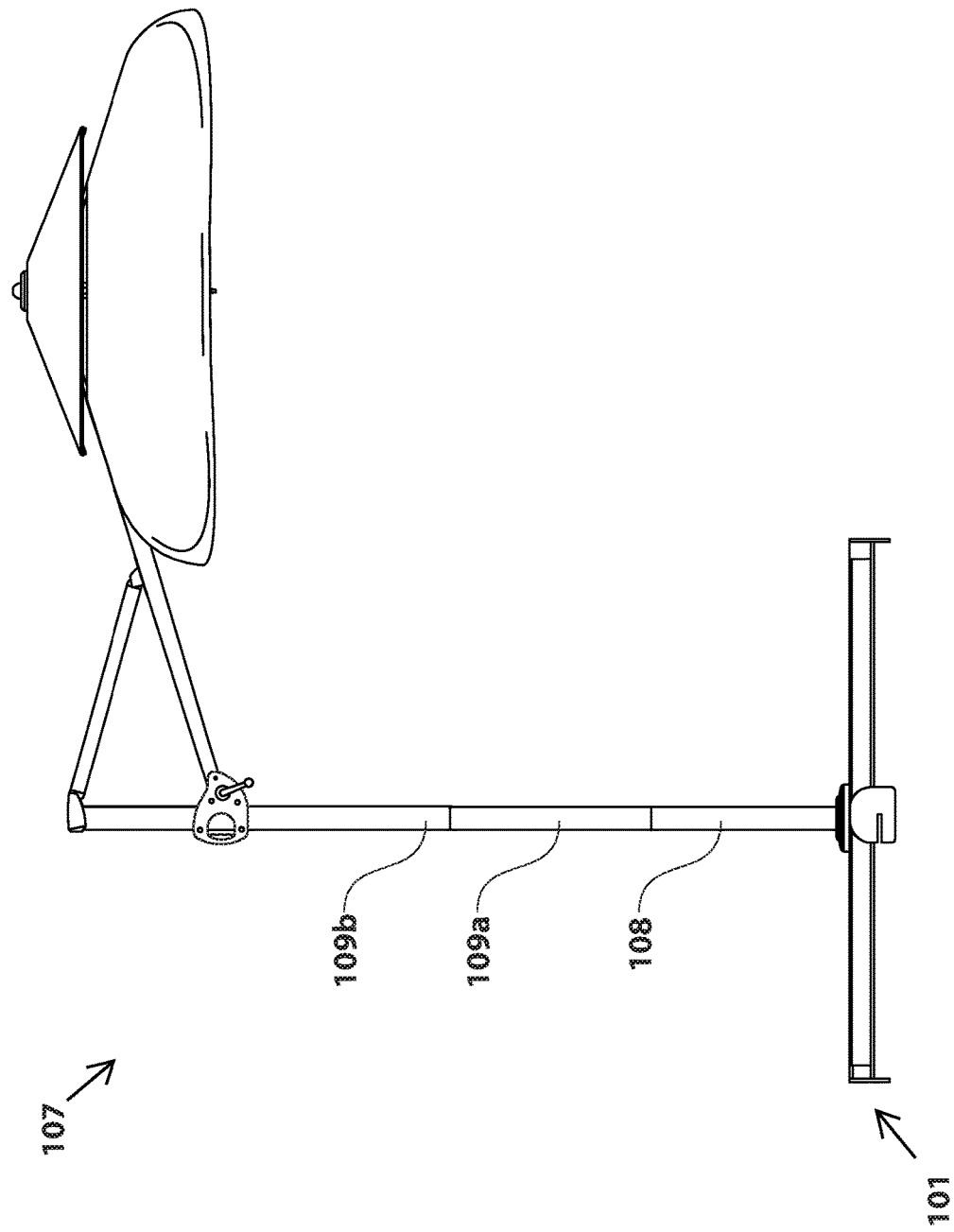

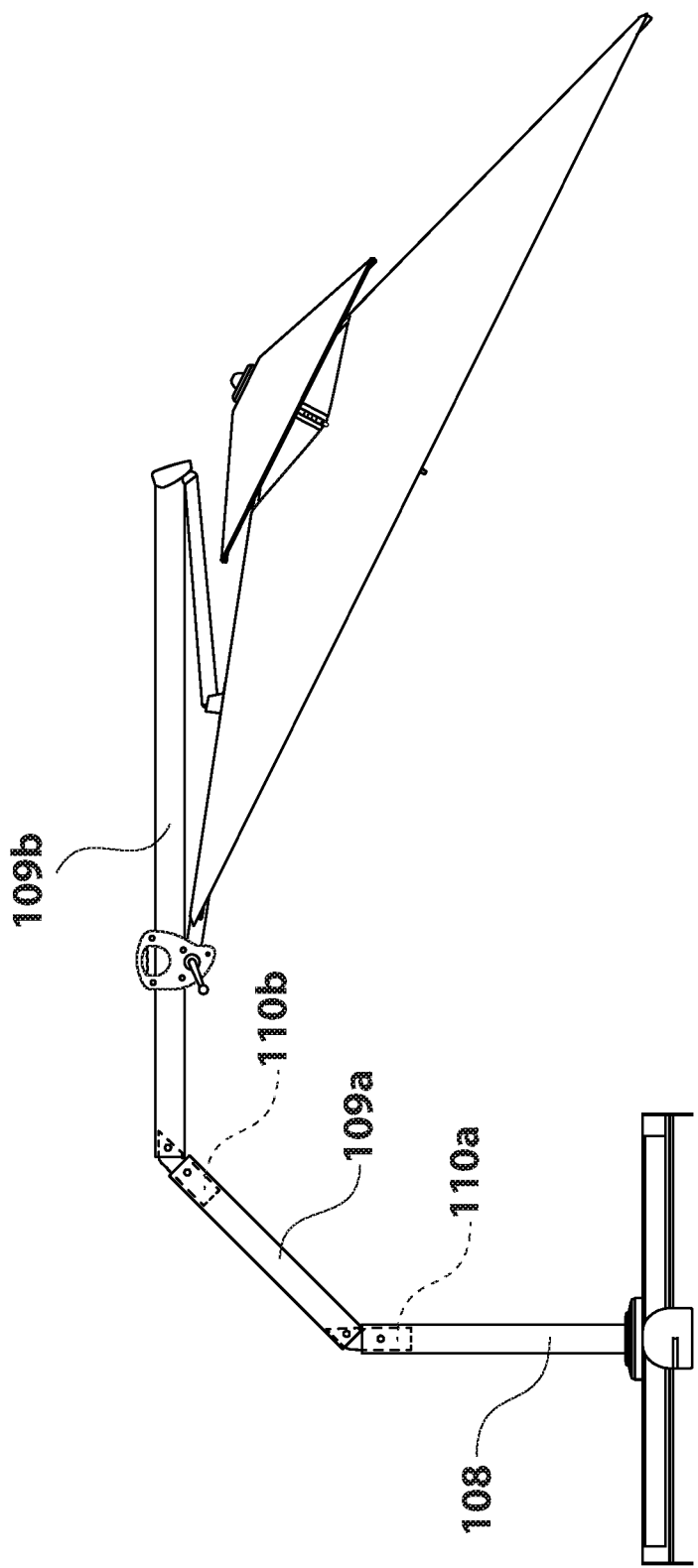

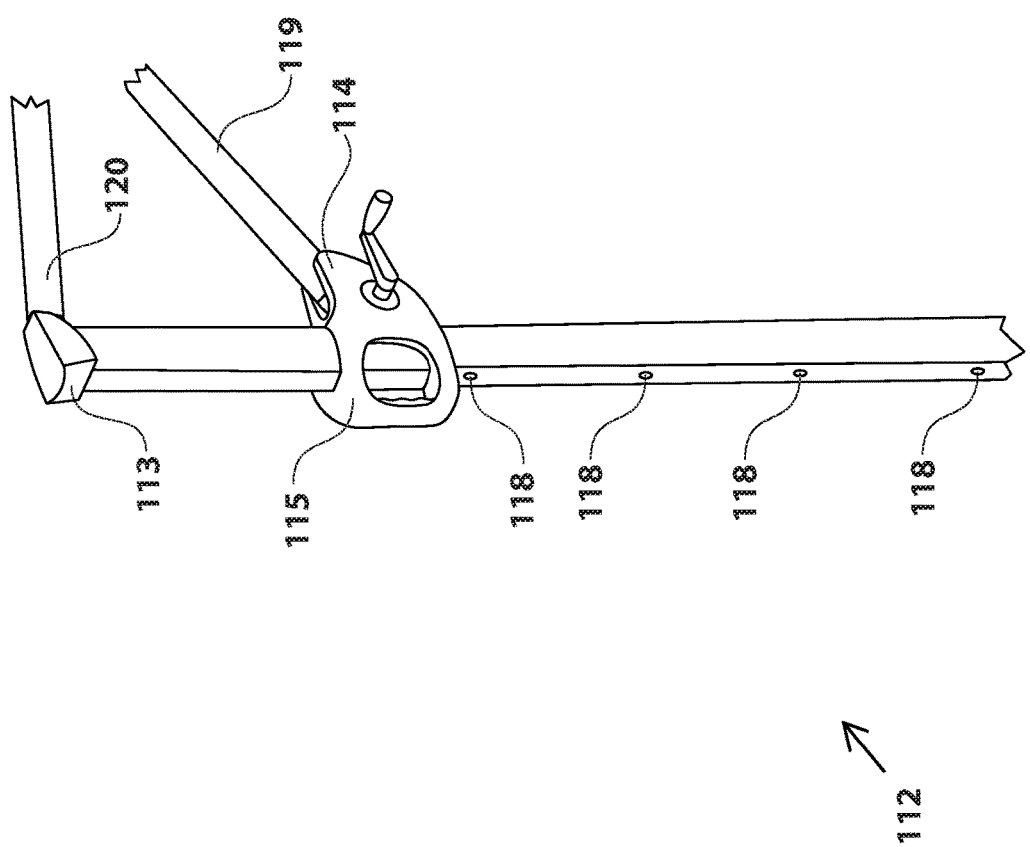

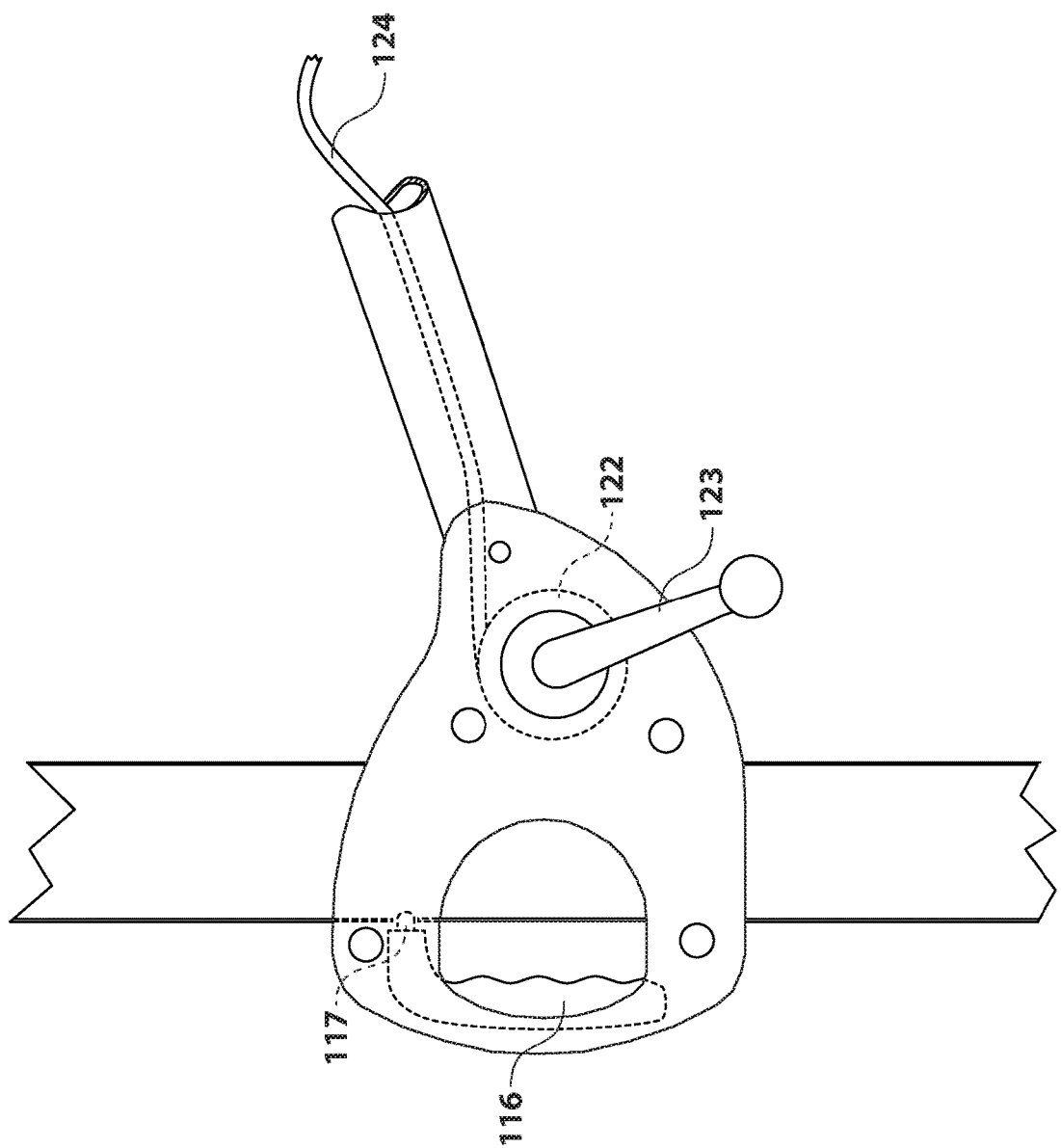

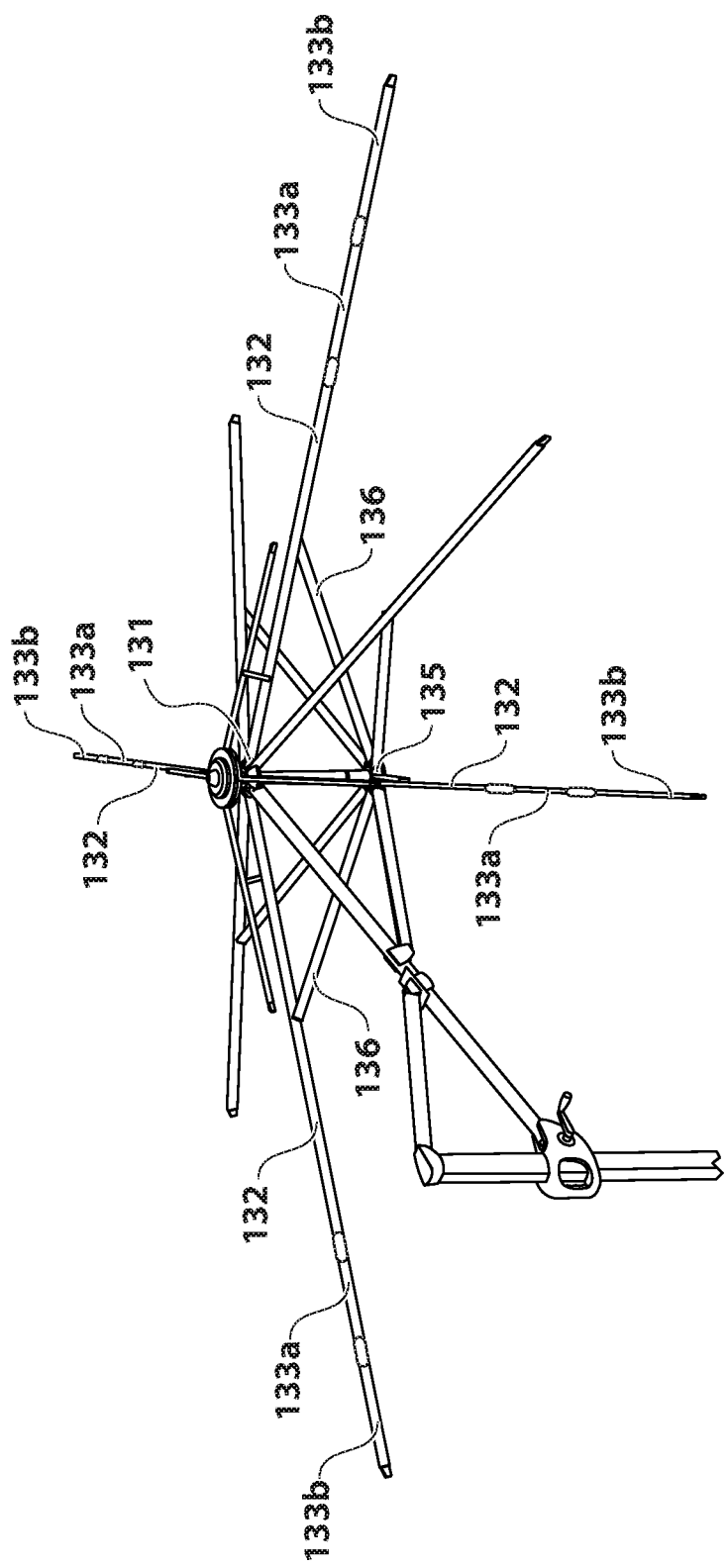

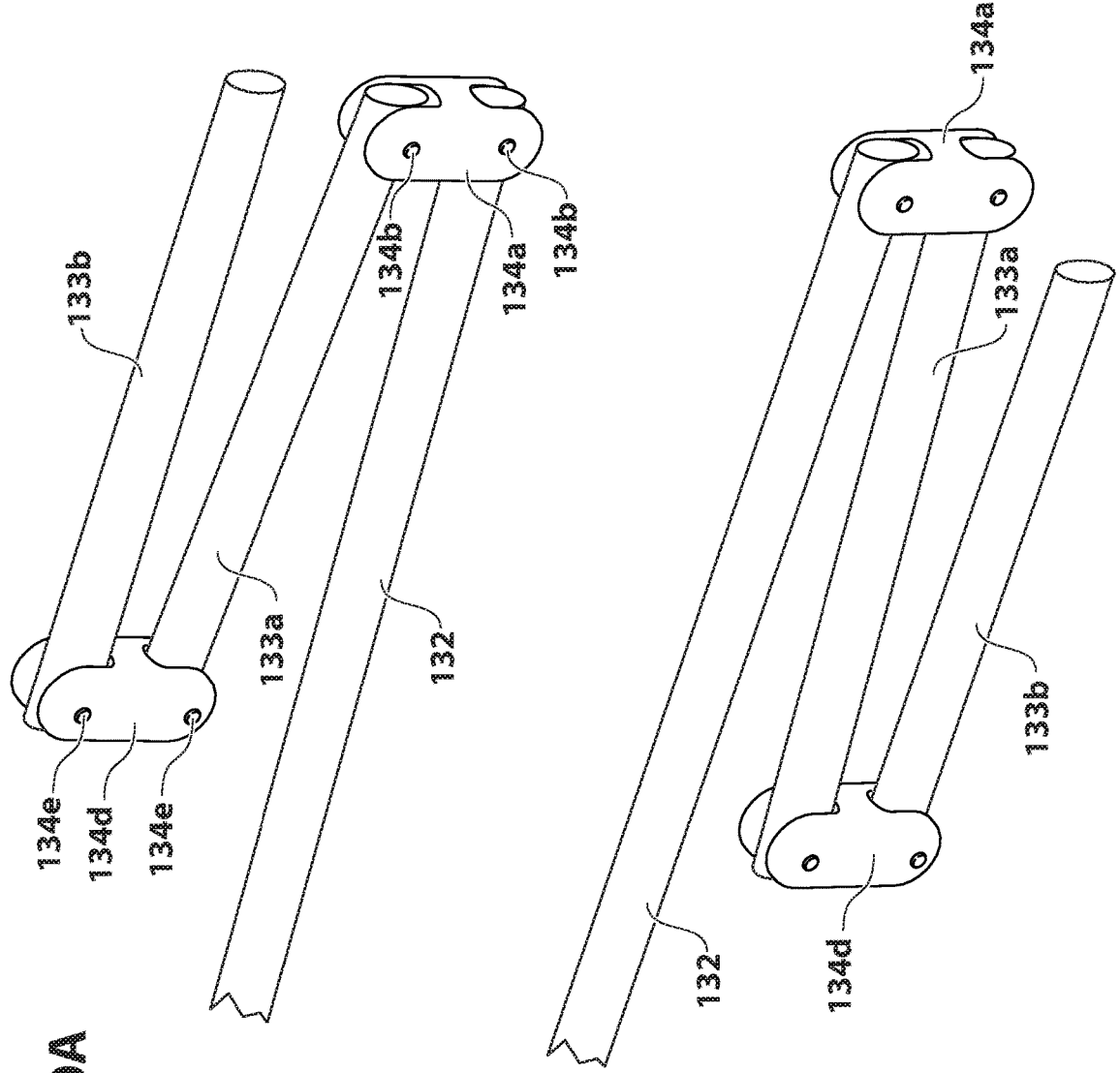

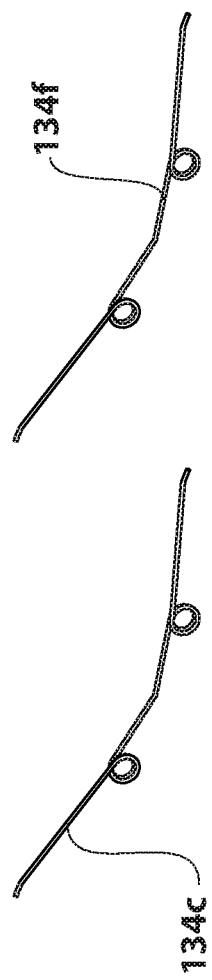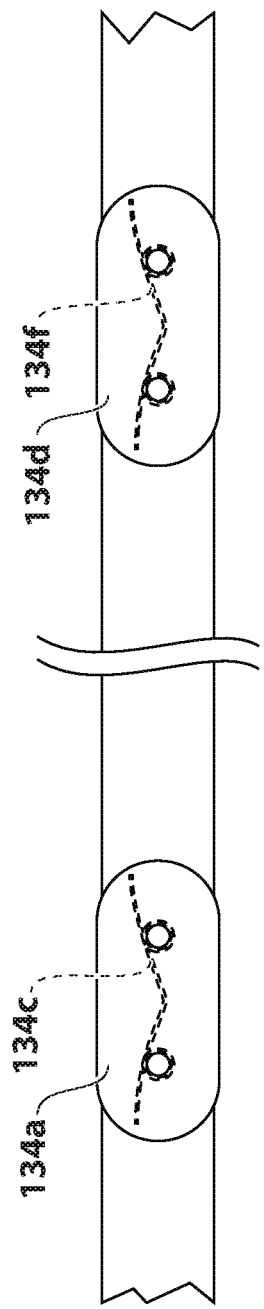

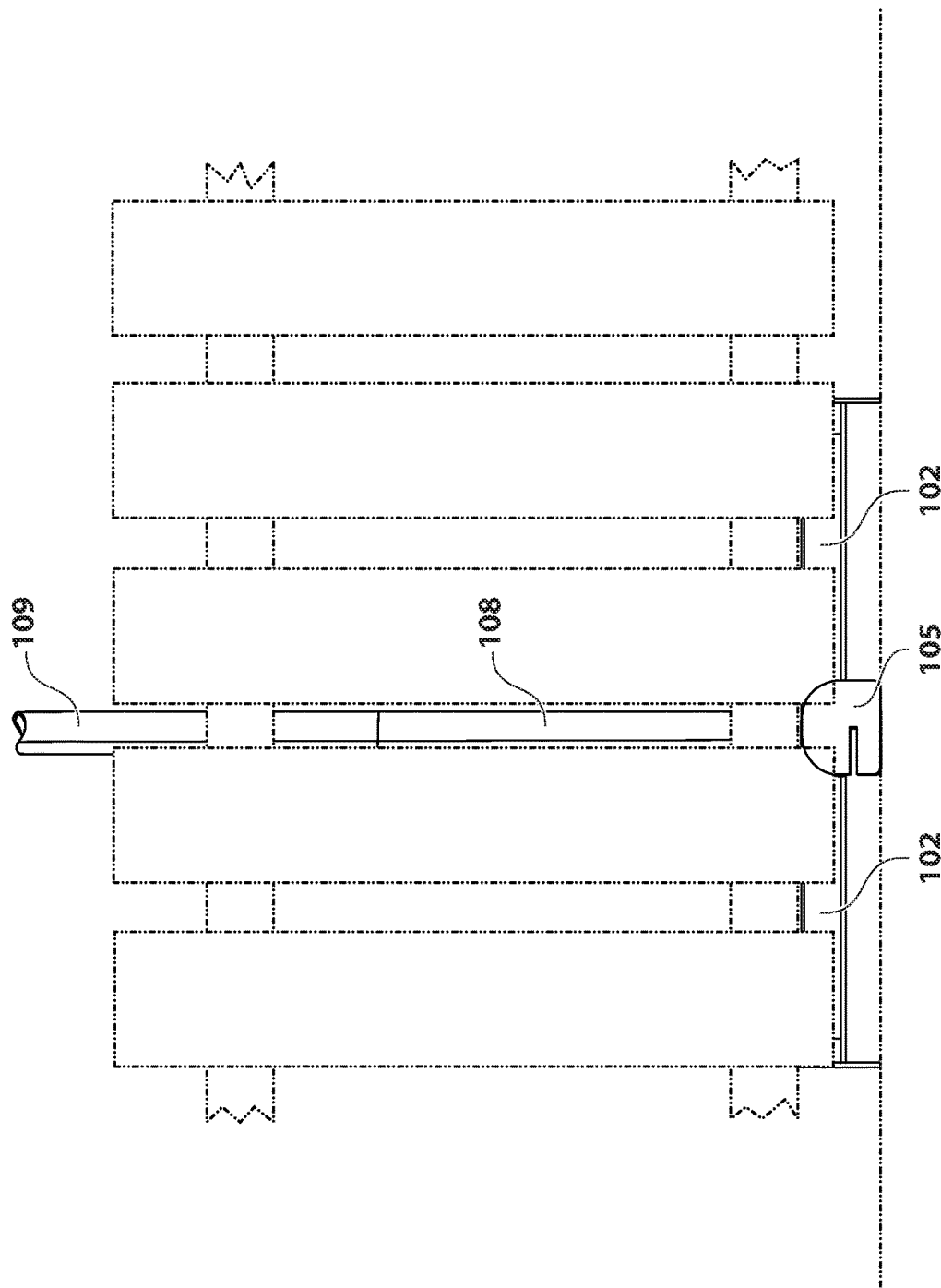

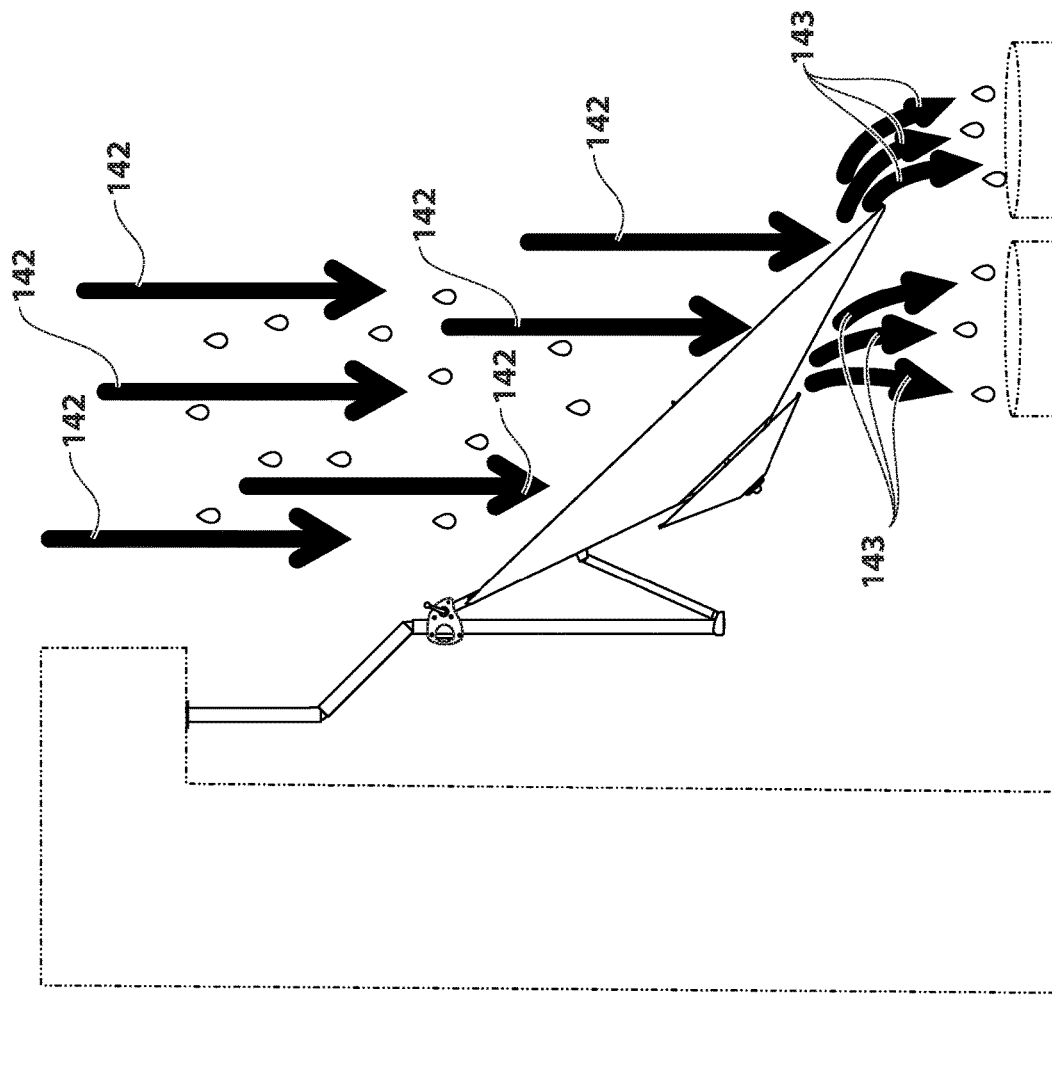

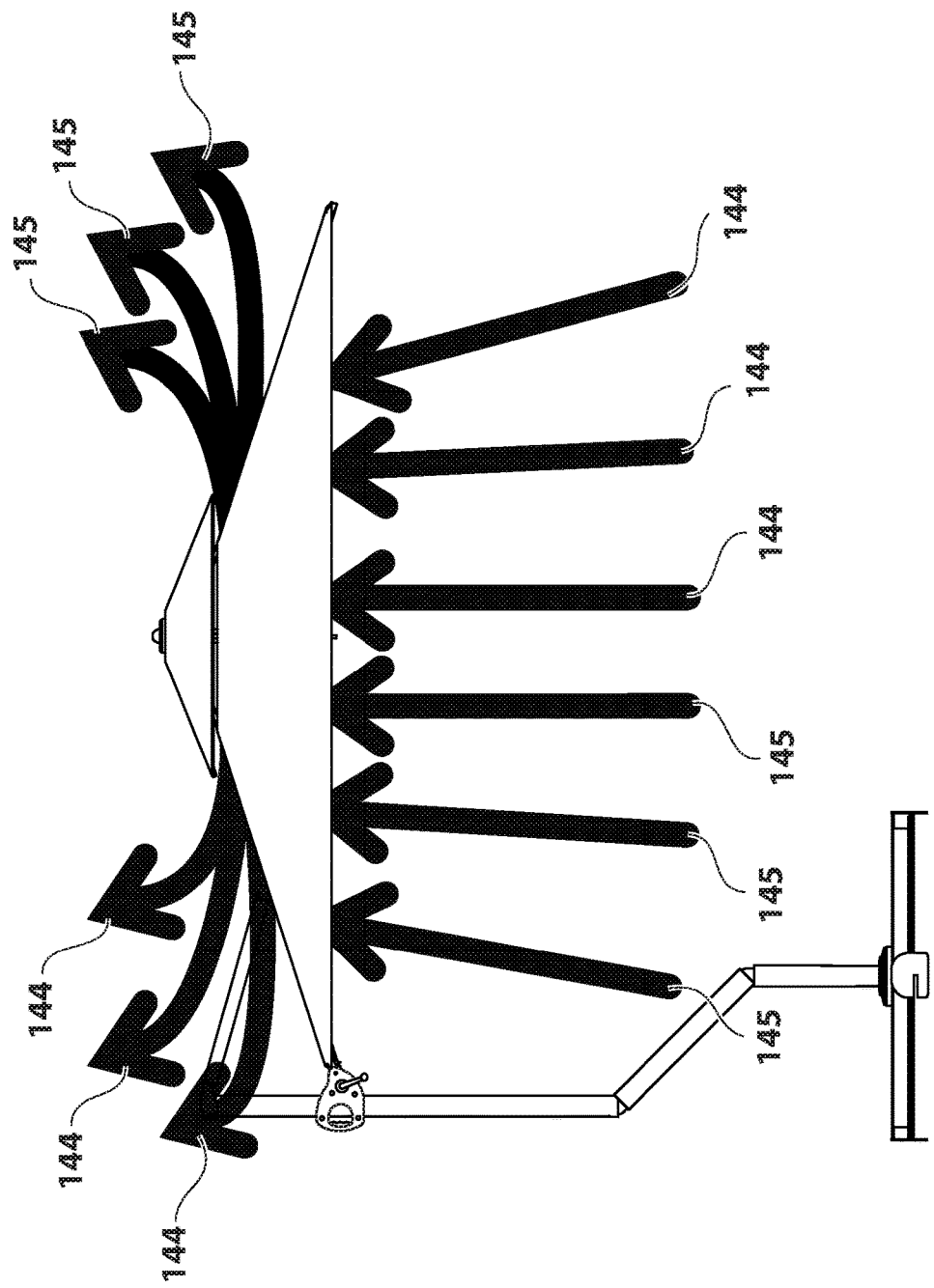

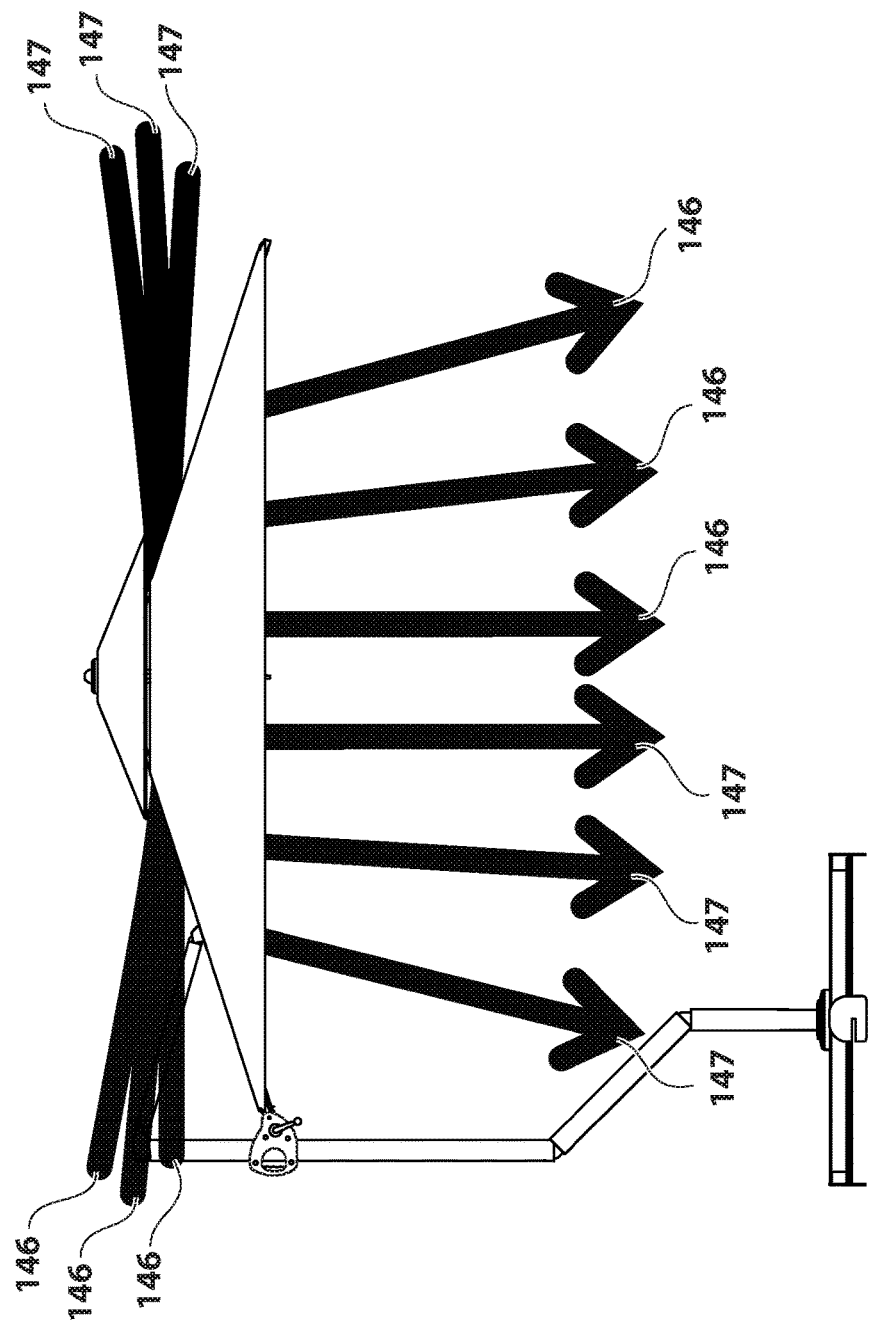

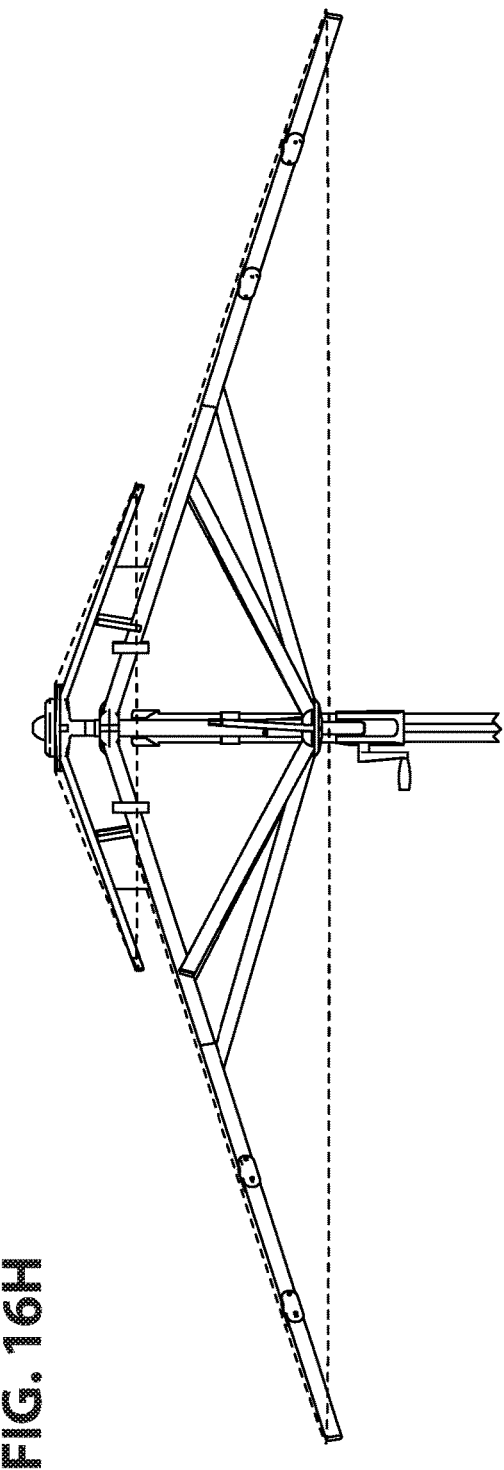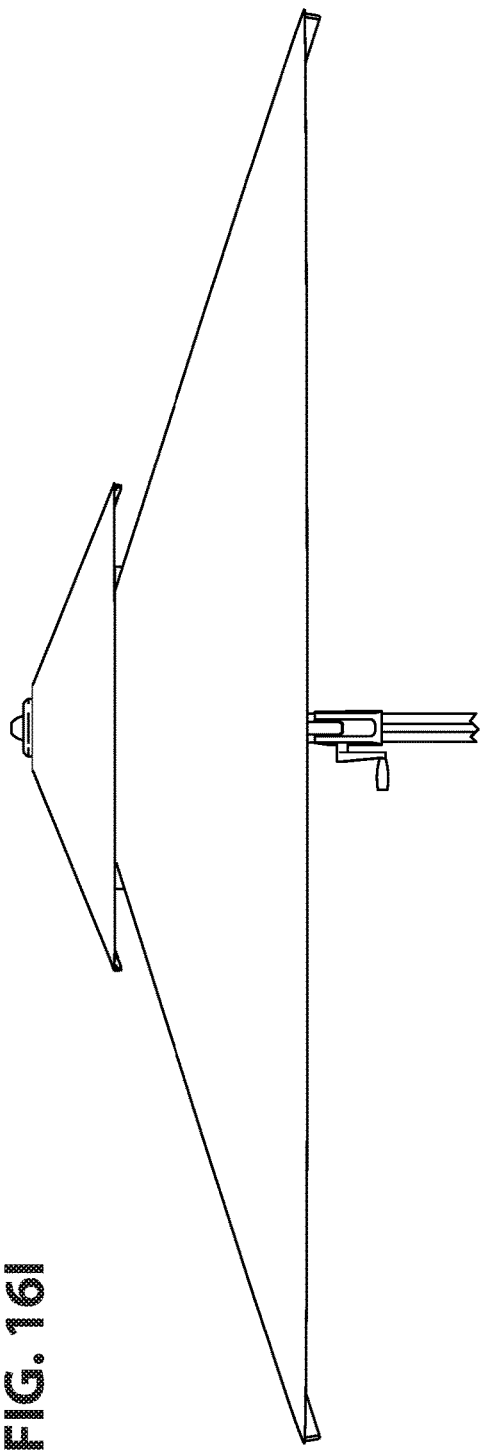

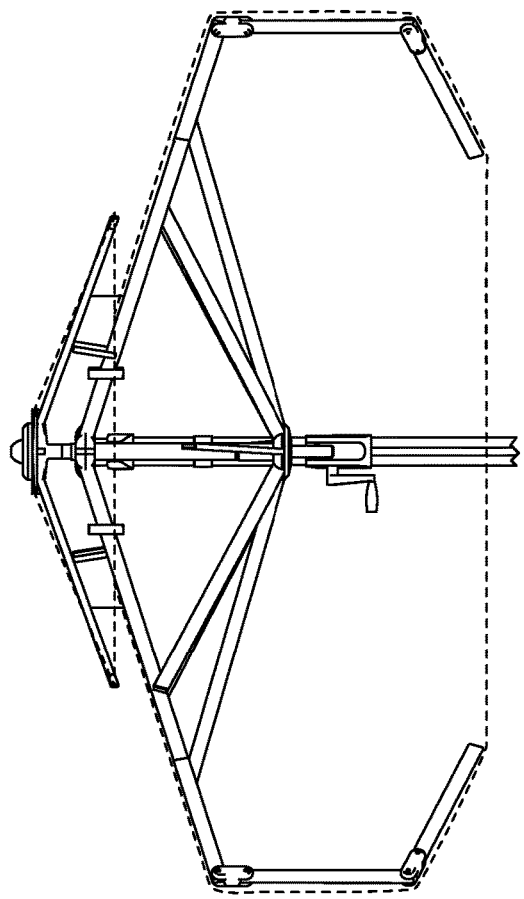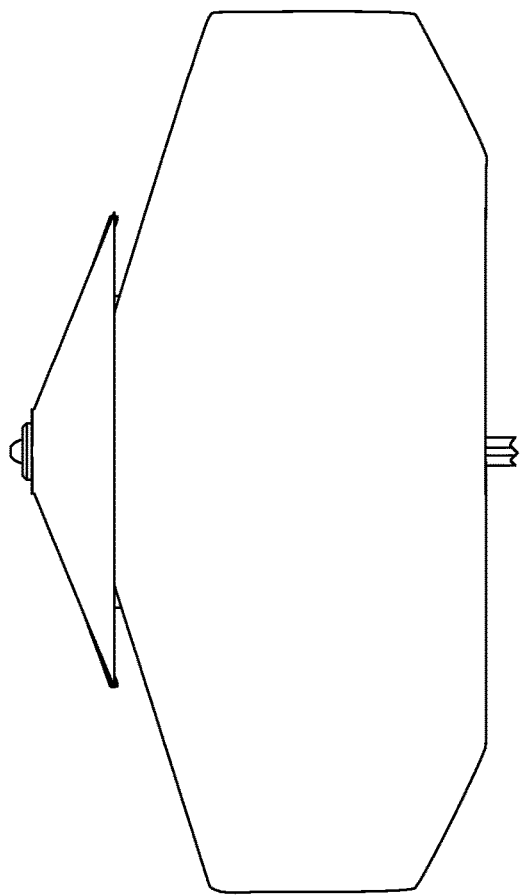
FIG. 16R
FIG. 16S

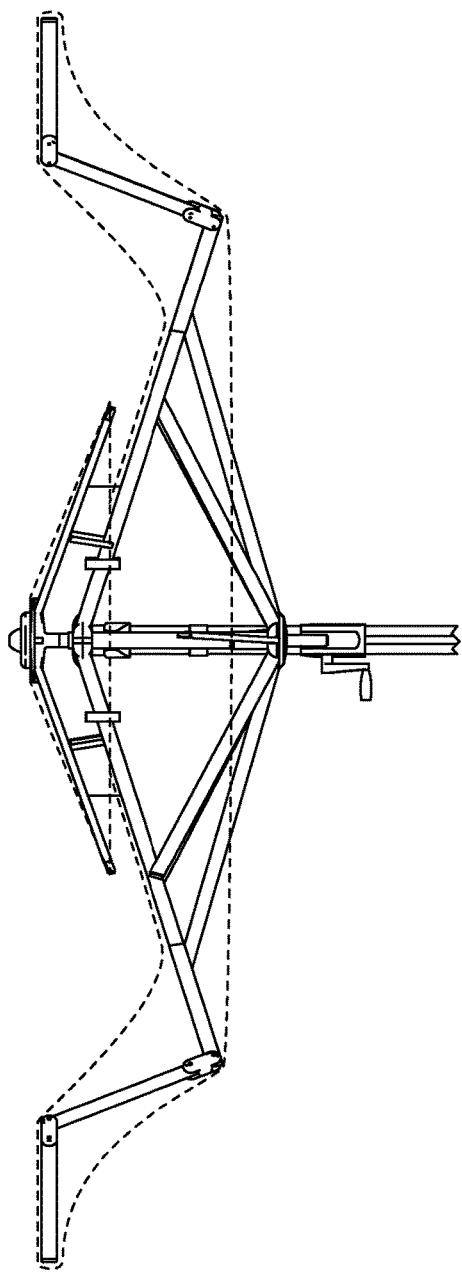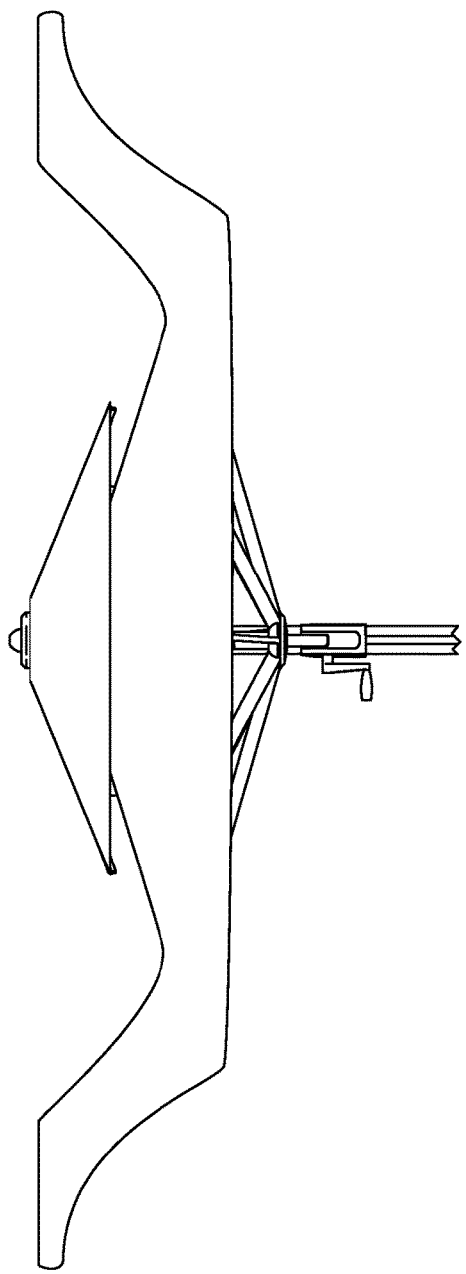

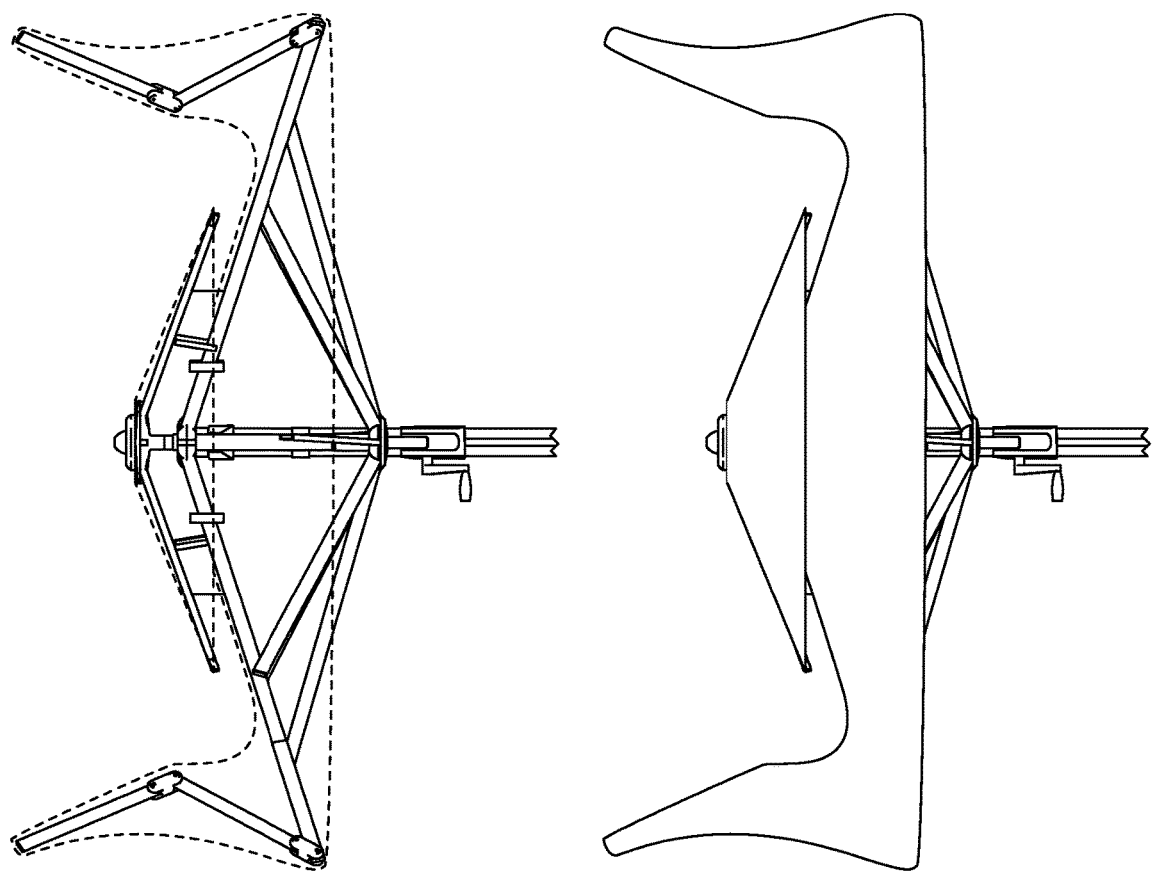

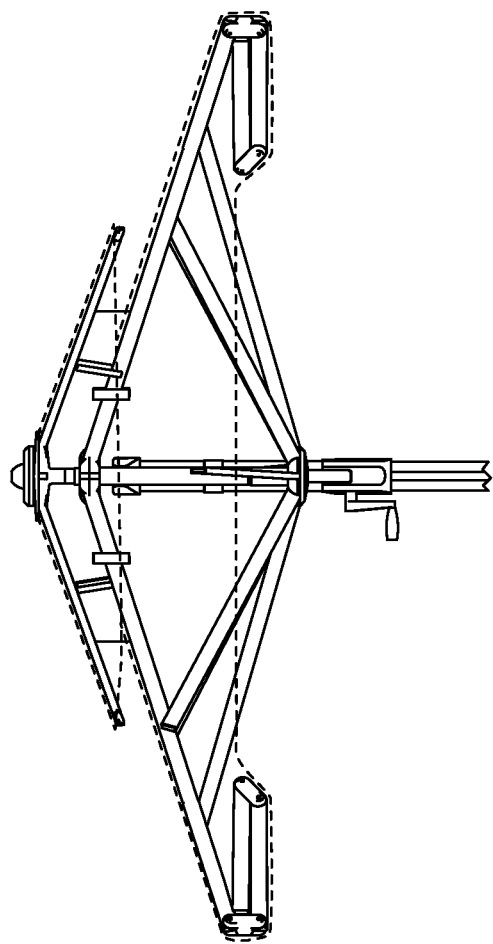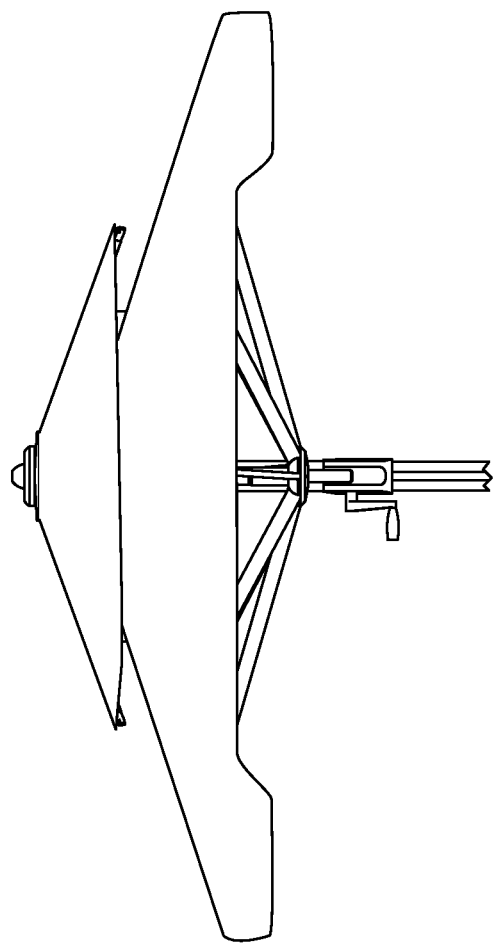
FIG. 16X
FIG. 16Y

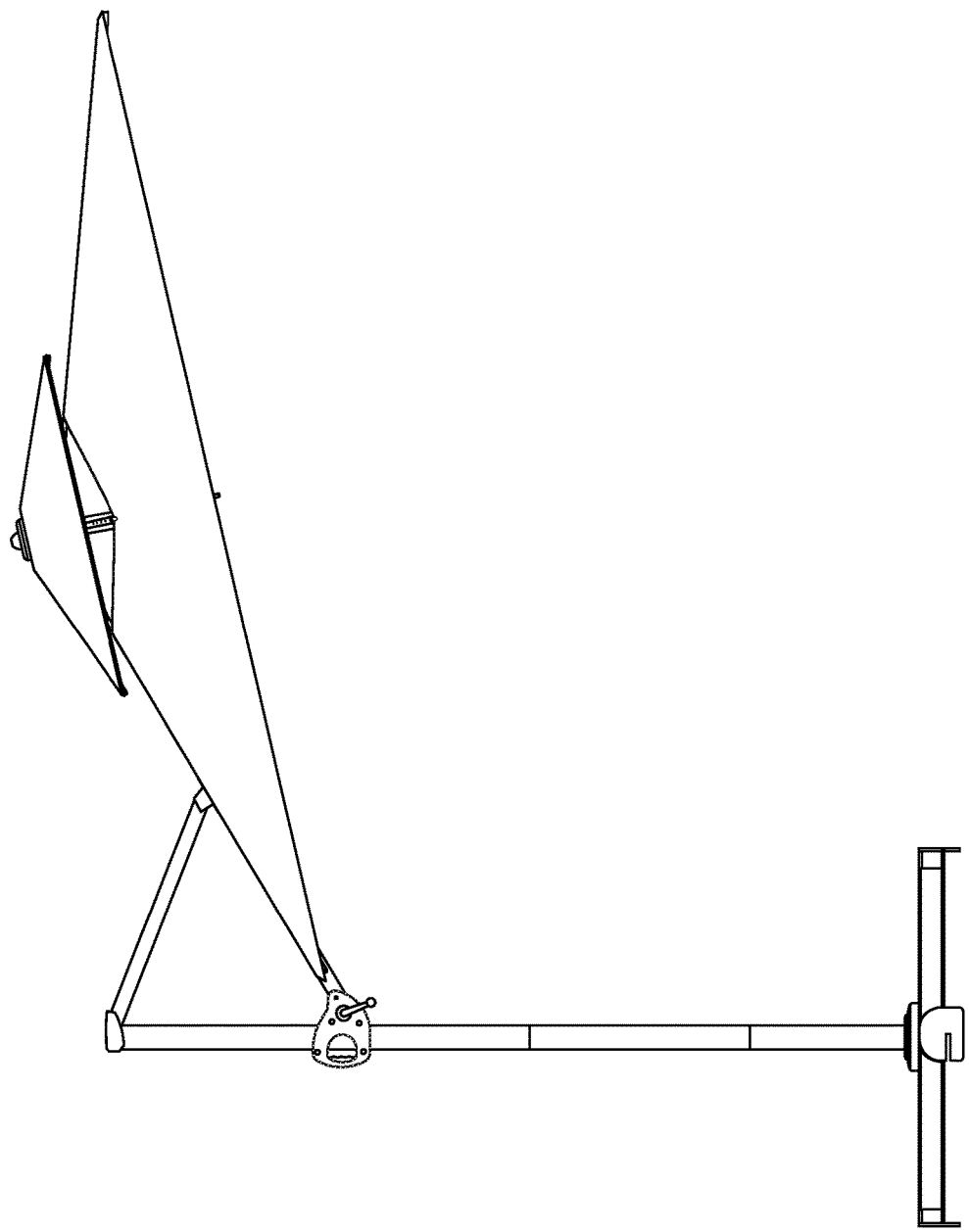

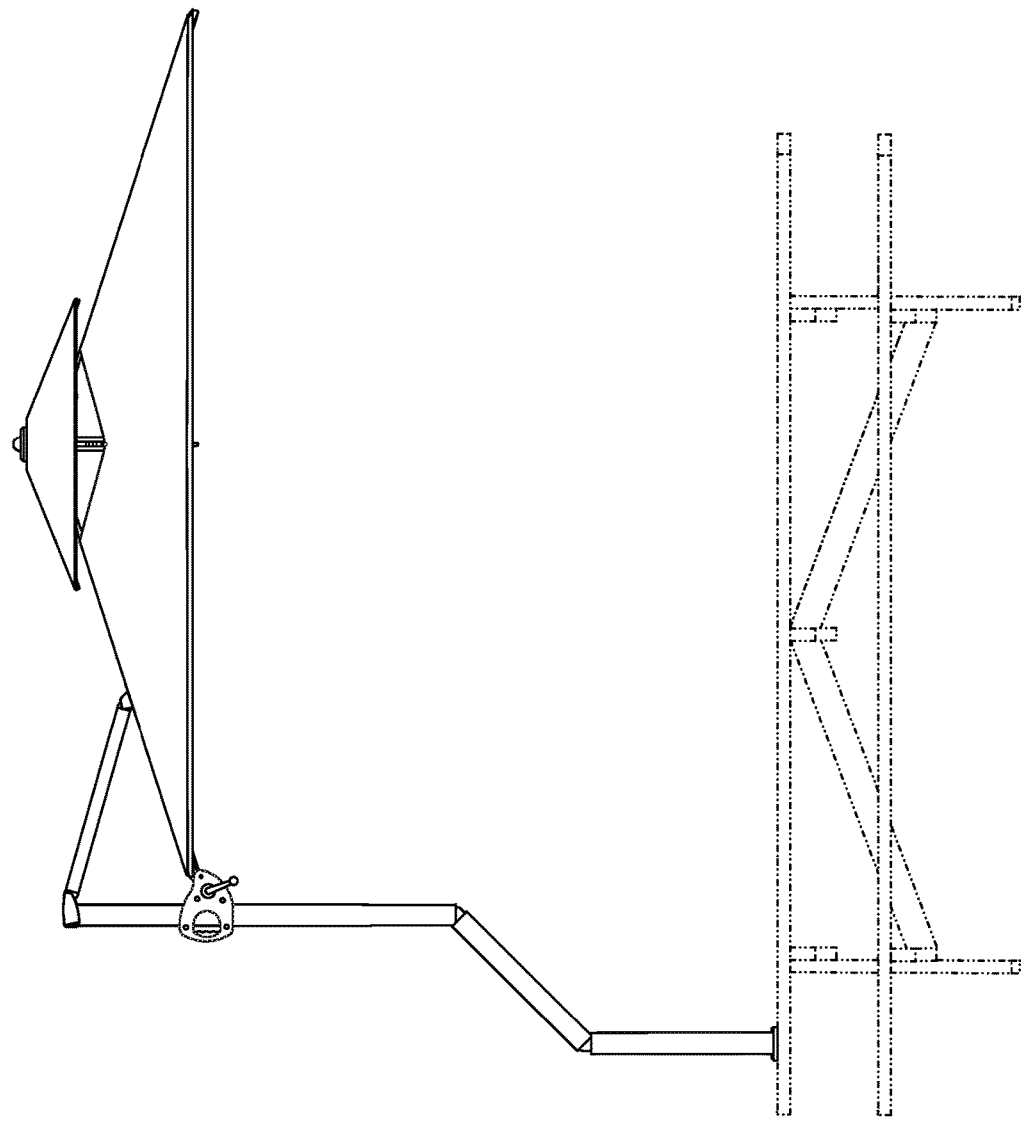

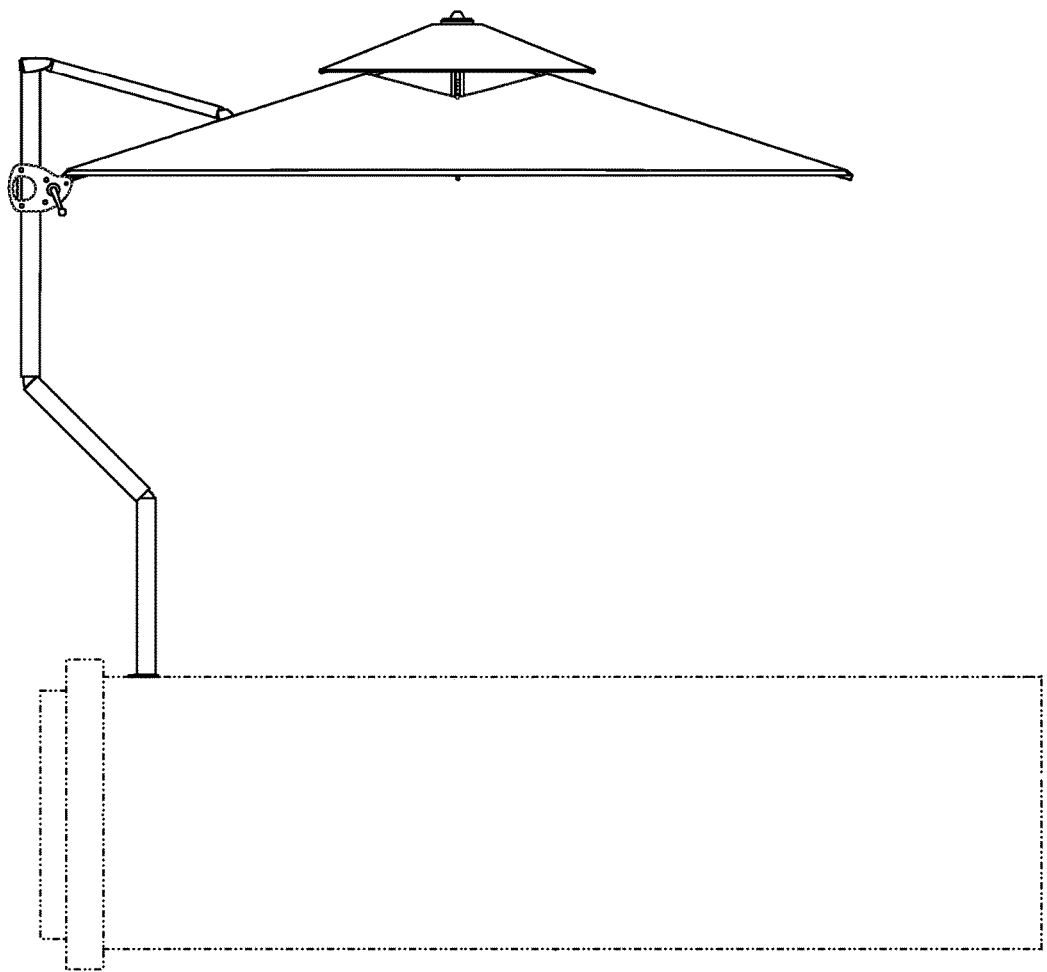

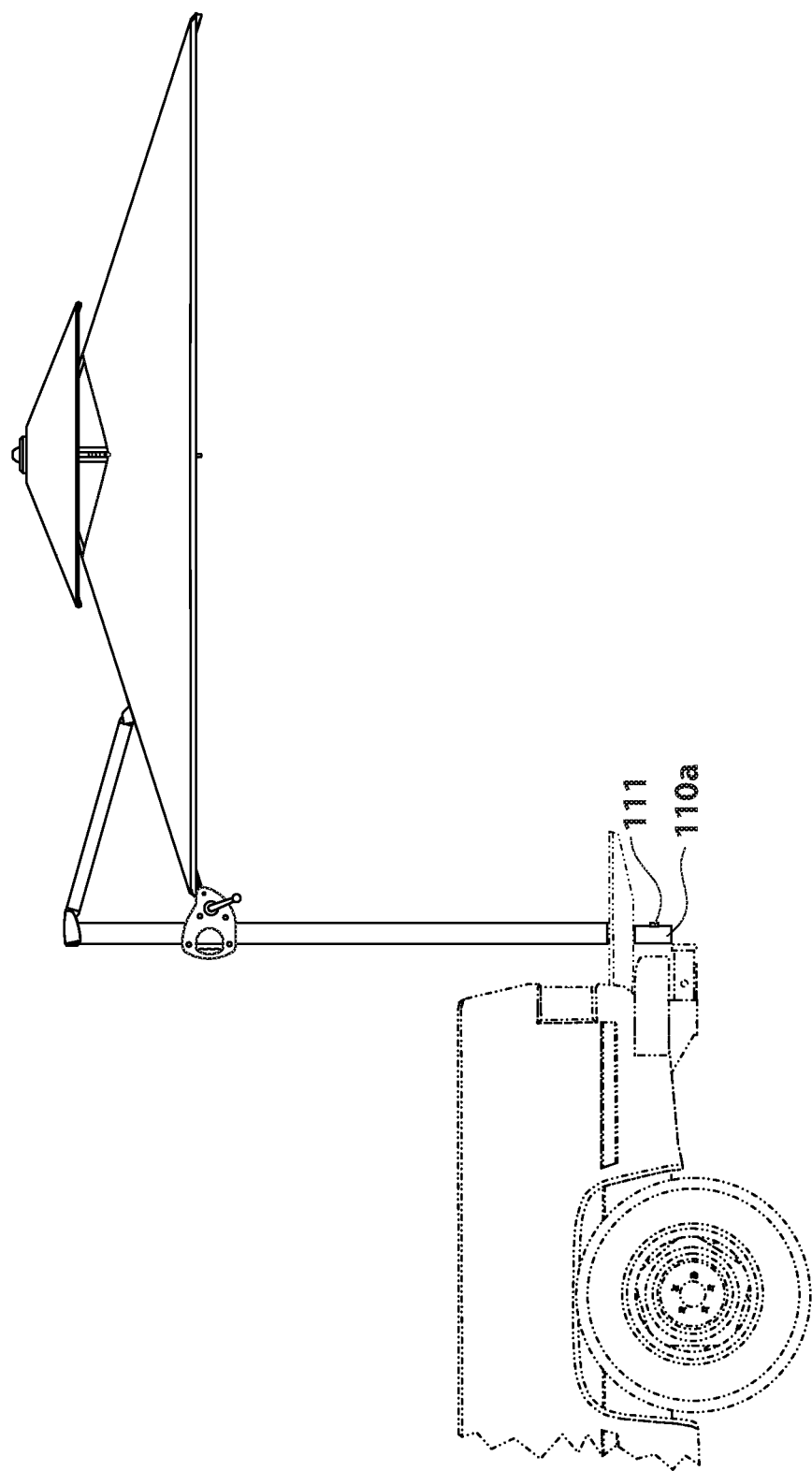

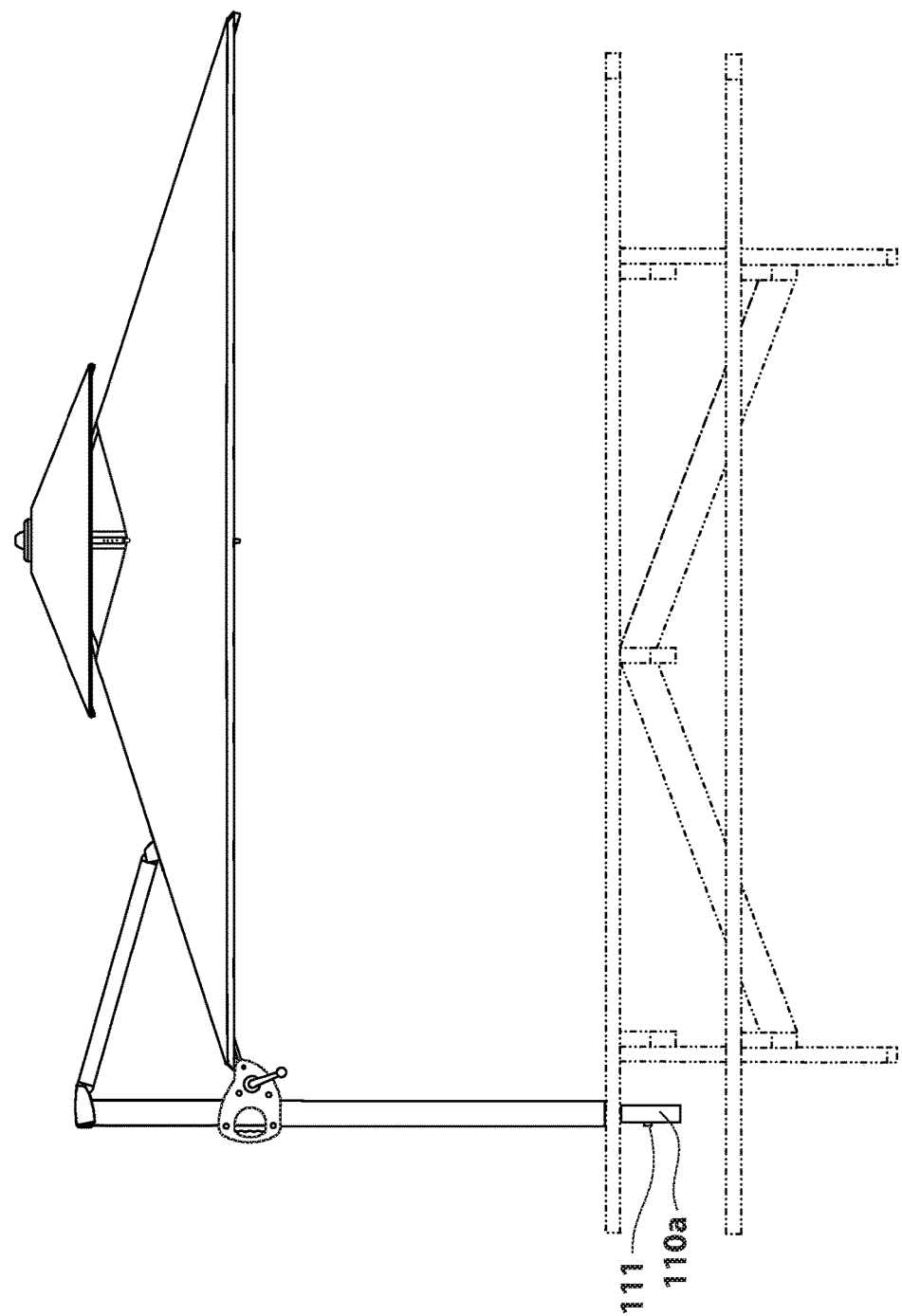

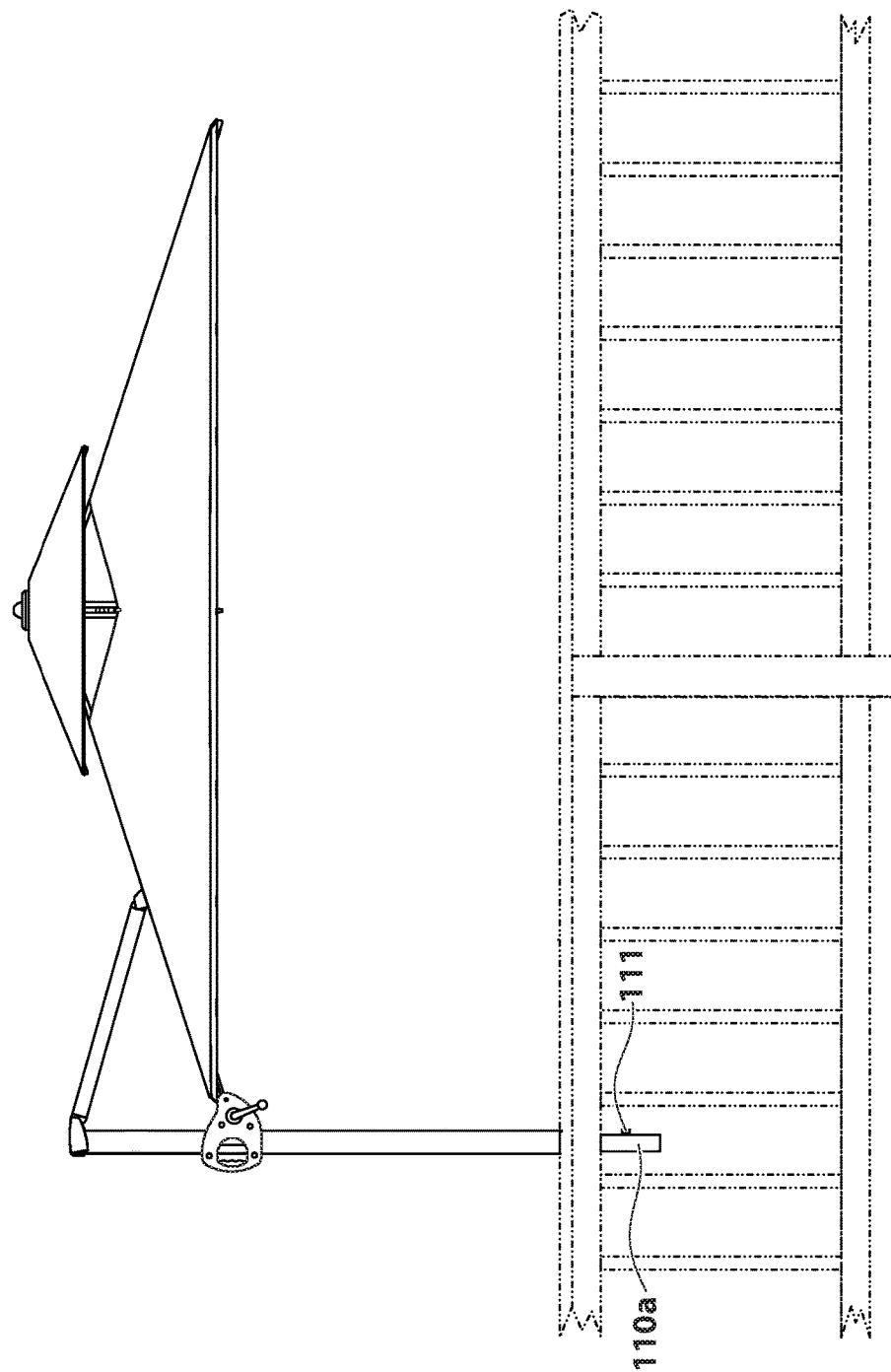

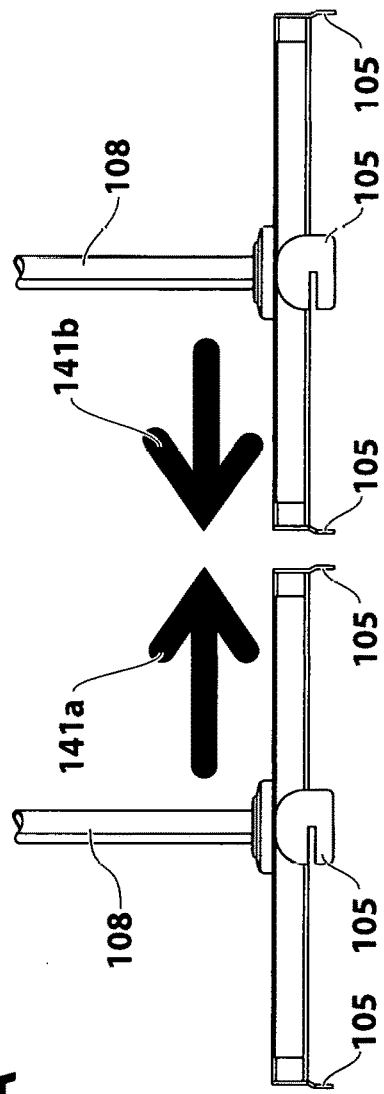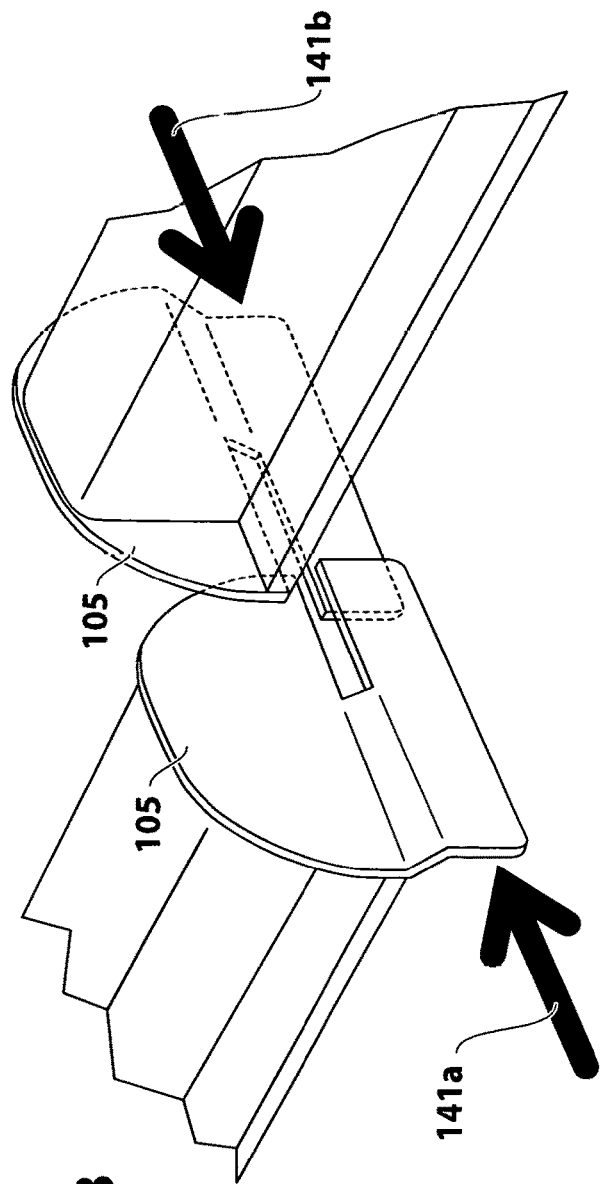
FIG. 21A
FIG. 21B

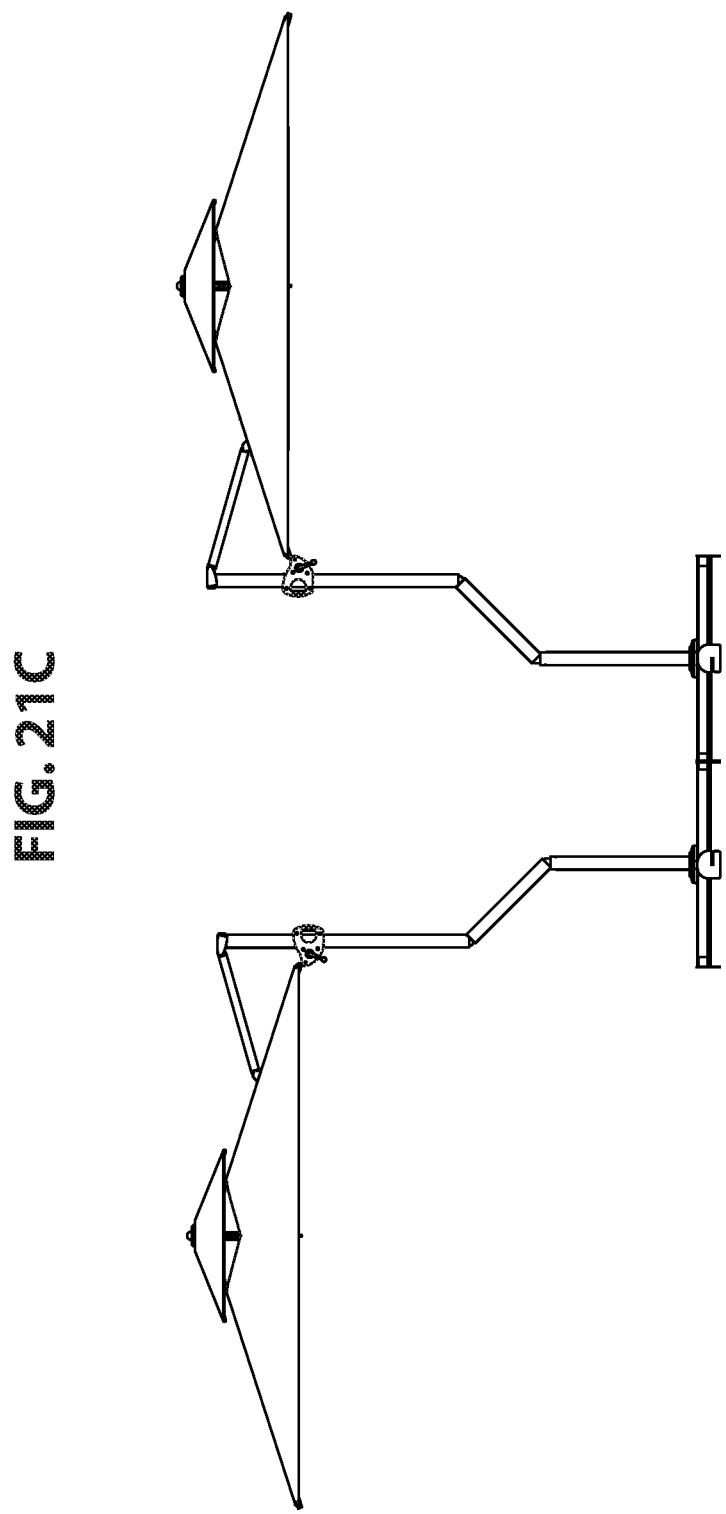

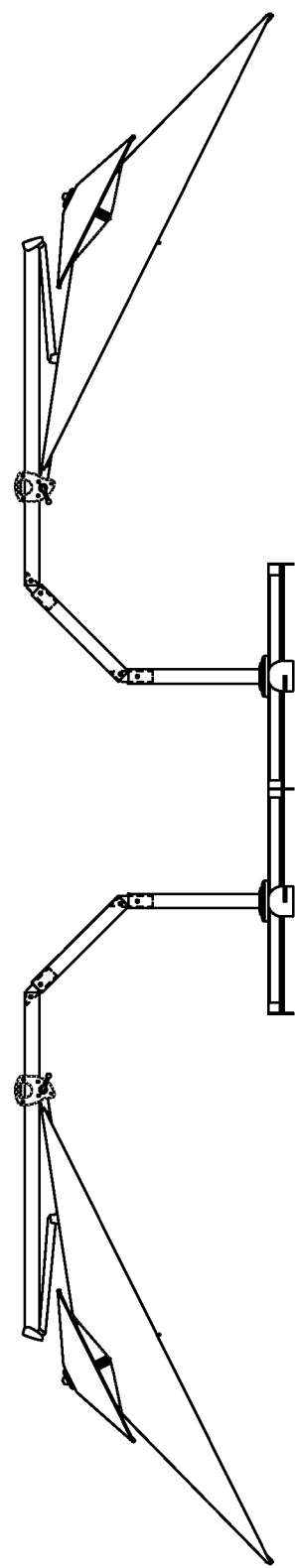

MULTI-ANGLE MULTI-FUNCTION UMBRELLA

FIELD OF THE INVENTION

The present invention relates to a canopy umbrella, which is cheap to produce, is easy to ship as one unit, requires little assembly, and can be quickly and easily be unfolded. Particularly, the present invention relates to having:
1) Multi-function fence-mountable balcony-mountable bumper-mountable hitch-mountable base system,
2) Multi-function fence-mountable balcony-mountable bumper-mountable hitch-mountable post system,
3) Height-adjusting angle-adjusting multi-canopy-deploying system,
4) Adjustable water-collector wind-blocker privacy-screen double-awning central canopy system, and
5) Adjustable water-collector wind-blocker privacy-screen double-awning multi-angle ring canopy system.

DESCRIPTION OF THE PRIOR ART

A number of canopy umbrellas have been introduced.

U.S. Pat. No. 2,533,322, issued 1950 Dec. 12, to Saul Kober, relates to beach and lawn umbrellas and more particularly to umbrellas of the type as used in conjunction with a ground cloth. The principal object of the invention is the provision of a beach and lawn-set comprising an umbrella and a ground cloth which is used in conjunction therewith and which provides covering for the umbrella when the umbrella is folded for carrying or storing purposes.

U.S. Pat. No. 2,759,486, issued 1956 Aug. 21, to Arthur A. Pesaturo, relates to an umbrella of the type used on beaches, and has special reference to an attachment device therefor, whereby the umbrella standard may be easily inserted into and removed out of the ground. The principal object of the invention is to provide and attachment device for a beach-type umbrella which is slidably operated to drive the umbrella stick into the ground and to release it from the ground.

U.S. Pat. No. 3,434,484, issued 1969 Mar. 25, to Luciano L. Dilullo, relates to a table which is disposed to be placed around the pole of an umbrella adapted to be inserted into the ground.

When the pole of the umbrella is tilted at different angles, means are provided to tilt the angle of the table so that it can be maintained in a level position.

U.S. Pat. No. 4,567,907, issued 1986 Feb. 4, to Emanuel Dubinsky, relates to a pulley system for opening and closing an umbrella which has a ribholder adapted for slidable movement along an umbrella pole. A pulley wheel is mounted in the umbrella pole below its top portion with one end of a pulley cord fixedly attached to the ribholder while the other end of the pulley cord extends below the closed umbrella cover with a first cord handle adapted for being grasped by an operator. The first cord handle has a locking pin adapted for insertion into a hole in the umbrella pole for stopping the downward travel of the ribholder and supporting the umbrella in its open position. A second cord handle is secured to the pulley cord at a predetermined distance from the first handle such that the second handle can be readily grasped and pulled further downward for raising the ribholder to permit the locking pin to be inserted into the hole for locking the umbrella in its open position.

U.S. Pat. No. 4,832,304, issued 1989 May 23, to Alexander Morgulis, relates to a ground-anchoring device for anchoring a pole in the ground, which comprises a post formed with spiral threads at one end for threading into the ground; a socket at the opposite end for receiving an end of the pole to be anchored in the ground; and a pair of arms pivotally mounted at the opposite end of the post from a horizontal position facilitating the rotation of the post to thread it into the ground, or to a vertical position. The pair of arms include clamping elements movable to a releasing position with respect to the socket when the arms are in their horizontal positions, or to a clamping position when the arms are in their vertical positions to clamp the pole within the socket.

U.S. Pat. No. 5,433,233, issued 1995 Jul. 18, to Shimon Shiran, relates to an umbrella including a central shaft, a plurality of fabric support ribs extending outwardly from the central shaft, a fabric cover associated with the fabric support ribs, a plurality of rib support elements for supporting the fabric support ribs and a plurality of detachable attachment elements, each operative to detachably attach a rib support element onto a fabric support rib, whereby in response to strong winds or other forces, detachment occurs, thereby preventing breakage of the support ribs.

U.S. Pat. No. 5,871,024, issued 1999 Feb. 16, to Robert D. Vanderminden, relates to an umbrella frame which is provided with a movable yoke at the upper end and a stationary yoke at an intermediate point. Ribs are pivotally mounted on the movable yoke and struts are pivotally mounted on the fixed yoke while being pivotally mounted to intermediate points on the ribs. A downward movement of the upper yoke causes the ribs to splay outwardly so as to open the umbrella. An articulated lever and link arrangement is connected to one rib and strut unit so that actuation of the lever causes the upper yoke to be pulled downwardly to open the umbrella. Passage of the lever by a bottom dead center position effects locking of the movable yoke in the lowered position.

U.S. Pat. No. 6,443,172, issued 2002 Sep. 3, to Donald U. Brumfield, relates to a beach umbrella which is supported with a stand having a lower shaft and an upper shaft, with the upper shaft supporting a beach umbrella mast. Before attaching the umbrella mast, the tubular upper shaft serves as an impact tool against a protuberance on the lower shaft, allowing hammering of the lower shaft into composite earth. The upper shaft telescopes onto the lower shaft securing a tray in place against the protuberance after hammering is completed.

U.S. Pat. No. 6,497,242, issued 2002 Dec. 24, to Chung-Kuang Lin, relates to an umbrella rib assembly which includes a top rib pivotally connected with a stretcher rib both being made of aluminum alloy for light weight and easy processing; a middle rib pivotally secured to the stretcher rib and a tail rib pivotally connected with the middle rib, with the middle rib and the tail rib being made of light weight carbon-fiber-reinforced plastics.

U.S. Pat. No. 6,588,037, issued 2003 Jul. 8, to David Eno, relates to a portable support device adapted for being disassembled into segments for packing and being readily assembled. The support device in a first embodiment has a base block to which a pair of arms is assembled and to which a segmented pole is mounted in vertical orientation to support a mosquito net. In a second embodiment, an arm is assembled to a beam to define a horizontal plane and a segmented pole is assembled to the beam in a vertical orientation without use of a connecting block. In third and fourth embodiments, a pair of horizontal members are connected to each other and to a vertical support pole by a rigid connector.

U.S. Pat. No. 6,732,985, issued 2004 May 11, to Douglas Chet Cantrell, describes a multi-segmented central post member with upper, middle, and lower sections having a cup-holding element, a utility member and a clothes-hanging element having a plurality of hook members extending therefrom. The post segments have compatible male and female threads on their respective ends for establishing a rectilinear connection to the mating post segment. The bottom segment has a first end which is tapered for easy insertion in sand or turf. The threaded male portions of the post segments are radially offset from the outer circumference to form retaining flanges for the accessory units. The ends of the post segments with the threaded female recesses have a similar retaining flange.

U.S. Pat. No. 6,736,151, issued 2004 May 18, to Chung-Kuang Lin, describes a anti-windforce rib assembly of multiple-fold umbrella which includes: a spring rib connected between an inner rib and an outer rib of the rib assembly, a buffer device formed on the spring rib and connected to the inner rib, whereby upon blowing of a strong wind to the rib assembly, the force of the strong wind will be dampened, weakend or released by the buffer device on the spring rib to minimize the wind force acting upon the rib assembly to prevent from bending, deformation, breakage or damage of the umbrella rib assembly.

U.S. Pat. No. 7,111,633, issued 2006 Sep. 26, to Christopher Mark Moroney, discloses a pipeline welding shelter which includes an umbrella-like framework with a support post which supports the umbrella-like framework. Means is provided for maintaining the support post in a substantially vertical orientation when positioned on or adjacent to a pipeline. A flexible heat resistant covering encloses the umbrella-like framework. The covering is capable of withstanding limited exposure to heat from a welding torch without melting or igniting.

U.S. Pat. No. 7,191,996, issued 2007 Mar. 20, to Dimitrios Patsalaridis, describes a device, destined to be anchored in the ground of granular composition, comprises a rod with a hollow tubular section, the latter having an open upper end wherein can be fixed an object and an intermediate orifice on its flank. The orifice enables evacuation of the granular matter constituting the ground and penetrating into the rod through its open lower end when the device is being anchored in the ground.

U.S. Pat. No. 7,207,343, issued 2007 Apr. 24, to John Michael Earnshaw, describes an umbrella frame which includes an upper shaft part 2 and a lower shaft part 1, the two parts being connected by a tilting joint to enable the upper part to tilt with respect to the lower, a runner 4 sliding on the lower shaft part 1, for spreading a cover on the umbrella frame into its unfurled configuration when slid upwardly, and an actuator connected to the upper shaft part 2 and passing down the shaft, through or past the runner 4 when in its upper position with the umbrella open, to an operating location on the lower shaft part 1, the actuator being accessible at its lower end to allow an operator to tilt the upper shaft part 2.

U.S. Pat. No. 7,302,745, issued 2007 Dec. 4, to Ragnar Stahle, relates to a locking arrangement which includes an inner element and an outer element, where the inner element is axially shiftable relative to the outer element, such as a shaft of a tool, one end of the outer element, has a locking member for locking the inner element and the outer element, relative to one another, the locking member is maneuverable by a maneuvering member that is remote from the locking member in a direction toward another end of the outer element, via an affecting member that is shiftable along or rotatable about an axis that is parallel to a lengthwise axis of the outer element so that the affecting member has a tube that completely or partially encloses the outer element.

U.S. Pat. No. 8,075,217, issued 2011 Dec. 13, to Donald H. Eason, relates to an apparatus that comprises a compression sleeve element established at least partially around portions of a first elongated member that telescopes from a larger elongated member in which it may nest. A relative motion obstruction element may disallow only certain types of motion, e.g., rotational and axial, of the compression sleeve element relative to the elongated members around which it may be at least partially established. As it may be the compression enhancement element—which may be used to generate a retaining compression force element—that prevents perpendicular displacement of the compression sleeve element, deactivation and effective disengagement of the compression enhancement element may allow for a quick removal of the compression sleeve element without requiring that it be slid off an end of either elongated member.

U.S. Pat. No. 8,191,561, issued 2012 Jun. 5, to Edward J. Brooks, III, relates to an umbrella with an integral anchoring structure which is provided. The umbrella includes a post having a lower end for insertion into the ground, and an upper end for supporting an umbrella top. The umbrella includes an integral spiral shaped anchoring structure formed on the lower end of the post. The anchoring structure is formed with a width, W, greater than a diameter of the post and a length, L, which is adapted to stabilize a weight of the umbrella and secure the umbrella and the post in a variety of earthen conditions such as sand, lawn, and soil even in a prevailing breeze or stormier conditions. The umbrella further includes one or more retractable levers integrally attached along the post.

U.S. Pat. No. 8,807,513, issued 2014 Aug. 19, to Dee Volin, outlines a multi-adjustable, rotating, and opposite-double-locking umbrella-stanchion system which is operated with one finger for oppositely double-locking and -unlocking the umbrella-supporting post of a crank-arm-operated umbrella to secure it in different positions. The system comprises a canopy system, a supporting post, a stanchion base, a U-shaped rotational lever, an actuator arm, a push rod, two opposite L-shaped locking arms, two opposite locking cleats, radial teeth, and two opposite tension springs for pushing the opposite locking cleats downward to oppositely double-lock the post and the canopy system, in place. The radial teeth are molded to the stanchion base. To operate the system, lift the U-shaped rotational lever with one finger to lift the opposite locking cleats to oppositely double-unlock them. Next, rotate the supporting post to a desired position. Then, release the U-shaped rotational lever to oppositely double-lock the opposite locking cleats between the radial teeth.

U.S. Pat. No. 8,960,210, issued 2015 Feb. 24, to John Andrew Bacik, refers to an umbrella system relating to the general protection of fixed outdoor umbrellas, especially during windy conditions. The umbrella system uses a supportive shaft equipped with a resiliently deformable region allowing omni-directional bending under wind loading. A preferred embodiment of the deformable region comprises a helical spring.

U.S. Pat. No. 9,359,785, issued 2016 Jun. 7, to Nigel M. Catt, refers to a metal post reinforcement arrangement adapted to be clamped about a broken section of a metal post, including two opposing brackets wherein when a bolt fixes one bracket to the other about the metal post the bolt divides the broken section into upper and lower portions so as to provide support and/or structural integrity when the reinforcement arrangement is clamped about the broken section and wherein each bracket has a substantially semi circular cross-sectional configuration along said bracket length that includes a longitudinal central segment terminating on opposed sides with internally directed curved edges with corresponding upwardly extended rounded shoulders that provide substantially triangular dimples on the internal side of the bracket, and wherein a peripheral flange stems out from a rounded dip from each substantially triangular dimple such that said brackets are adapted to be fixed around metal posts having different shapes.

U.S. Pat. No. 9,493,962, issued 2016 Nov. 15, to Darrel W. Eddy, demonstrates an umbrella stand is used to mount umbrellas or flags to tables, vehicles, structures, and various structures. The umbrella stand includes a mounting assembly and a rod holder. The rod holder is used to attach an umbrella or flag to the umbrella stand. The mounting assembly is used to secure the umbrella or flag to a surface. The mounting assembly includes a support plate, a first mounting plate and a first mounting fastener. The support plate is used as a base. The first mounting plate and the first mounting fastener connect to the support plate and help secure the support plate to a surface.

U.S. Pat. No. 9,624,685, issued 2017 Apr. 18, to Ian Blake Cordle, demonstrates a mount system for an umbrella which includes a base configured to be adhered to a ground surface. An attachment assembly is connected to the base. A main tube assembly is connected to the attachment assembly with a key such that the key can hold the main tube assembly to the base at any angle. An umbrella is connected to the main tube assembly.

U.S. Pat. No. 9,924,768, issued 2018 Mar. 27, to Yoel Rosenberger, defines an umbrella which has a vertical pole extending downward from the fabric region, but it also has horizontal poles extending outwards from this vertical pole. In addition, it has a plurality of further vertical poles extending downward from the horizontal poles. In this manner, the umbrella is supported by four, six, or more vertical poles. Any or all of the poles can be telescoping poles, such that they can be increased or decreased in length. The connection of the horizontal poles to a vertical pole above and/or below can also be rotatable connections which lock into place at 90 degrees, but through human force, can unlock to place the horizontal poles in parallel with a vertical pole above or below itself. In this manner, one can fold the umbrella over the poles and shorten the length and/or width of the device.

U.S. Pat. No. 9,974,366, issued 2018 May 22, to Eberhard Heim, defines a pole comprising a pole handle and a pole tip, with at least two tube portions located therebetween, which in an assembled state of the pole are connected to one another by means of insertion connections aligned along a longitudinal pole axis A. At least one of the plug connections is realized on a second tube portion by way of a form-fit and/or force-fit locking device, wherein the second tube portion has a smaller the same outer diameter than the inner diameter of a first tube portion, and which can be inserted into the first tube portion, and which can be fixed in the relative axial position by means of the form-fit locking device. On at least one of the plug connections, a tubular sleeve having a clamping element in a receiving groove is arranged between the tubular sleeve and the lower end of the first tubular portion.

U.S. Pat. No. D306,762, issued 1990 Mar. 20, to Peter Aquino, depicts an ornamental design for a windshell.

U.S. Pat. No. D518,286, issued 2006 Apr. 4, to Celso Meirelles de Oliveira Santos, depicts an ornamental design for a fixing pointer for beach umbrella.

U.S. Publication No. 20030079765, published 2003 Mar. 1, by Chung-Kuang Lin, reveals a multiple-fold automatic umbrella which includes: a central shaft, a rib assembly including a top rib, a stretcher rib, at least an intermediate rib and a tail rib pivotally connected one another and pivotally connected to the central shaft, an opening spring, a plurality of closing springs and a control device for controlling the opening and closing of the umbrella; with the intermediate rib formed by extrusion molding process to have a cross section of two-lobe shape having an inner joint and an outer joint respectively connected on opposite ends of the intermediate rib for pivotally connecting inner and outer ribs of the rib assembly for obtaining a light-weight and proper strength of the rib assembly.

U.S. Publication No. 20040035452, published 2004 Feb. 26, by Joen-Shen Ma, reveals an umbrella which includes a center post having upper and lower sections pivotally connected together. A crown is mounted to the upper section. A number of ribs are pivoted to and radially extend from the crown. A runner is movably mounted to the center post. A stretcher is arranged between and pivoted to the runner and each rib. A canopy is attached to and supported by the ribs. A worm-gear based driving system converts the rotation of the worm caused by manual operation into linear movement of a nut engaging a threaded shaft of the gear. A link is arranged between and pivoted to the nut and the upper section whereby the linear movement of the nut drives the link to swivel the upper section relative to the lower section about the pivotal connection between the upper and lower sections. The worm-gear based driving system may also be employed to move the runner with respect to the center post for opening/closing the umbrella. The runner has a projection extending through an axially-extending slit defined in the center post and having an inner-threaded member engaging a threaded shaft of the gear whereby the rotation of the worm is converted into linear movement of the inner-threaded member and the runner with respect to the center post for opening/closing the umbrella.

DISADVANTAGES OF THE PRIOR ART

The prior art have failed to solve many problems associated with such canopy umbrellas, as follows:

1) No prior art mention or disclose any canopy umbrella, having first conjoined-double-coil caps 134a.

Therefore, the prior art of canopy umbrella:
   a) Can not allow manufacturers to divide long ribs into shorter first ring-canopy-supporting ribs 132 and shorter second ring-canopy-supporting ribs 133a to reduce the length and volume of the shipping package of the multi-angle multi-function umbrella in a shipping container to save money from expensive shipping costs (see FIG. 1A (Prior Art), FIG. 1B, FIG. 3B, and FIG. 3C);
   b) Can not connect first ring-canopy-supporting ribs 132 to second ring-canopy-supporting ribs 133a, to provide strength and structure to the multi-angle multi-function umbrella (see FIG. 10A and FIG. 10B); and
   c) Can not allow the multi-angle multi-function umbrella to be configured in multiple arrangements, to provide multiple privacy and protection options (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

2) No prior art mention or disclose any canopy umbrella, having first conjoined-double-coil axles 134b.

Therefore, the prior art of canopy umbrella:
  a) Can not pivotably connect first conjoined-double-coil caps 134a to first ring-canopy-supporting ribs 132 and second ring-canopy-supporting ribs 133a
    to allow the canopy to be configured in multiple ways
    (see FIG. 10A and FIG. 10B); and
  b) Can not allow the multi-angle multi-function umbrella to be configured in multiple arrangements,
    to provide multiple privacy and protection options
    (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

3) No prior art mention or disclose any canopy umbrella, having first conjoined-double-coil springs 134c.

Therefore, the prior art of canopy umbrella:
  a) Can not springingly pivot first ring-canopy-supporting ribs 132 and second ring canopy-supporting ribs 133a
    to help lock first ring-canopy-supporting ribs 132 and second ring canopy-supporting ribs 133a
    to provide safety and security to occupants
    (see FIG. 10C and FIG. 10D); and
  b) Can not allow the multi-angle multi-function umbrella to be configured in multiple arrangements,
    to provide multiple privacy and protection options
    (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

4) No prior art mention or disclose any canopy umbrella, having
second conjoined-double-coil caps 134d.

Therefore, the prior art of canopy umbrella:
  a) Can not allow manufacturers to fold long ribs into shorter second ring-canopy supporting ribs 133a and shorter third ring-canopy-supporting ribs 133b
    to reduce the length and volume of the shipping package of the multi-angle multi-function umbrella in a shipping container to save money from expensive shipping costs
    (see FIG. 1A (Prior Art), FIG. 1B, FIG. 3B, and FIG. 3C);
  b) Can not connect second ring-canopy-supporting ribs 133a to third ring-canopy-supporting ribs 133b,
    to provide strength and structure to the multi-angle multi-function umbrella
    (see FIG. 10A and FIG. 10B); and
  c) Can not allow multi-function umbrella to be configured in multiple arrangements,
    to provide multiple privacy and protection options
    (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

5) No prior art mention or disclose any canopy umbrella, having second conjoined-double-coil axles 134e.

Therefore, the prior art of canopy umbrella:
  a) Can not pivotably connect second conjoined-double-coil caps 134d to second ring-canopy-supporting ribs 133a and third ring-canopy-supporting ribs 133b
    to allow the canopy to be configured in multiple ways
    (see FIG. 10A and FIG. 10B); and
  b) Can not allow the multi-angle multi-function umbrella to be configured in multiple arrangements,
    to provide multiple privacy and protection options
    (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

6) No prior art mention or disclose any canopy umbrella, having second conjoined-double-coil springs 134f.

Therefore, the prior art of canopy umbrella:
  a) Can not springingly pivot second ring-canopy-supporting ribs 133a and third ring canopy-supporting ribs 133b
    to help lock second ring-canopy-supporting ribs 133a and third ring canopy-supporting ribs 133b
    to provide safety and security to occupants
    (see FIG. 10C and FIG. 10D); and
  b) Can not allow the multi-angle multi-function umbrella to be configured in multiple arrangements,
    to provide multiple privacy and protection options
    (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

7) No prior art mention or disclose any canopy umbrella, having a first inner core 110a.

Therefore, the prior art of canopy umbrella:
  a) Can not allow lower post 108 and middle post 109a
    to angledly configure the multi-angle multi-function umbrella
    to increase functionality by providing additional configuration options
    (see FIG. 4A, FIG. 4B, FIG. 4C, FIG. 4D, FIG. 16A, FIG. 16E, FIG. 16F, and FIG. 16G);
  b) Can not allow manufacturers to divide a long post into shorter lower post 108, shorter middle post 109a, and shorter upper post 109b
    to reduce the length and volume of the shipping package of the multi-angle multi-function umbrella in a shipping container to save money from expensive shipping costs
    (see FIG. 1A (Prior Art) and FIG. 1B);
  c) Can not mount middle post 109a on lower post 108,
    to strengthen post
    (see FIG. 4B);
  d) Can not mount middle post 109a on a fence,
    to provide shade and protection when a fence is accessible
    (see FIG. 19E);
  e) Can not mount middle post 109a on a balcony,
    to provide shade and protection when a balcony is accessible
    (see FIG. 20E);

f) Can not mount middle post 109*a* on a bumper,
  to provide shade and protection when a bumper is accessible
  (see FIG. 19B);
g) Can not mount middle post 109*a* on a hitch,
  to provide shade and protection when a hitch is accessible
  (see FIG. 19C);
h) Can not mount middle post 109*a* on a tailgate,
  to provide shade and protection when a tailgate is accessible
  (see FIG. 19A);
i) Can not mount middle post 109*a* on a table,
  to provide shade and protection when a table is accessible
  (see FIG. 19D);
j) Can not mount middle post 109*a* on a column,
  to provide shade and protection when a column is accessible
  (see FIG. 19F); and
k) Can not mount middle post 109*a* on a wall,
  to provide shade and protection when a wall is accessible
  (see FIG. 20A).

8) No prior art mention or disclose any canopy umbrella, having a second inner core 110*b*.
Therefore, the prior art of canopy umbrella:
  a) Can not allow middle post 109*a* and upper post 109*b*
    to angledly configure the multi-angle multi-function umbrella
      to increase functionality by providing additional configuration options
      (see FIG. 4A, FIG. 4B, FIG. 4C, FIG. 16A, FIG. 16E, FIG. 16F, and FIG. 16G);
  b) Can not allow manufacturers to divide a long post into shorter middle post 109*a* and shorter upper post 109*b*
      to reduce the length and volume of the shipping package of the multi-angle multi-function umbrella in a shipping container to save money from expensive shipping costs
      (see FIG. 1A (Prior Art) and FIG. 1B);
  c) Can not mount upper post 109*b* on middle post 109*a*, *to strengthen post*
      (see FIG. 4B);
  d) Can not mount upper post 109b on a fence,
      to provide shade and protection when a fence is accessible
      (see FIG. 19E);
  e) Can not mount upper post 109*b* on a balcony,
      to provide shade and protection when a balcony is accessible
      (see FIG. 20E);
  f) Can not mount upper post 109*b* on a bumper,
      to provide shade and protection when a bumper is accessible
      (see FIG. 19B);
  g) Can not mount upper post 109*b* on a hitch,
      to provide shade and protection when a hitch is accessible
      (see FIG. 19C);
  h) Can not mount upper post 109*b* on a tailgate,
      to provide shade and protection when a tailgate is accessible
      (see FIG. 19A);
  i) Can not mount upper post 109*b* on a table,
      to provide shade and protection when a table is accessible
      (see FIG. 19D);
  j) Can not mount upper post 109*b* on a column,
      to provide shade and protection when a column is accessible
      (see FIG. 19F); and
  k) Can not mount upper post 109*b* on a wall,
      to provide shade and protection when a wall is accessible
      (see FIG. 20A).

9) No prior art mention or disclose any canopy umbrella, having core-securing bolts 111.
Therefore, the prior art of canopy umbrella:
  a) Can not secure together lower post 108, upper post 109*a*, upper post 109*b*, and first and second inner core 110*a* and 110*b*,
      to provide to provide height and strength to the multi-angle multi-function water-collector wind-blocker privacy-screen awning canopy space-saver umbrella
      (see FIG. 4A); and
  b) Can not secure first and second inner cores 110*a* and 110*b* to a fence, a balcony, a bumper, a hitch, a tailgate, a table, a column, and a wall,
      to allow for multiple options of shade and protection
      (see FIG. 19E, FIG. 20F, FIG. 18A, FIG. 19C, FIG. 19A, FIG. 19D, FIG. 19F, and FIG. 20D).

10) No prior art mention or disclose any canopy umbrella, having a mounting plate 104.
Therefore, the prior art of canopy umbrella:
  a) Can not mount the multi-angle multi-function umbrella on first post-stabilizing foot 102 and second post-stabilizing foot 103,
      to stabilize the multi-function umbrella from tipping over
      (see FIG. 2);
  b) Can not mount the multi-angle multi-function umbrella on a fence,
      to provide shade and protection when a fence is accessible
      (see FIG. 18D);
  c) Can not mount the multi-angle multi-function umbrella on a balcony,
      to provide shade and protection when a balcony is accessible
      (see FIG. 20F);
  d) Can not mount the multi-angle multi-function umbrella on a bumper,
      to provide shade and protection when a bumper is accessible
      (see FIG. 18A);
  e) Can not mount the multi-angle multi-function umbrella on a hitch,
      to provide shade and protection when a hitch is accessible
      (see FIG. 19C);
  f) Can not mount the multi-angle multi-function umbrella on a tailgate,
      to provide shade and protection when a tailgate is accessible
      (see FIG. 18B); and
  g) Can not mount the multi-angle multi-function umbrella on a table,
      to provide shade and protection when a table is accessible
      (see FIG. 18C)

11) No prior art mention or disclose any canopy umbrella, having four wedging plates 105.
   Therefore, the prior art of canopy umbrella:
   a) Can not slidably hook multiple wedging plates of other multi-angle multi-function umbrella
      to secure four wedging plates 105 to the other space-saver umbrella
      in the directions of arrows 141*a* and 141*b*,
      to provide various configuration options and additional shade and protection
      (see FIG. 21A, FIG. 21B, FIG. 21C, FIG. 21D, FIG. 21E, FIG. 21F, and FIG. 21G);
   b) Can not slidably hook up to the two adjacent slats of a fence
      to secure four wedging plates 105 to the fence
      to prevent the multi-angle multi-function umbrella from moving or falling over
      (see FIG. 12); and
   c) Can not slidably wedge between the two planks of a patio or deck
      to secure four wedging plates 105 to the patio or deck
      to prevent the multi-angle multi-function umbrella from moving or falling over
      (see FIG. 13 and FIG. 14).

12) No prior art mention or disclose any canopy umbrella, having central-canopy-rib-supporting arms 128.
   Therefore, the prior art of canopy umbrella:
   a) Can not support central-canopy-supporting ribs 127,
      to provide central canopy 129 structural support
      (see FIG. 9A and FIG. 9B);
   b) Can not hingedly connect central-canopy-supporting ribs 127 and first ring-canopy-supporting ribs 132,
      to provide structural support
      (see FIG. 9A and FIG. 9B); and
   c) Can not hingedly connect central-canopy-supporting ribs 127 and first ring-canopy-supporting ribs 132,
      to help make folding the multi-angle multi-function umbrella easier
      (see FIG. 9A and FIG. 9B).

13) No prior art mention or disclose any canopy umbrella, having central canopy 129.
   Therefore, the prior art of canopy umbrella:
   a) Can not function as a water collector
      to collect rain water when used upside down in the directions of arrows 142 and 143
      (see FIG. 16A);
   b) Can not function as a wind blocker
      to block wind
      (see FIG. 20D);
   c) Can not function as a privacy screen
      to provide privacy
      (see FIG. 20E);
   d) Can not function as a awning
      to angledly block rain and sun beams
      (see FIG. 20A);
   e) Can not function as a canopy
      to vertically block rain and sun beams
      (see FIG. 2011);
   f) Can not function as a wind redirector
      to redirect wind in and out of canopy
      in the directions of arrows 144, 145, 146, 147, and 148
      (see FIG. 16B, FIG. 16C, and FIG. 16D); and
   g) Can not function as a wind resistor
      to protect the canopy from blowing when corners are attached to ground with ropes and stakes
      in the direction of arrow 149
      (see FIG. 16D).

14) No prior art mention or disclose any canopy umbrella, having ring canopy 137.
   Therefore, the prior art of canopy umbrella:
   a) Can not function as a water collector
      to collect rain water when used upside down in the directions of arrows 142 and 143
      (see FIG. 16A);
   b) Can not function as a wind blocker
      to block wind
      (see FIG. 20D);
   c) Can not function as a privacy screen
      to provide privacy
      (see FIG. 19F);
   d) Can not function as an awning
      to angledly block rain and sun beams
      (see FIG. 20B);
   e) Can not function as a canopy
      to vertically block rain and sun beams
      (see FIG. 20F);
   f) Can not function as a wind redirector
      to redirect wind in and out of canopy
      in the directions of arrows 144, 145, 146, 147, and 148
      (see FIG. 16B, FIG. 16C, and FIG. 16D); and
   g) Can not function as a wind resistor
      to protect the canopy from blowing when corners are attached to ground with ropes and stakes
      in the direction of arrow 149
      (see FIG. 16D).

15) No prior art mention or disclose any canopy umbrella, having canopy-size-adjusting flaps 139.
   Therefore, the prior art of canopy umbrella:
      Can not adjustably be attached to first ring-canopy-supporting ribs 132, respectively
         to adjust ring canopy 137 to multiple different sizes
         (see FIG. 11A and FIG. 11B).

16) No prior art mention or disclose any canopy umbrella, having canopy-size-adjusting holes 140.
   Therefore, the prior art of canopy umbrella:
      Can not screw together first ring-canopy-supporting ribs 132 and canopy-size-adjusting flaps 139
         to adjust ring canopy 137 to multiple different sizes
         (see FIG. 11A and FIG. 11B).

OBJECTS AND ADVANTAGES OF THE INVENTION

The present invention substantially departs from the conventional concepts and designs of the prior art. In doing so, the present invention provides a multi-angle multi-function umbrella (having: 1) Multi-function fence-mountable balcony-mountable bumper-mountable hitch-mountable base system, 2) Multi-function fence-mountable balcony-mountable bumper-mountable hitch-mountable post system, 3) Height-adjusting angle-adjusting multi-canopy-deploying system, 4) Adjustable water-collector wind-blocker privacy-screen double-awning central canopy system, and 5) Adjustable water-collector wind-blocker privacy-screen double-awning multi-angle ring canopy system) having many unique and significant features, functions, and advantages, which overcome all the disadvantages of the prior art, as follows:

1) It is yet another object of the new invention to provide a multi-angle multi-function umbrella, having
   first conjoined-double-coil caps 134*a*.

Therefore, the multi-angle multi-function umbrella:
  a) Can allow manufacturers to divide long ribs into shorter first ring-canopy-supporting ribs 132 and shorter second ring-canopy-supporting ribs 133*a*
     to reduce the length and volume of the shipping package of the multi-angle multi-function umbrella in a shipping container to save money from expensive shipping costs
     (see FIG. 1A (Prior Art) and FIG. 1B);
  b) Can connect first ring-canopy-supporting ribs 132 to second ring-canopy-supporting ribs 133*a*,
     to provide strength and structure to the multi-angle multi-function umbrella
     (see FIG. 10A and FIG. 10B); and
  c) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

2) It is still yet another object of the new invention to provide a multi-angle multi-function umbrella, having first conjoined-double-coil axles 134*b*.
Therefore, the multi-angle multi-function umbrella:
  a) Can pivotably connect first conjoined-double-coil caps 134*a* to first ring-canopy-supporting ribs 132 and second ring-canopy-supporting ribs 133*a*
     to allow the canopy to be configured in multiple ways
     (see FIG. 10A and FIG. 10B); and
  b) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

3) It is even yet another object of the new invention to provide a multi-angle multi-function umbrella, having first conjoined-double-coil springs 134*c*.
Therefore, the multi-angle multi-function umbrella:
  a) Can springingly pivot first ring-canopy-supporting ribs 132 and second ring canopy-supporting ribs 133*a*
     to help lock first ring-canopy-supporting ribs 132 and second ring canopy-supporting ribs 133*a*
     to provide safety and security to occupants
     (see FIG. 10C and FIG. 10D); and
  b) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

4) It is yet another object of the new invention to provide a multi-angle multi-function umbrella, having second conjoined-double-coil caps 134*d*.
Therefore, the multi-angle multi-function umbrella:
  a) Can allow manufacturers to fold long ribs into shorter second ring-canopy supporting ribs 133*a* and shorter third ring-canopy-supporting ribs 133*b*
     to reduce the length and volume of the shipping package of the multi-angle multi-function umbrella in a shipping container to save money from expensive shipping costs
     (see FIG. 1A (Prior Art), FIG. 1B, FIG. 3B, and FIG. 3C);
  b) Can connect second ring-canopy-supporting ribs 133*a* to third ring-canopy-supporting ribs 133*b*,
     to provide strength and structure to the multi-angle multi-function umbrella
     (see FIG. 10A and FIG. 10B); and
  c) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

5) It is still yet another object of the new invention to provide a multi-angle multi-function umbrella, having second conjoined-double-coil axles 134*e*.
Therefore, the multi-angle multi-function umbrella:
  a) Can pivotably connect second conjoined-double-coil caps 134*d* to second ring-canopy-supporting ribs 133*a* and third ring-canopy-supporting ribs 133*b*
     to allow the canopy to be configured in multiple ways
     (see FIG. 10A and FIG. 10B); and
  b) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

6) It is even yet another object of the new invention to provide a multi-angle multi-function umbrella, having second conjoined-double-coil springs 134*f*.
Therefore, the multi-angle multi-function umbrella:
  a) Can springingly pivot second ring-canopy-supporting ribs 133*a* and third ring canopy-supporting ribs 133*b*
     to help lock second ring-canopy-supporting ribs 133*a* and third ring canopy-supporting ribs 133*b*
     to provide safety and security to occupants
     (see FIG. 10C and FIG. 10D); and
  b) Can allow the multi-angle multi-function umbrella to be configured in multiple arrangements,
     to provide multiple privacy and protection options
     (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

7) It is still another object of the new invention to provide a multi-angle multi-function umbrella, having a first inner core 110*a*.
Therefore, the multi-angle multi-function umbrella:
  a) Can allow lower post 108 and middle post 109*a* to angledly configure the multi-angle multi-function umbrella
     to increase functionality by providing additional configuration options
     (see FIG. 4A, FIG. 4B, FIG. 4C, FIG. 4D, FIG. 16A, FIG. 16E, FIG. 16F, and FIG. 16G);

b) Can allow manufacturers to divide a long post into shorter lower post 108, shorter middle post 109*a*, and shorter upper post 109*b*
  to reduce the length and volume of the shipping package of the multi-angle multi-function umbrella in a shipping container to save money from expensive shipping costs
  (see FIG. 1A (Prior Art) and FIG. 1B);
c) Can mount middle post 109a on lower post 108,
  to strengthen post
  (see FIG. 4B);
d) Can mount middle post 109*a* on a fence,
  to provide shade and protection when a fence is accessible
  (see FIG. 19E);
e) Can mount upper post 109*a* on a balcony,
  to provide shade and protection when a balcony is accessible
  (see FIG. 20E);
f) Can mount upper post 109*a* on a bumper,
  to provide shade and protection when a bumper is accessible
  (see FIG. 19B);
g) Can mount upper post 109*a* on a hitch,
  to provide shade and protection when a hitch is accessible
  (see FIG. 19C);
h) Can mount upper post 109*a* on a tailgate,
  to provide shade and protection when a tailgate is accessible
  (see FIG. 19A);
i) Can mount upper post 109*a* on a table,
  to provide shade and protection when a table is accessible
  (see FIG. 19D);
j) Can mount upper post 109*a* on a column,
  to provide shade and protection when a column is accessible
  (see FIG. 19F); and
k) Can mount upper post 109*a* on a wall,
  to provide shade and protection when a wall is accessible
  (see FIG. 20A).

8) It is still another object of the new invention to provide a multi-angle multi-function umbrella, having
  a second inner core 110*b*.
  Therefore, the multi-angle multi-function umbrella:
    a) Can allow middle post 109*a* and upper post 109*b* to angledly configure the multi-angle multi-function umbrella
      to increase functionality by providing additional configuration options
      (see FIG. 4A, FIG. 4B, FIG. 4C, FIG. 16A, FIG. 16E, FIG. 16F, and FIG. 16G);
    b) Can allow manufacturers to divide a long post into shorter middle post 109*a* and shorter upper post 109*b*
      to reduce the length and volume of the shipping package of the multi-angle multi-function umbrella in a shipping container to save money from expensive shipping costs
      (see FIG. 1A (Prior Art) and FIG. 1B);
    c) Can mount upper post 109*b* on middle post 109*a*,
      to strengthen post
      (see FIG. 4B);
    d) Can mount middle post 109*b* on a fence,
      to provide shade and protection when a fence is accessible
      (see FIG. 19E);
    e) Can mount upper post 109*b* on a balcony,
      to provide shade and protection when a balcony is accessible
      (see FIG. 20E);
    f) Can mount upper post 109*b* on a bumper,
      to provide shade and protection when a bumper is accessible
      (see FIG. 19B);
    g) Can mount upper post 109*b* on a hitch,
      to provide shade and protection when a hitch is accessible
      (see FIG. 19C);
    h) Can mount upper post 109*b* on a tailgate,
      to provide shade and protection when a tailgate is accessible
      (see FIG. 19A);
    i) Can mount upper post 109*b* on a table,
      to provide shade and protection when a table is accessible
      (see FIG. 19D);
    j) Can mount upper post 109*b* on a column,
      to provide shade and protection when a column is accessible
      (see FIG. 19F); and
    k) Can mount upper post 109*b* on a wall,
      to provide shade and protection when a wall is accessible
      (see FIG. 20A).

9) It is a further object of the new invention to provide a multi-angle multi-function umbrella, having
  core-securing bolts 111.
  Therefore, the multi-angle multi-function umbrella:
    a) Can secure together lower post 108, upper post 109*a*, upper post 109*b*, and first and second inner core 110*a* and 110*b*,
      to provide to provide height and strength to the multi-angle multi-function umbrella
      (see FIG. 4A); and
    b) Can secure first and second inner cores 110*a* and 110*b* to a fence, a balcony, a bumper, a hitch, a tailgate, a table, a column, and a wall,
      to allow for multiple options of shade and protection
      (see FIG. 19E, FIG. 20F, FIG. 18A, FIG. 19C, FIG. 19A, FIG. 19D, FIG. 19F, and FIG. 20D).

10) It is an object of the new invention to provide a multi-angle multi-function umbrella, having a mounting plate 104.
  Therefore, the multi-angle multi-function umbrella:
    a) Can mount the multi-angle multi-function umbrella on first post-stabilizing foot 102 and second post-stabilizing foot 103,
      to stabilize the multi-angle multi-function umbrella from tipping over
      (see FIG. 2);
    b) Can mount the multi-angle multi-function umbrella on a fence,
      to provide shade and protection when a fence is accessible
      (see FIG. 18D);
    c) Can mount the multi-angle multi-function umbrella on a balcony,
      to provide shade and protection when a balcony is accessible
      (see FIG. 20F);
    d) Can mount the multi-angle multi-function umbrella on a bumper, to provide shade and protection when a bumper is
accessible
(see FIG. 18A);
e) Can mount the multi-angle multi-function umbrella
on a hitch,
to provide shade and protection when a hitch is
accessible
(see FIG. 19C);
f) Can mount the multi-angle multi-function umbrella
on a tailgate,
to provide shade and protection when a tailgate is
accessible
(see FIG. 18B); and
g) Can mount the multi-angle multi-function umbrella
on a table,
to provide shade and protection when a table is
accessible
(see FIG. 18C).

11) It is another object of the new invention to provide a multi-angle multi-function umbrella, having
four wedging plates 105.
Therefore, the multi-angle multi-function umbrella:
a) Can slidably hook multiple multi-base-connecting fence-wedging deck- wedging plates of other multi-angle multi-function umbrellas
to secure four wedging plates 105 to the other space-saver umbrellas
in the directions of arrows 141a and 141b,
to provide various configuration options for additional shade and protection
(see FIG. 21A, FIG. 21B, FIG. 21C, FIG. 21D, FIG. 21E, FIG. 21F, and FIG. 21G);
b) Can slidably hook up to the two adjacent slats of a fence
to secure four wedging plates 105 to the fence
to prevent the multi-angle multi-function umbrella from moving or falling over
(see FIG. 12); and
c) Can slidably wedge between the two planks of a patio or deck
to secure four wedging plates 105 to the patio or deck
to prevent the multi-angle multi-function umbrella from moving or falling over
(see FIG. 13 and FIG. 14).

12) It is an even further object of the new invention to provide a multi-angle multi-function umbrella, having
central-canopy-rib-supporting arms 128.
Therefore, the multi-angle multi-function umbrella:
a) Can support central-canopy-supporting ribs 127, to provide central canopy 129 structural support
(see FIG. 9A and FIG. 9B);
b) Can hingedly connect central-canopy-supporting ribs 127 and first ring-canopy-supporting ribs 132, to provide structural support
(see FIG. 9A and FIG. 9B); and
c) Can hingedly connect central-canopy-supporting ribs 127 and first ring-canopy-supporting ribs 132,
to help make folding the multi-angle multi-function umbrella easier
(see FIG. 9A and FIG. 9B).

13) It is still another object of the new invention to provide a multi-angle multi-function umbrella, having
central canopy 129.
Therefore, the multi-angle multi-function umbrella:
a) Can function as a water collector
to collect rain water when used upside down in the directions of arrows 142 and 143
(see FIG. 16A);
b) Can function as a wind blocker
to block wind
(see FIG. 20D);
c) Can function as a privacy screen
to provide privacy
(see FIG. 20E);
d) Can function as a awning
to angledly block rain and sun beams
(see FIG. 20A);
e) Can function as a canopy
to vertically block rain and sun beams
(see FIG. 20H);
f) Can function as a wind redirector
to redirect wind in and out of canopy
in the directions of arrows 144, 145, 146, 147, and 148
(see FIG. 16B, FIG. 16C, and FIG. 16D); and
g) Can function as a wind resistor
to protect the canopy from blowing when corners are attached to ground with ropes and stakes
in the direction of arrow 149
(see FIG. 16D).

14) It is still further yet another object of the new invention to provide a multi-angle multi-function umbrella, having
ring canopy 137.
Therefore, the multi-angle multi-function umbrella:
a) Can function as a water collector
to collect rain water when used upside down in the directions of arrows 142 and 143
(see FIG. 16A);
b) Can function as a wind blocker
to block wind
(see FIG. 20D);
c) Can function as a privacy screen
to provide privacy
(see FIG. 19F);
d) Can function as an awning
to angledly block rain and sun beams
(see FIG. 20B);
e) Can function as a canopy
to vertically block rain and sun beams
(see FIG. 20F);
f) Can function as a wind redirector
to redirect wind in and out of canopy in the directions of arrows 144, 145, 146, 147, and 148
(see FIG. 16B, FIG. 16C, and FIG. 16D); and
g) Can function as a wind resistor
to protect the canopy from blowing when corners are attached to ground with ropes and stakes
in the direction of arrow 149
(see FIG. 16D).

15) It is even still further yet another object of the new invention to provide a multi-angle multi-function umbrella, having
canopy-size-adjusting flaps 139.
Therefore, the multi-angle multi-function umbrella:
Can adjustably be attached to first ring-canopy-supporting ribs 132, respectively
to adjust ring canopy 137 to multiple different sizes
(see FIG. 11A and FIG. 11B).

16) It is even further yet still another object of the new invention to provide a multi-angle multi-function umbrella, having
canopy-size-adjusting holes 140.

Therefore, the multi-angle multi-function umbrella:
    Can screw together first ring-canopy-supporting ribs
        132 and canopy-size-adjusting flaps 139
        to adjust ring canopy 137 to multiple different sizes
            (see FIG. 11A and FIG. 11B).

Other objects and advantages of the present invention will become apparent from a consideration of the accompanying drawings and ensuing description.

SUMMARY OF THE INVENTION

A multi-angle multi-function umbrella comprises: a first post-stabilizing foot, a second post-stabilizing foot, a mounting plate bolted to the first and the second post-stabilizing feet for mounting the multi-function umbrella on a fence and a balcony and a bumper and a hitch and a tailgate and a table, a lower post attached to the plate, an upper post, a middle post, a first inner core inserted into the lower and the middle posts for dividing the lower post into shorter ones to reduce the length and volume of shipping package and for mounting the multi-angle multi-function umbrella on a fence and a balcony and a bumper and a hitch and a tailgate and a table and a column and a wall, a second inner core inserted into the middle and the upper posts for dividing the upper post into shorter ones to reduce the length and volume of shipping package and for mounting the multi-function umbrella on a fence and a balcony and a bumper and a hitch and a tailgate and a table and a column and a wall, a multi-canopy-hanging central tube, a multi-canopy-deploying spool, a multi-canopy-deploying crank rotatably attached to the multi-canopy-deploying spool, a multi-canopy-deploying rope threaded through the multi-canopy-hanging central tube, a plurality of central-canopy-supporting ribs a plurality of central-canopy-rib-raising arms respectively pivotably attached to the central-canopy-supporting ribs, an central canopy attached to the central-canopy-supporting ribs for functioning as a water collector and a wind blocker and a privacy screen and an awning and a canopy and a wind redirector and a wind resistor, a plurality of first ring-canopy-supporting ribs respectively pivotably connected to the ring-canopy-rib intersector, and pivotably attached to the central-canopy-rib-raising arms, a plurality of second ring-canopy-supporting ribs, a plurality of third ring-canopy-supporting ribs, a plurality of first rib-connecting conjoined-double-coil caps respectively pivotably connected to the first and the second ring-canopy-supporting ribs for dividing the first and the second ring-canopy-supporting ribs into shorter ones to reduce the length and volume of shipping package and to provide multiple privacy and protection options, a plurality of second conjoined-double-coil caps respectively pivotably connected to the second and the third ring-canopy-supporting ribs for dividing the second and the third ring-canopy-supporting ribs into shorter ones to reduce the length and volume of shipping package and to provide multiple privacy and protection options, a plurality of ring-canopy-rib-raising arms respectively foldably attached to the ring-canopy-arm intersector, an ring canopy attached to the first ring-canopy-supporting ribs and the second ring-canopy-supporting ribs for functioning as a water collector and a wind blocker and a privacy screen and an awning and a canopy and a wind redirector and a wind resistor, a plurality of canopy-size-adjusting flaps respectively sewn to the inner edges of the ring canopy for adjustably being attached to the first ring-canopy-supporting ribs, respectively to adjust the ring canopy to multiple different sizes.

BRIEF DESCRIPTION OF THE DRAWINGS

FIG. 2 illustrates a perspective view of first post-stabilizing foot, second post-stabilizing foot, mounting plate, and four wedging plates.

FIG. 3A, FIG. 3B, and FIG. 3C illustrate cross-sectional and side views of the first mounting inner core and second mounting inner core and how the multi-angle multi-function umbrella with second and third ring-canopy-supporting ribs folds inward.

FIG. 4C and FIG. 4D illustrate cross-sectional and side views of the first mounting inner core and second mounting inner core and how they connect the lower post, middle post, and upper post together in different configuations.

FIG. 5 illustrates a perspective view of how the upper post, slidable multi-position handle, foldable multi-canopy-supporting arm, and foldable multi-canopy-lifting arm are connected.

FIG. 6 illustrates a side view of the slidable multi-position handle with the height-adjusting spring-loaded rocker, handle-locking rocker pin, multi-canopy-deploying spool, multi-canopy-deploying crank, and multi-canopy-deploying rope.

FIG. 9A and FIG. 9B illustrate perspective views of how first ring-canopy-supporting ribs and second ring-canopy-supporting ribs are connected.

FIG. 10A, FIG. 10B, FIG. 10C, and FIG. 10D illustrate how the first ring-canopy-supporting ribs, the second ring-canopy-supporting ribs, and third ring-canopy-supporting ribs are connected using rib-connecting conjoined-double-coil caps, axles, and springs.

FIG. 12 illustrates how one of the four wedging plates can be wedged behind and underneath the slats of a fence to lock the multi-angle multi-function umbrella to the fence.

FIG. 16A illustrates a side view of how the central canopy and ring canopy can be used for collecting rain water.

FIG. 16B and FIG. 16C illustrate front views of how the central canopy and ring canopy can be used for redirecting the wind.

FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A illustrate front views of different configurations of the first, second, and third ring-canopy-supporting ribs when used with the conjoined-double-coil caps, conjoined-double-coil axles, and conjoined-double-coil springs.

FIG. 17B, FIG. 17C, and FIG. 17D illustrate side views of how the adjustable water-collector wind-blocker privacy-screen double-awning central canopy system and adjustable water-collector wind-blocker privacy-screen double-awning multi-angle ring canopy system are lifted up when the slidable multi-position handle is slid down the upper post.

FIG. 18A, FIG. 18B, FIG. 18C, FIG. 18D, FIG. 18E, and FIG. 18F illustrate side views of how the multi-angle multi-function umbrella can be mounted to various structures using the mounting plate.

FIG. 19A, FIG. 19B, FIG. 19C, FIG. 19D, FIG. 19E, FIG. 19F, and FIG. 19G illustrate side views of how the multi-angle multi-function umbrella can be mounted to various structures using the first mounting inner core.

FIG. 21A, FIG. 21B, FIG. 21C, FIG. 21D, FIG. 21E, FIG. 21F, and FIG. 21G illustrate side and top down views of how to lock the four wedging plates of multiple multi-angle multi-function umbrellas together to create multiple different configurations for different purposes and events.

DETAILED DESCRIPTION OF THE INVENTION

Figure 1A:
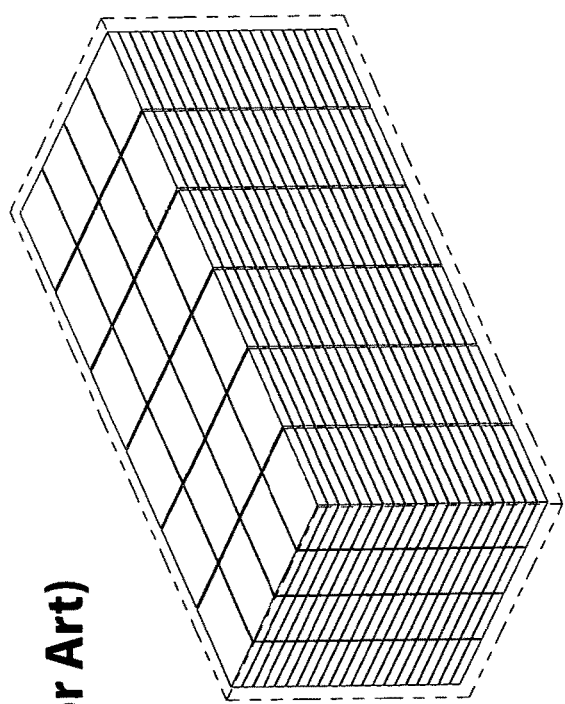
FIG. 1A (Prior Art) and FIG. 1B illustrate perspective views of the full amount of space inside a shipping container the prior art takes to ship, as opposed to a lot of less space taken by the multi-angle multi-function umbrella.

The multi-angle multi-function umbrella comprises:
1) Multi-function fence-mountable balcony-mountable bumper-mountable hitch-mountable base system,
2) Multi-function fence-mountable balcony-mountable bumper-mountable hitch-mountable post system,
3) Height-adjusting angle-adjusting multi-canopy-deploying system,
4) Adjustable water-collector wind-blocker privacy-screen double-awning central canopy system, and
5) Adjustable water-collector wind-blocker privacy-screen double-awning multi-angle ring canopy system.

Component
Referring to FIG. 2, FIG. 3A, FIG. 3B, FIG. 3C, FIG. 4A, FIG. 4B, FIG. 4C, FIG. 4D, FIG. 5, FIG. 6, FIG. 7, FIG. 8, FIG. 9A, FIG. 9B, FIG. 10A, FIG. 10B, FIG. 10C, FIG. 10D, FIG. 11A, and FIG. 11B, the multi-angle multi-function umbrella comprises:

1) Multi-function fence-mountable balcony-mountable bumper-mountable hitch-mountable base system 101 comprising:
2) First post-stabilizing foot 102,
3) Second post-stabilizing foot 103,
4) Mounting plate 104,
5) Four wedging plates 105,
6) Four base-stabilizing weights 106;
7) Multi-function fence-mountable balcony-mountable bumper-mountable hitch-mountable post system 107 comprising:
8) Lower post 108,
9) Middle post 109*a*,
Upper post 109*b*,
10) First inner core 110*a*,
Second inner core 110*b*,
Post-height-adjusting holes 110*c*,
11) Core-securing bolts 111;
12) Height-adjusting angle-adjusting multi-canopy-deploying system 112 comprising:
13) Multi-canopy-lifting-arm intersector 113,
14) Multi-canopy-supporting-arm intersector 114,
15) Slidable multi-position handle 115,
16) Height-adjusting spring-loaded rocker 116,
17) Handle-locking rocker pin 117,
18) Handle-locking post holes 118,
19) Foldable multi-canopy-supporting arm 119,
20) Foldable multi-canopy-lifting arm 120,
21) Multi-canopy-hanging central tube 121,
22) Multi-canopy-deploying spool 122,
23) Multi-canopy-deploying crank 123,
24) Multi-canopy-deploying rope 124;
25) Adjustable water-collector wind-blocker privacy-screen double-awning central canopy system 125 comprising:
26) Central-canopy intersector 126,
27) Central-canopy-supporting ribs 127,
28) Central-canopy-rib-raising arms 128,
29) Central canopy 129;
30) Adjustable water-collector wind-blocker privacy-screen double-awning multi-angle ring canopy system 130 comprising:
31) Ring-canopy-rib intersector 131,
32) First ring-canopy-supporting ribs 132,
33) Second ring-canopy-supporting ribs 133*a*,
Third ring-canopy-supporting ribs 133*b*,
34) First conjoined-double-coil caps 134*a*,
First conjoined-double-coil axles 134*b*,
First conjoined-double-coil springs 134*c*,
Second conjoined-double-coil caps 134*d*,
Second conjoined-double-coil axles 134*e*,
Second conjoined-double-coil springs 134*f*,
35) Ring-canopy-arm intersector 135,
36) Ring-canopy-rib-raising arms 136,
37) Ring canopy 137,
38) Four zipper pockets 138,
39) Canopy-size-adjusting flaps 139,
40) Canopy-size-adjusting holes 140.

Material
Referring to FIG. 2, FIG. 3A, FIG. 3B, FIG. 3C, FIG. 4A, FIG. 4B, FIG. 4C, FIG. 4D, FIG. 5, FIG. 6, FIG. 7, FIG. 8, FIG. 9A, FIG. 9B, FIG. 10A, FIG. 10B, FIG. 10C, FIG. 10D, FIG. 11A, and FIG. 11B:

1) Multi-function fence-mountable balcony-mountable bumper-mountable hitch-mountable base system 101 is made of the combined materials of its components.
2) First post-stabilizing foot 102 is made of metallic material.
3) Second post-stabilizing foot 103 is made of metallic material.
4) Mounting plate 104 is made of metallic material.
5) Four wedging plates 105 each are made of metallic material.
6) Four base-stabilizing weights 106 each are made of plastic and/or metallic material.
7) Multi-function fence-mountable balcony-mountable bumper-mountable hitch-mountable post system 107 is made of the combined materials of its components.
8) Lower post 108 is made of metallic material.
9) Middle post 109 is made of metallic material.
Upper post 109 is made of metallic material.
10) First mounting inner core 110*a* is made of metallic material.
Second mounting inner core 110*b* is made of metallic material.
Post-height-adjusting holes 110*c* each are made of empty space.
11) Core-securing bolts 111 each are made of metallic material.
12) Height-adjusting angle-adjusting multi-canopy-deploying system 112 is made of the combined materials of its components.
13) Multi-canopy-lifting-arm intersector 113 is made of plastic material.
14) Multi-canopy-supporting-arm intersector 114 is made of plastic material.
15) Slidable multi-position handle 115 is made of plastic material.
16) Height-adjusting spring-loaded rocker 116 is made of plastic and/or metallic material.
17) Handle-locking rocker pin 117 is made of plastic and/or metallic material.
18) Handle-locking post holes 118 each are made of empty space.
19) Foldable multi-canopy-supporting arm 119 is made of metallic material.
20) Foldable multi-canopy-lifting arm 120 is made of metallic material.
21) Multi-canopy-hanging central tube 121 is made of metallic material.
22) Multi-canopy-deploying spool 122 is made of plastic and/or metallic material.
23) Multi-canopy-deploying crank 123 is made of plastic and/or metallic material.
24) Multi-canopy-deploying rope 124 is made of nylon and/or fabric material.
25) Adjustable water-collector wind-blocker privacy-screen double-awning central canopy system 125 is made of the combined materials of its components.
26) Central-canopy intersector 126 is made of plastic material.
27) Central-canopy-supporting ribs 127 each are made of metallic material.
28) Central-canopy-rib-raising arms 128 each are made of metallic material.
29) Central canopy 129 is made of nylon and/or fabric material.
30) Adjustable water-collector wind-blocker privacy-screen double-awning multi-angle ring canopy system 130 is made of the combined materials of its components.
31) Ring-canopy-rib intersector 131 is made of plastic material.
32) First ring-canopy-supporting ribs 132 each are made of metallic material.
33) Second ring-canopy-supporting ribs 133*a* each are made of metallic material.
Third ring-canopy-supporting ribs 133*b* each are made of metallic material.
34) First conjoined-double-coil caps 134*a* each are made of plastic and/or metallic material.
First conjoined-double-coil axles 134*b* each are made of plastic and/or metallic material.
First conjoined-double-coil springs 134*c* each are made of metallic material.
Second conjoined-double-coil caps 134*d* each are made of plastic and/or metallic material.
Second conjoined-double-coil axles 134*e* each are made of plastic and/or metallic material.
Second conjoined-double-coil springs 134*f* each are made of metallic material.
35) Ring-canopy-arm intersector 135 is made of plastic material.
36) Ring-canopy-rib-raising arms 136 each are made of metallic material,
37) Ring canopy 137 is made of nylon and/or fabric material.
38) Four zipper pockets 138 each are made of plastic, nylon, and/or fabric material.
39) Canopy-size-adjusting flaps 139 each are made of leather, rubber, plastic, nylon, and/or fabric material.
40) Canopy-size-adjusting holes 140 each are made of empty space.

Shape

Referring to FIG. 2, FIG. 3A, FIG. 3B, FIG. 3C, FIG. 4A, FIG. 4B, FIG. 4C, FIG. 4D, FIG. 5, FIG. 6, FIG. 7, FIG. 8, FIG. 9A, FIG. 9B, FIG. 10A, FIG. 10B, FIG. 10C, FIG. 10D, FIG. 11A, and FIG. 11B:

1) Multi-function fence-mountable balcony-mountable bumper-mountable hitch-mountable base system 101 is formed into the combined shapes of its components.
2) First post-stabilizing foot 102 is formed into an I shape. A groove is formed into the undersurface of first post-stabilizing foot 102.
3) Second post-stabilizing foot 103 is formed into an I shape. A groove is formed into the undersurface of second post-stabilizing foot 103.
4) Mounting plate 104 is formed into a square shape.
5) Four wedging plates 105 each are formed into a semi-oval shape with a recess. The lower portion below the recess of each of wedging plates 105 is bent to slidably fit behind the lower portion of an adjacent plate 105 of another multi-function umbrella.
6) Four base-stabilizing weights 106 each are formed into a triangular shape.
7) Multi-function fence-mountable balcony-mountable bumper-mountable hitch-mountable post system 107 is formed into the combined shapes of its components.
8) Lower post 108 is formed into a tubular shape with an oval cross-section.

9) Middle post 109*a* is
formed into a tubular shape with an oval cross-section.
Upper post 109*b*
formed into a tubular shape with an oval cross-section.
10) First mounting inner core 110*a* is
formed into an I shape with a slanted end.
Second mounting inner core 110*b* is
formed into an I shape with a slanted end.
Post-height-adjusting holes 110*c* each are
formed into a round shape.
11) Core-securing bolts 111 each are
formed into a bolt shape.
12) Height-adjusting angle-adjusting multi-canopy-deploying system 112 is
formed into the combined shapes of its components.
13) Multi-canopy-lifting-arm intersector 113 is
formed into an oval shape.
14) Multi-canopy-supporting-arm intersector 114 is
formed into an oval-donut shape.
15) Slidable multi-position handle 115 is
formed into a D shape.
16) Height-adjusting spring-loaded rocker 116 is
formed into an L shape.
17) Handle-locking rocker pin 117 is
formed into a nipple shape.
18) Handle-locking post holes 118 each are
formed into a round shape.
19) Foldable multi-canopy-supporting arm 119 is
formed into a tubular shape with an oval cross-section.
20) Foldable multi-canopy-lifting arm 120 is
formed into a tubular shape with an oval cross-section.
21) Multi-canopy-hanging central tube 121 is
formed into a tubular shape with a round cross-section.
22) Multi-canopy-deploying spool 122 is
formed into a cylindrical shape.
23) Multi-canopy-deploying crank 123 is
formed into an S shape.
24) Multi-canopy-deploying rope 124 is
formed into a rope shape.
25) Adjustable water-collector wind-blocker privacy-screen double-awning central canopy system 125 is
formed into the combined shapes of its components.
26) Central-canopy intersector 126 is
formed into a round shape with a notched perimeter.
27) Central-canopy-supporting ribs 127 each are
formed into a tubular shape with an oval cross-section.
28) Central-canopy-rib-raising arms 128 each are
formed into a flat rectangular shape.
29) Central canopy 129 is
formed into a square shape.
30) Adjustable water-collector wind-blocker privacy-screen double-awning multi-angle ring canopy system 130 is
formed into the combined shapes of its components.
31) Ring-canopy-rib intersector 131 is
formed into a donut shape with a notched perimeter.
32) First ring-canopy-supporting ribs 132 each are
formed into a tubular shape with an oval cross-section.
33) Second ring-canopy-supporting ribs 133*a* each are
formed into a tubular shape with an oval cross-section.
Third ring-canopy-supporting ribs 133*b* each are
formed into a tubular shape with an oval cross-section.
34) First conjoined-double-coil caps 134*a* each are
formed into a rectangular shape with a U-shaped cross-section.
First conjoined-double-coil axles 134*b* each are
formed into a cylindrical shape.
First conjoined-double-coil springs 134*c* each are
formed into a double-conjoined-coil-spring shape.
Second conjoined-double-coil caps 134*d* each are
formed into a rectangular shape with a U-shaped cross-section.
Second conjoined-double-coil axles 134*e* each are
formed into a cylindrical shape.
Second conjoined-double-coil springs 134*f* each are
formed into a double-conjoined-coil-spring shape.
35) Ring-canopy-arm intersector 135 is
formed into a donut shape with a notched perimeter.
36) Ring-canopy-rib-raising arms 136 each are
formed into a tubular shape with an oval cross-section.
37) Ring canopy 137 is
formed into a square ring shape.
38) Four zipper pockets 138 each are
formed into a triangular shape.
39) Canopy-size-adjusting flaps 139 each are
formed into a rectangular shape.
40) Canopy-size-adjusting holes 140 each are
formed into a round shape.

Connection

Referring to FIG. 2, FIG. 3A, FIG. 3B, FIG. 3C, FIG. 4A, FIG. 4B, FIG. 4C, FIG. 4D, FIG. 5, FIG. 6, FIG. 7, FIG. 8, FIG. 9A, FIG. 9B, FIG. 10A, FIG. 10B, FIG. 10C, FIG. 10D, FIG. 11A, and FIG. 11B:

1) Multi-function fence-mountable balcony-mountable bumper-mountable hitch-mountable base system 101 is
connected by the combined connections of its components.
2) First post-stabilizing foot 102 is
bolted to mounting plate 104.
3) Second post-stabilizing foot 103 is
bolted to mounting plate 104.
4) Mounting plate 104 is attached to lower post 108.
5) Four wedging plates 105 respectively are
welded to first post-stabilizing foot 102 and
second post-stabilizing foot 103.
6) Four base-stabilizing weights 106 respectively are
attached to first post-stabilizing foot 102 and
second post-stabilizing foot 103.
7) Multi-function fence-mountable balcony-mountable bumper-mountable hitch-mountable post system 107 is
connected by the combined connections of its components.
8) Lower post 108 is
bolted to first mounting inner core 110*a*.
9) Middle post 109*a* is
bolted to first mounting inner core 110*a* and second mounting inner core 110*b*.
Upper post 109*b* is
bolted to second mounting inner core 110*b*.
10) First mounting inner core 110*a* is
attached to mounting plate 104 and inserted into and bolted to lower post 108 and middle post 109*a*.
Second mounting inner core 110*b* is
inserted into and bolted to middle post 109*a* and upper post 109*b*.
Post-height-adjusting holes 110*c* respectively are
drilled into lower post 108, middle post 109*a*, upper post 109*b*, first mounting inner core 110*a*, and second mounting inner core 110*b*.
11) Core-securing bolts 111 respectively are
bolted through lower post 108, middle post 109*a*, upper post 109*b*, first mounting inner core 110*a*, and second mounting inner core 110*b*.

12) Height-adjusting angle-adjusting multi-canopy-deploying system 112 is
connected by the combined connections of its components.
13) Multi-canopy-lifting-arm intersector 113 is
attached to upper post 109.
14) Multi-canopy-supporting-arm intersector 114 is
slidably attached to upper post 109.
15) Slidable multi-position handle 115 is
molded to multi-canopy-supporting-arm intersector 114.
16) Height-adjusting spring-loaded rocker 116 is
sandwiched within slidable multi-position handle 115.
17) Handle-locking rocker pin 117 is
attached to height-adjusting spring-loaded rocker 116.
18) Handle-locking post holes 118 respectively are
drilled into upper post 109.
19) Foldable multi-canopy-supporting arm 119 is
pivotably bolted to multi-canopy-supporting-arm intersector 114.
20) Foldable multi-canopy-lifting arm 120 is
pivotably bolted to multi-canopy-lifting-arm intersector 113 and
foldable multi-canopy-supporting arm 119.
21) Multi-canopy-hanging central tube 121 is
attached to central-canopy intersector 126.
22) Multi-canopy-deploying spool 122 is
sandwiched within multi-canopy-supporting-arm intersector 114.
23) Multi-canopy-deploying crank 123 is
rotatably attached to multi-canopy-deploying spool 122.
24) Multi-canopy-deploying rope 124 is
wound around multi-canopy-deploying spool 122,
threaded through multi-canopy-supporting-arm intersector 114,
threaded through multi-canopy-hanging central tube 121, and
attached to ring-canopy-arm intersector 135.
25) Adjustable water-collector wind-blocker privacy-screen double-awning central canopy system 125 is
connected by the combined connections of its components.
26) Central-canopy intersector 126 is
attached to multi-canopy-hanging central tube 121.
27) Central-canopy-supporting ribs 127 respectively are
attached to central-canopy intersector 126.
28) Central-canopy-rib-raising arms 128 respectively are
pivotably attached to central-canopy-supporting ribs 127 and
first ring-canopy-supporting ribs 132.
29) Central canopy 129 is
attached to central-canopy-supporting ribs 127.
30) Adjustable water-collector wind-blocker privacy-screen double-awning multi-angle ring canopy system 130 is
connected by the combined connections of its components.
31) Ring-canopy-rib intersector 131 is
connected to multi-canopy-hanging central tube 121.
32) First ring-canopy-supporting ribs 132 respectively are
pivotably connected to ring-canopy-rib intersector 131.
33) Second ring-canopy-supporting ribs 133a respectively are
pivotably connected to first conjoined-double-coil caps 134a and second conjoined-double-coil caps 134d.
Third ring-canopy-supporting ribs 133b respectively are
pivotably connected to second conjoined-double-coil caps 134d.
34) First conjoined-double-coil caps 134a respectively are
slid on and pivotably connected to first ring-canopy-supporting ribs 132 and second ring-canopy-supporting ribs 133a.
First conjoined-double-coil axles 134b respectively are
riveted on first conjoined-double-coil caps 134a, first ring-canopy-supporting ribs 132 and second ring-canopy-supporting ribs 133a.
First conjoined-double-coil springs 134c respectively are
springidly slid onto first conjoined-double-coil axles 134b.
Second conjoined-double-coil caps 134d respectively are
slid on and pivotably connected to second ring-canopy-supporting ribs 133a and third ring-canopy-supporting ribs 133b.
Second conjoined-double-coil axles 134e respectively are
riveted on second conjoined-double-coil caps 134d, second ring-canopy-supporting ribs 133a and third ring-canopy-supporting ribs 133b.
Second conjoined-double-coil springs 134f respectively are
spingidly slid onto second conjoined-double-coil axles 134e.
35) Ring-canopy-arm intersector 135 is
slidably attached to multi-canopy-hanging central tube 121, and
foldably attached to ring-canopy-rib-raising arms 136.
36) Ring-canopy-rib-raising arms 136 respectively are
foldably attached to ring-canopy-arm intersector 135.
37) Ring canopy 137 is
attached to first ring-canopy-supporting ribs 132 and second ring-canopy-supporting ribs 133.
38) Four zipper pockets 138 respectively are
sewn to the corners of ring canopy 137.
39) Canopy-size-adjusting flaps 139 respectively are
sewn to the inner edges of ring canopy 137.
40) Canopy-size-adjusting holes 140 respectively are
drilled into first ring-canopy-supporting ribs 132.

Function

Referring to FIG. 12, FIG. 13, FIG. 14, FIG. 15, FIG. 16A, FIG. 16B, FIG. 16C, FIG. 16D, FIG. 16E, FIG. 16F, FIG. 16G, FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, FIG. 17A, FIG. 17B, FIG. 17C, FIG. 17D, FIG. 18A, FIG. 18B, FIG. 18C, FIG. 18D, FIG. 18E, FIG. 18F, FIG. 19A, FIG. 19B, FIG. 19C, FIG. 19D, FIG. 19E, FIG. 19F, FIG. 19G, FIG. 20A, FIG. 20B, FIG. 20C, FIG. 20D, FIG. 20E, FIG. 20F, FIG. 20G, FIG. 20H, FIG. 21A, FIG. 21B, FIG. 21C, FIG. 21D, FIG. 21E, FIG. 21F, and FIG. 21G:

1) Multi-function fence-mountable balcony-mountable bumper-mountable hitch-mountable base system 101 is for:
Performing the combined functions of its components.
2) First post-stabilizing foot 102 is for:
Standing the multi-angle multi-function umbrella on a surface.
3) Second post-stabilizing foot 103 is for:
Standing the multi-angle multi-function umbrella on a surface.

4) Mounting plate 104 is for:
   a) Mounting the multi-angle multi-function umbrella on first post-stabilizing foot 102 and second post-stabilizing foot 103
      to stabilize the multi-angle multi-function umbrella from tipping over
      (see FIG. 2);
   b) Mounting the multi-angle multi-function umbrella on a fence
      to provide shade and protection when a fence is accessible
      (see FIG. 18D);
   c) Mounting the multi-angle multi-function umbrella on a balcony to provide shade and protection when a balcony is accessible
      (see FIG. 20F);
   d) Mounting the multi-angle multi-function umbrella on a bumper to provide shade and protection when a bumper is accessible
      (see FIG. 18A);
   e) Mounting the multi-angle multi-function umbrella on a hitch to provide shade and protection when a hitch is accessible
      (see FIG. 19C);
   f) Mounting the multi-angle multi-function umbrella on a tailgate to provide shade and protection when a tailgate is accessible
      (see FIG. 18B);
   g) Mounting the multi-angle multi-function umbrella on a table to provide shade and protection when a table is accessible
      (see FIG. 18C).
5) Four wedging plates 105 is for:
   a) Slidably hooking on multiple wedging plates of other umbrellas
      to secure four wedging plates 105 to the other space-saver umbrellas
      in the directions of arrows 141a and 141b
      to provide various configuration options and additional shade and protection
      (see FIG. 21A, FIG. 21B, FIG. 21C, FIG. 21D, FIG. 21E, FIG. 21F, and FIG. 21G);
   b) Slidably hooking up to the two adjacent slats of a fence
      to secure four wedging plates 105 to the fence
      to prevent the multi-angle multi-function umbrella from moving or falling over
      (see FIG. 12);
   c) Slidably wedging between the two planks of a patio or deck
      to secure four wedging plates 105 to the patio or deck
      to prevent the multi-angle multi-function umbrella from moving or falling over
      (see FIG. 13 and FIG. 14).
6) Four base-stabilizing weights 106 is for:
   Holding down first post-stabilizing foot 102 and second post-stabilizing foot 103.
7) Multi-function fence-mountable balcony-mountable bumper-mountable hitch-mountable post system 107 is for:
   Performing the combined functions of its components.
8) Lower post 108 is for:
   Supporting upper post 109.
9) Middle post 109a is for:
   Supporting upper post 109b.

Upper post 109b is for:
   Supporting foldable multi-canopy-supporting arm 119 and foldable multi-canopy-lifting arm 120.
10) First mounting inner core 110a is for:
   a) Allowing lower post 108 and middle post 109a to angledly configure the multi-angle multi-function umbrella
      to increase functionality by providing additional configuration options
      (see FIG. 4A, FIG. 4B, FIG. 4C, FIG. 4D, FIG. 16A, FIG. 16E, FIG. 16F, and FIG. 16G);
   b) Allowing manufacturers to divide a long post into shorter lower post 108, shorter middle post 109a, and shorter upper post 109b
      to reduce the length and volume of the shipping package of the multi-angle multi-function umbrella in a shipping container to save money from expensive shipping costs
      (see FIG. 1A (Prior Art) and FIG. 1B);
   c) Mounting middle post 109a on lower post 108
      to strengthen post
      (see FIG. 4B);
   d) Mounting middle post 109a on a fence
      to provide shade and protection when a fence is accessible
      (see FIG. 19E);
   e) Mounting middle post 109a on a balcony
      to provide shade and protection when a balcony is accessible
      (see FIG. 20E);
   f) Mounting middle post 109a on a bumper
      to provide shade and protection when a bumper is accessible
      (see FIG. 19B);
   g) Mounting middle post 109a on a hitch
      to provide shade and protection when a hitch is accessible
      (see FIG. 19C);
   h) Mounting middle post 109a on a tailgate
      to provide shade and protection when a tailgate is accessible
      (see FIG. 19A);
   i) Mounting middle post 109a on a table
      to provide shade and protection when a table is accessible
      (see FIG. 19D);
   j) Mounting middle post 109a on a column
      to provide shade and protection when a column is accessible
      (see FIG. 19F);
   k) Mounting middle post 109a on a wall
      to provide shade and protection when a wall is accessible
      (see FIG. 20A).
Second mounting inner core 110b is for:
   a) Allowing middle post 109a and upper post 109b to angledly configure the multi-angle multi-function umbrella
      to increase functionality by providing additional configuration options
      (see FIG. 4A, FIG. 4B, FIG. 4C, FIG. 16A, FIG. 16E, FIG. 16F, and FIG. 16G);
   b) Allowing manufacturers to divide a long post into shorter middle post 109a and shorter upper post 109b
      to reduce the length and volume of the shipping package of the multi-angle multi-function umbrella in a shipping container to save money from expensive shipping costs (see FIG. 1A (Prior Art) and FIG. 1B);
c) Mounting upper post 109b on middle post 109a
to strengthen post
(see FIG. 4B);
d) Mounting upper post 109b on a fence
to provide shade and protection when a fence is accessible
(see FIG. 19E);
e) Mounting upper post 109b on a balcony
to provide shade and protection when a balcony is accessible
(see FIG. 20E);
f) Mounting upper post 109b on a bumper
to provide shade and protection when a bumper is accessible
(see FIG. 19B);
g) Mounting upper post 109b on a hitch
to provide shade and protection when a hitch is accessible
(see FIG. 19C);
h) Mounting upper post 109b on a tailgate
to provide shade and protection when a tailgate is accessible
(see FIG. 19A);
i) Mounting upper post 109b on a table
to provide shade and protection when a table is accessible
(see FIG. 19D);
j) Mounting upper post 109b on a column
to provide shade and protection when a column is accessible
(see FIG. 19F);
k) Mounting upper post 109b on a wall
to provide shade and protection when a wall is accessible
(see FIG. 20A).
Post-height-adjusting holes 110c is for:
Inserting handle-locking rocker pin 117 therein
to adjust upper post 109b to multiple different heights.
11) Core-securing bolts 111 is for:
a) Securing together lower post 108, middle post 109a, upper post 109b, and first and second mounting inner cores 110a and 110b
to provide to provide height and strength to the multi-angle multi-function umbrella
(see FIG. 4A);
b) Securing first and second mounting inner cores 110a and 110b to a fence, a balcony, a bumper, a hitch, a tailgate, a table, a column, and a wall
to allow for multiple options of shade and protection
(see FIG. 19E, FIG. 20F, FIG. 18A, FIG. 19C, FIG. 19A, FIG. 19D, FIG. 19F, and FIG. 20D).
12) Height-adjusting angle-adjusting multi-canopy-deploying system 112 is for:
Performing the combined functions of its components.
13) Multi-canopy-lifting-arm intersector 113 is for:
Connecting upper post 109 to foldable multi-canopy-lifting arm 120.
14) Multi-canopy-supporting-arm intersector 114 is for:
Slidably connecting upper post 109 to foldable multi-canopy-supporting arm 119.
15) Multi-position handle 115 is for:
Slidably moving foldable multi-canopy-supporting arm 119 and foldable multi-canopy-lifting arm 120.
16) Height-adjusting spring-loaded rocker 116 is for:
Pushing handle-locking rocker pin 117 into handle-locking post holes 118.
17) Handle-locking rocker pin 117 is for:
Locking multi-canopy-supporting-arm intersector 114 at different elevations.
18) Handle-locking post holes 118 is for:
Locking handle-locking rocker pin 117 therein
to adjust multi-position handle 115, foldable multi-canopy-supporting arm 119, and foldable multi-canopy-lifting arm 120 to multiple different elevations and angles,
to adjust central canopy 129 to multiple different elevations and angles
(see FIG. 5), and
to adjust ring canopy 137 to multiple different elevations and angles
(see FIG. 17B, FIG. 17C, and FIG. 17D).
19) Foldable multi-canopy-supporting arm 119 is for:
Supporting adjustable water-collector wind-blocker privacy-screen double-awning central canopy system 125 and adjustable water-collector wind-blocker privacy-screen double-awning multi-angle ring canopy system 130.
20) Foldable multi-canopy-lifting arm 120 is for:
Lifting adjustable water-collector wind-blocker privacy-screen double-awning central canopy system 125 and adjustable water-collector wind-blocker privacy-screen double-awning multi-angle ring canopy system 130.
21) Multi-canopy-hanging central tube 121 is for:
a) Connecting central-canopy intersector 126 thereto
(see FIG. 9A);
b) Connecting ring-canopy-rib intersector 131 thereto
(see FIG. 9B); and
c) Slidably connecting ring-canopy-arm intersector 135 thereto
(see FIG. 9B).
22) Multi-canopy-deploying spool 122 is for:
Winding multi-canopy-deploying rope 124 thereon.
23) Multi-canopy-deploying crank 123 is for:
Winding and unwinding multi-canopy-deploying rope 124 on and off multi-canopy-deploying spool 122, respectively.
24) Multi-canopy-deploying rope 124 is for:
Lifting central-canopy-rib-raising arms 128, central canopy 129, ring-canopy-rib-raising arms 136, and ring canopy 137.
25) Adjustable water-collector wind-blocker privacy-screen double-awning central canopy system 125 is for:
Performing the combined functions of its components.
26) Central-canopy-rib intersector 126 is for:
Connecting multi-canopy-hanging central tube 121 to central-canopy-supporting ribs 127.
27) Central-canopy-supporting ribs 127 is for:
Folding and unfolding central canopy 129.
28) Central-canopy-rib-supporting arms 128 is for:
a) Supporting central-canopy-supporting ribs 127
to provide central canopy 129 structural support
(see FIG. 9A and FIG. 9B)
b) Hingedly connecting central-canopy-supporting ribs 127 and first ring-canopy-supporting ribs 132,
to provide structural support
(see FIG. 9A and FIG. 9B); and
c) Hingedly connecting central-canopy-supporting ribs 127 and first ring-canopy-supporting ribs 132, to help make folding the multi-angle multi-function water-collector wind-blocker privacy-screen awning canopy space-saver umbrella easier (see FIG. 9A and FIG. 9B).

Figure 16D:
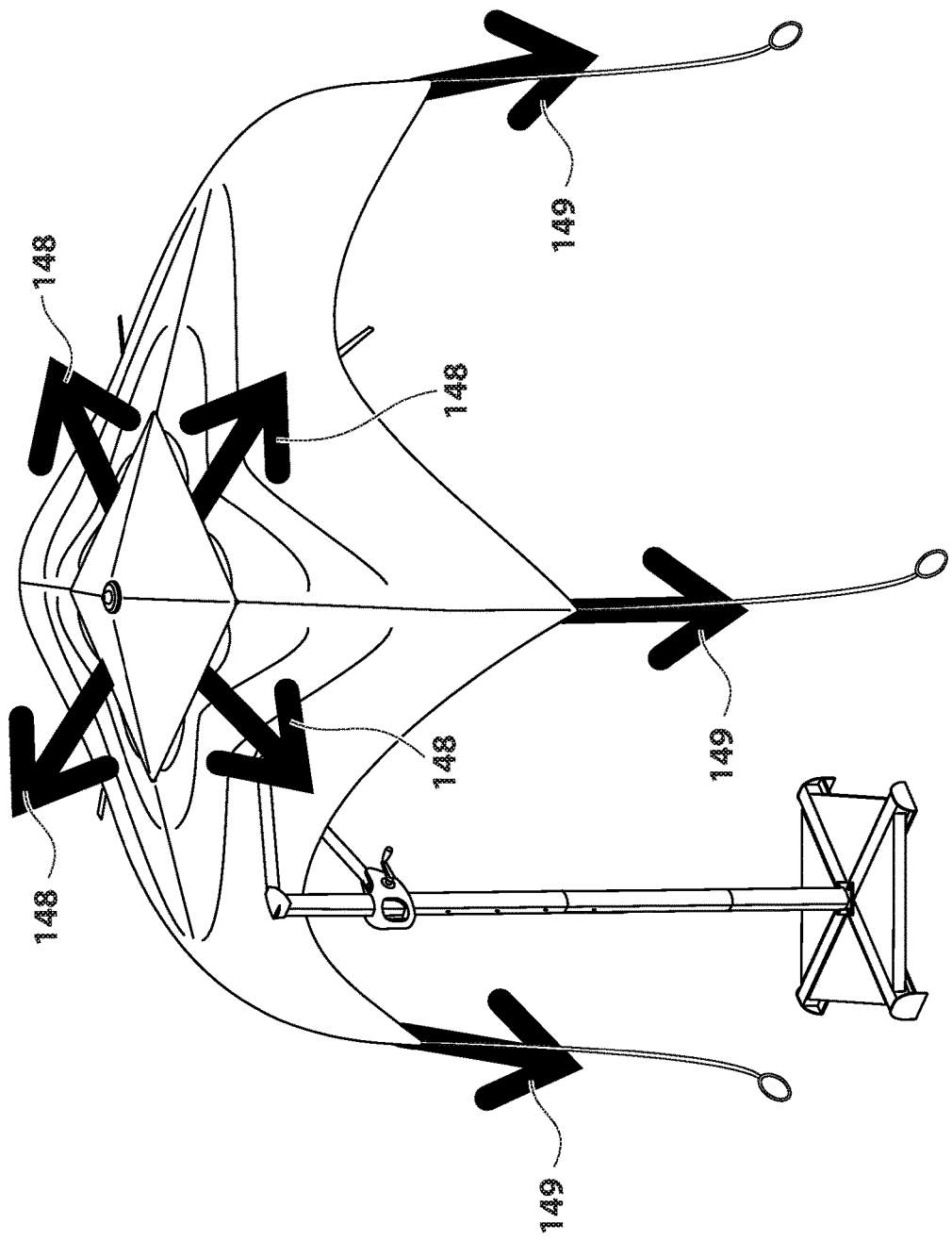
FIG. 16D illustrates a perspective view of how the multi-angle multi-function umbrella can have ties at the corners for attaching to the ground.
Figure 16E:
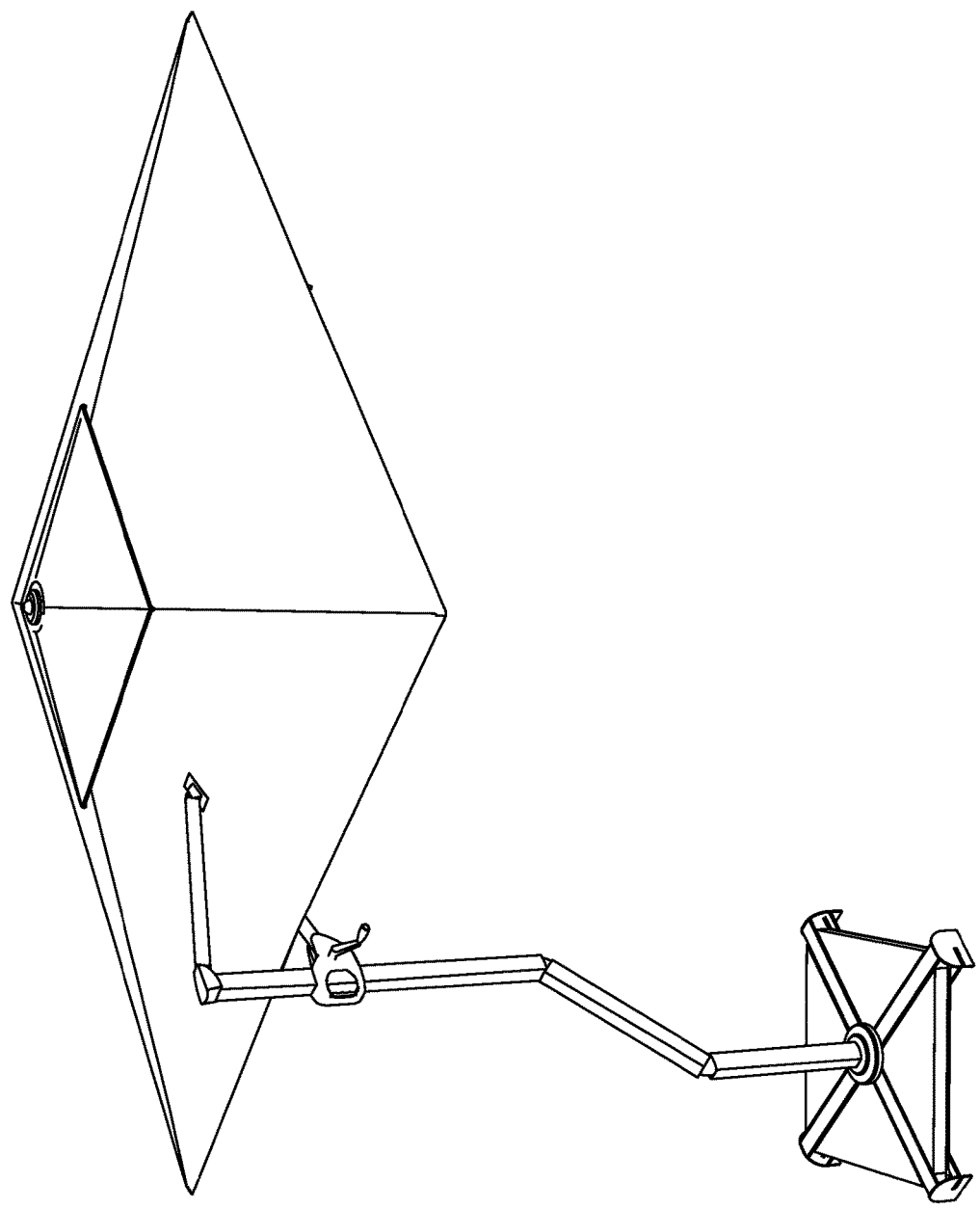
FIG. 16E, FIG. 16F, and FIG. 16G illustrate how the lower post, middle post, and upper post can be configured in a variety of different angles using the first mounting inner core and second mounting inner core.
Figure 16F:
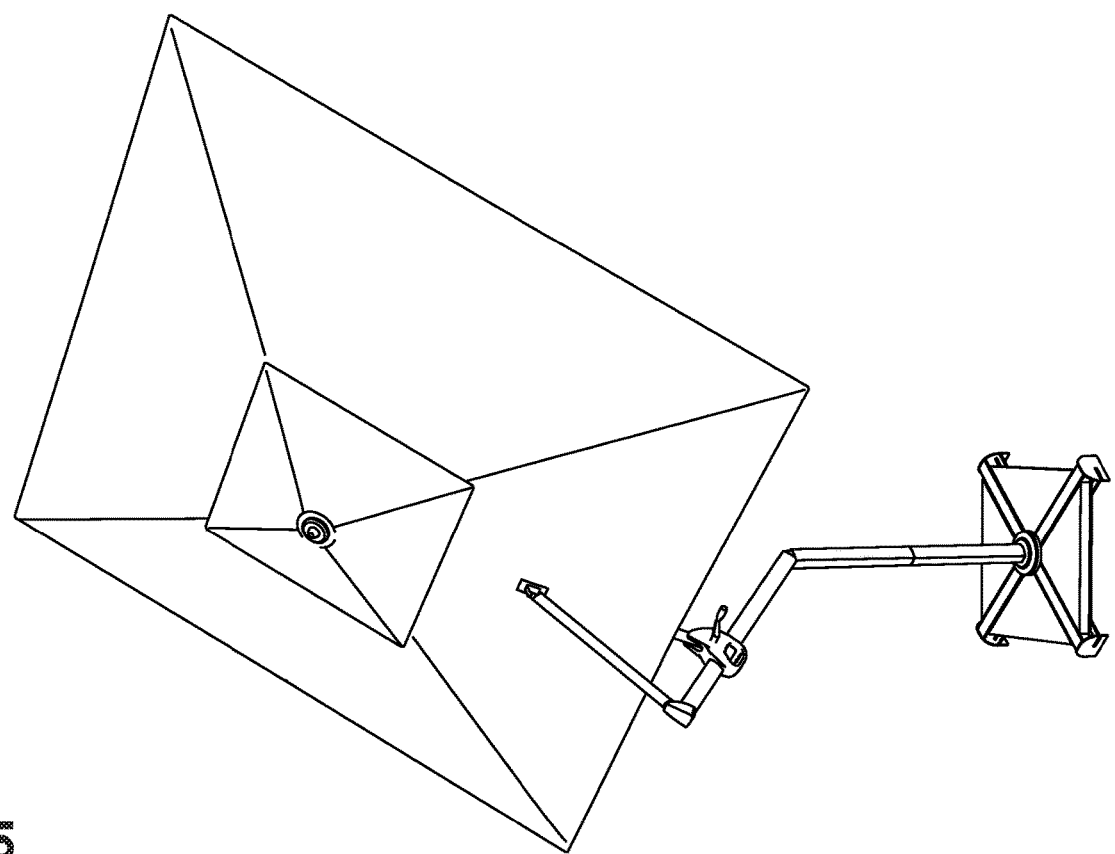
Figure 16G:
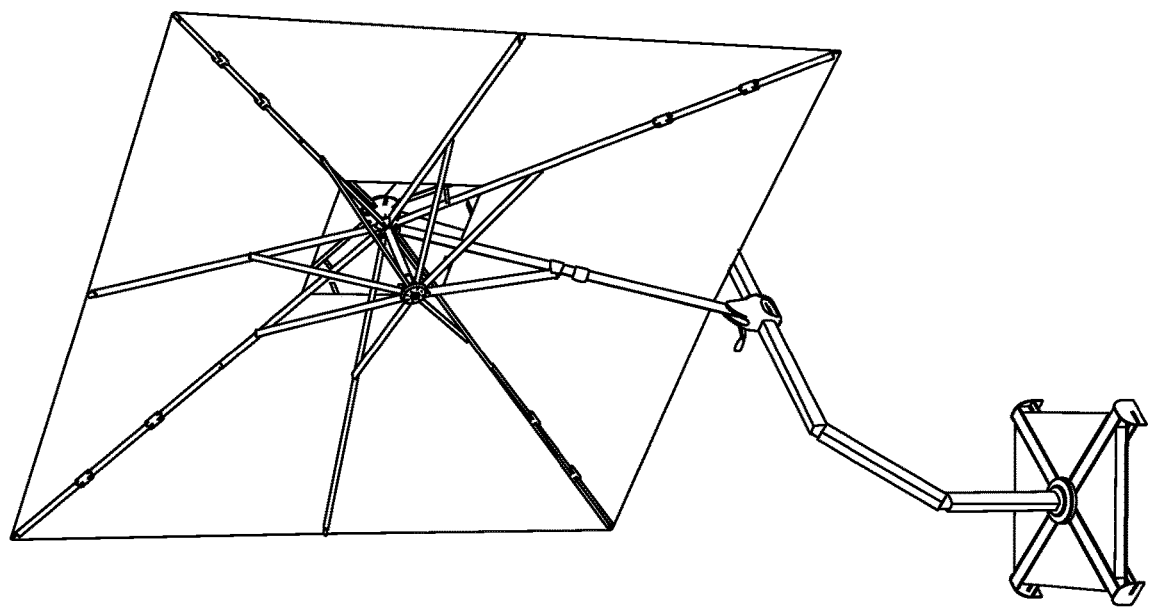
Figure 16J:
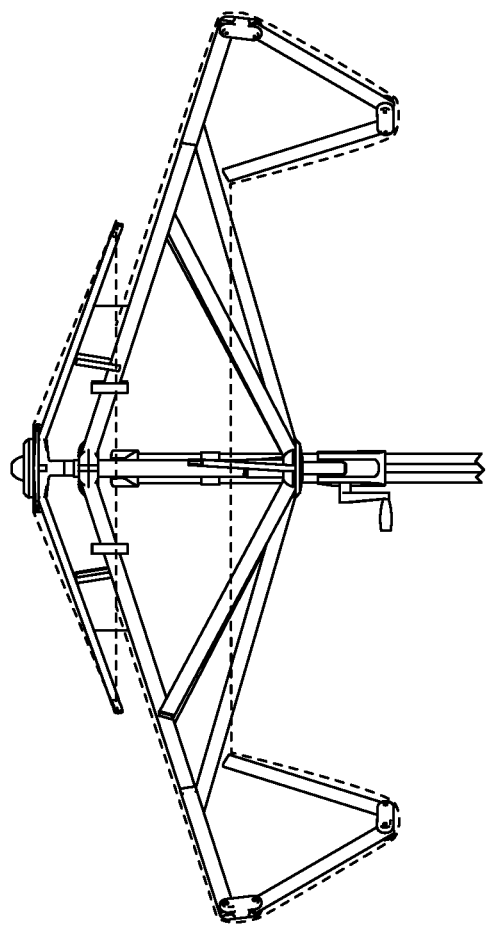
Figure 16K:
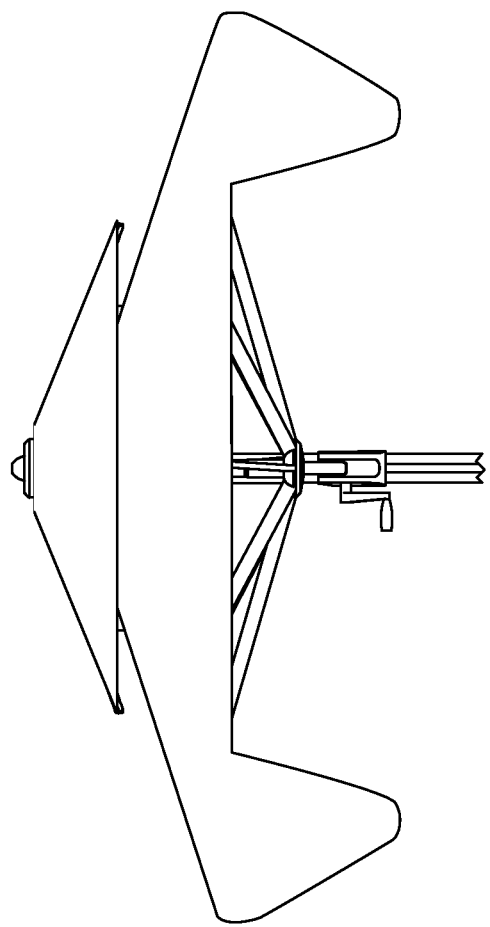
Figure 16L:
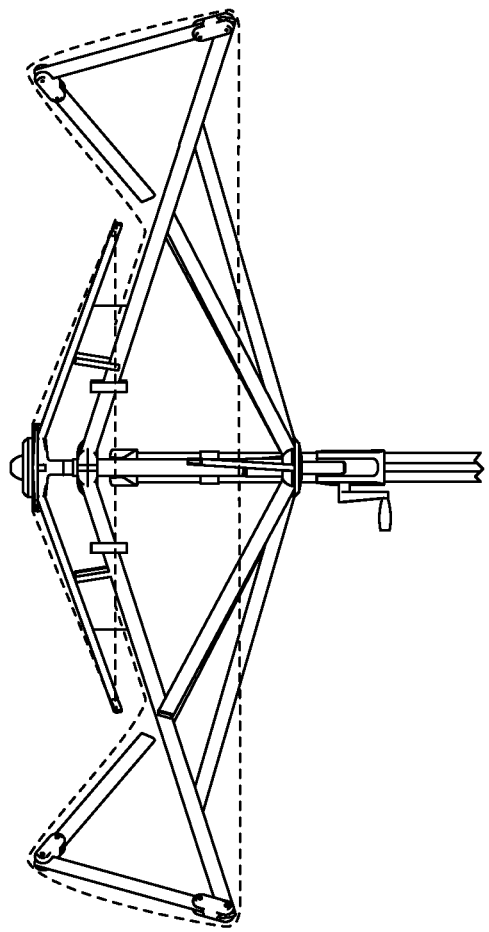
Figure 16M:
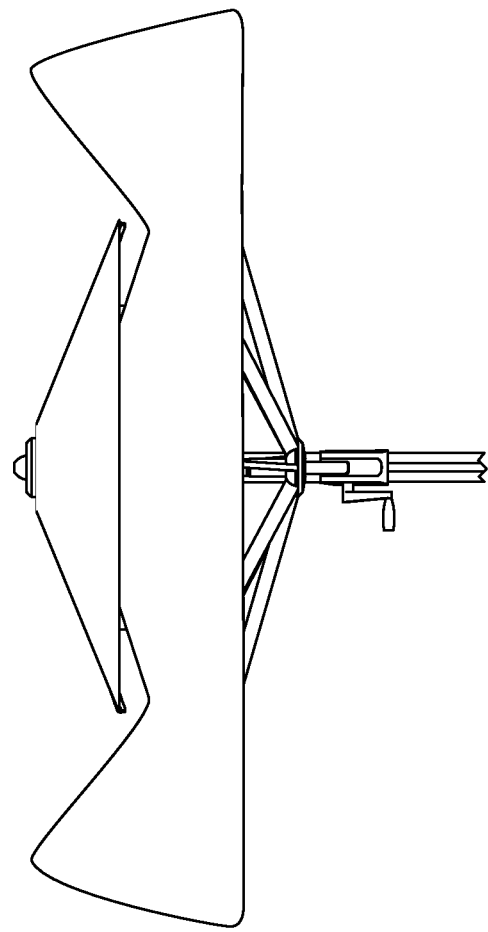
Figure 16N:
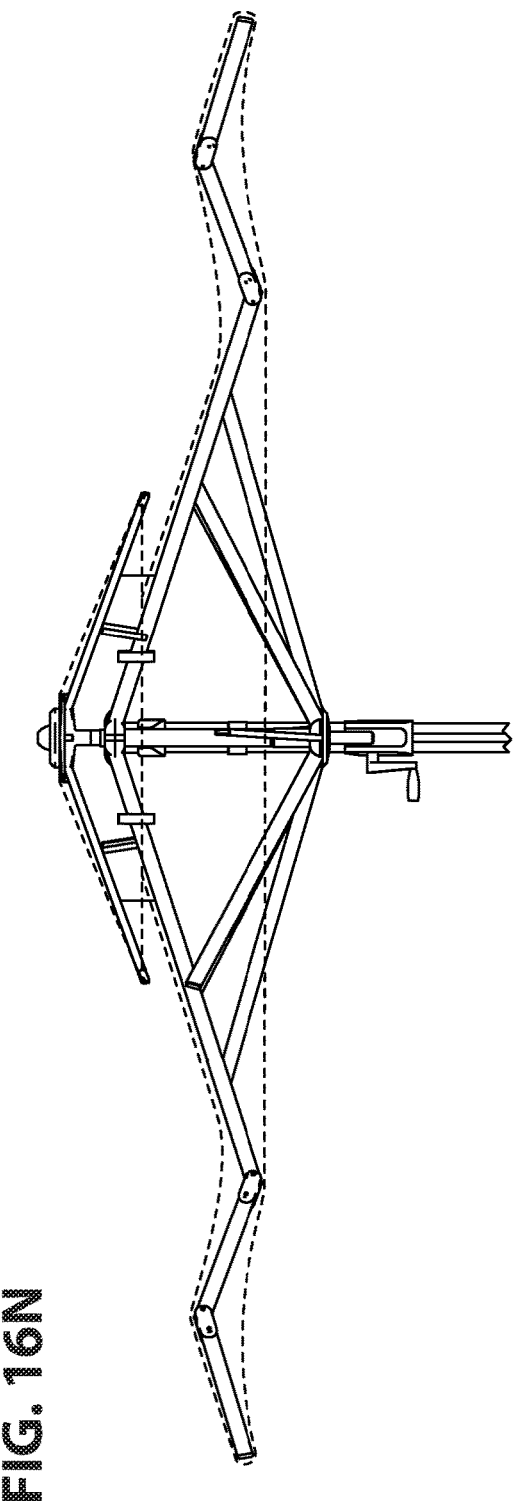
Figure 16O:
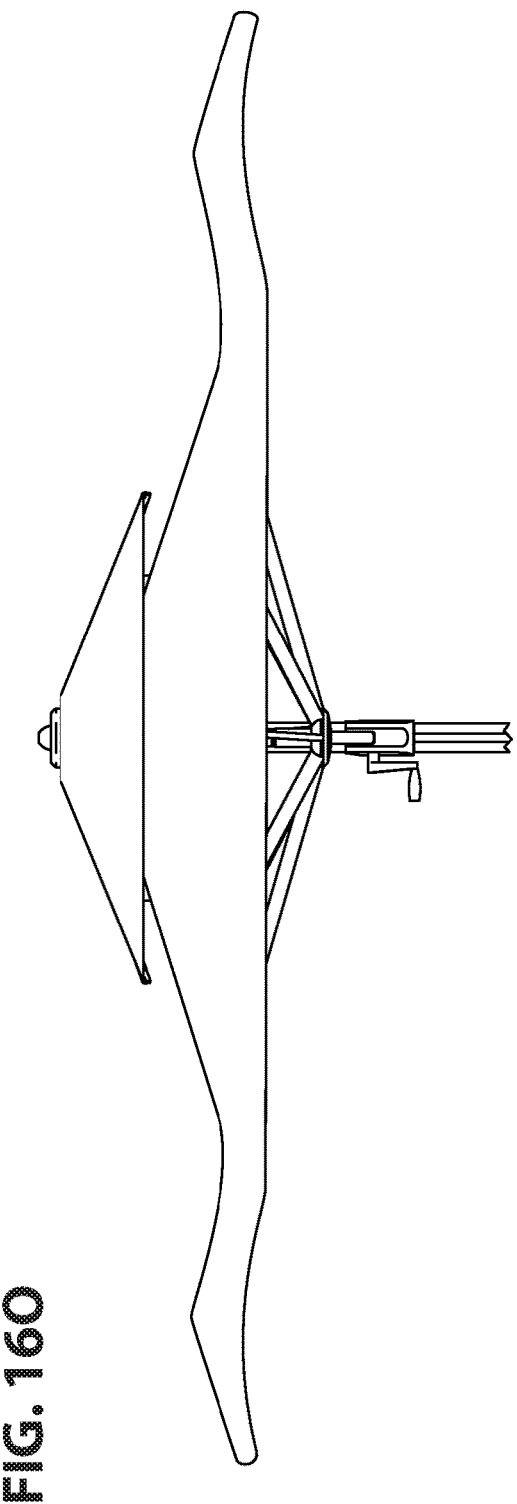
Figure 16P:
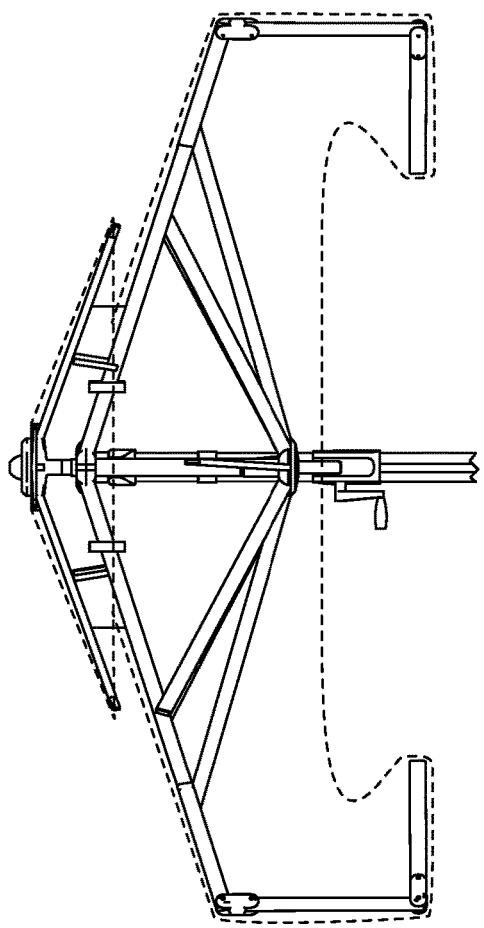
Figure 16Q:
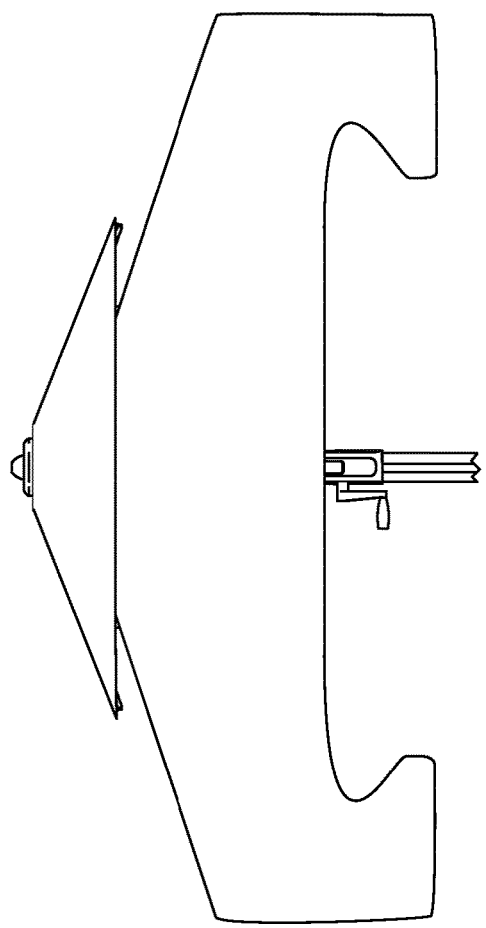
Figure 16Z:
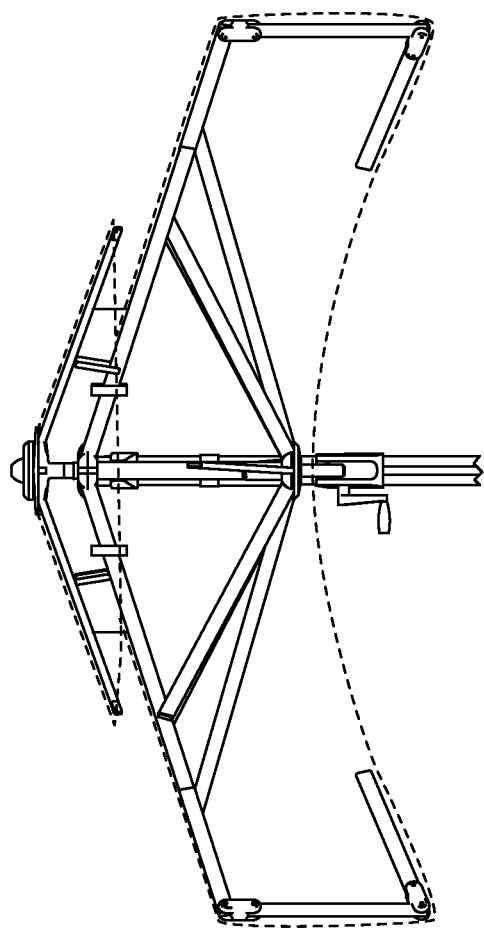
Figure 17A:
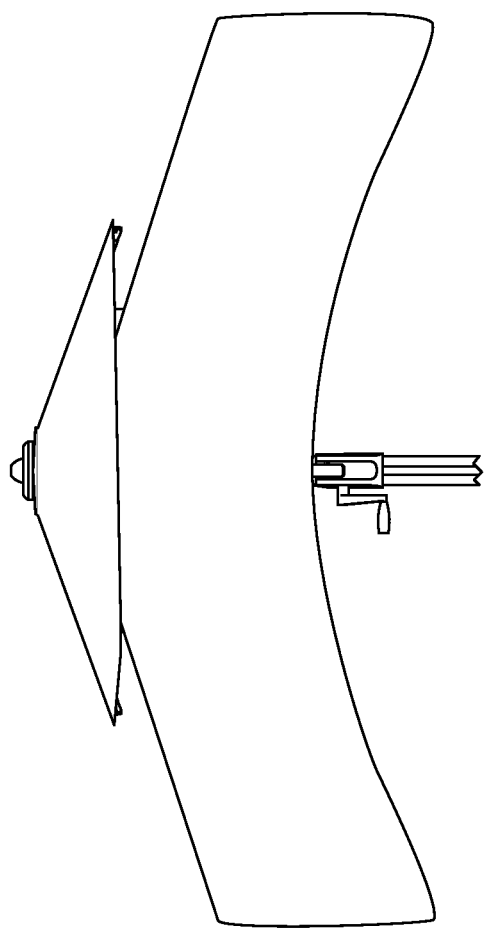
Figure 17C:
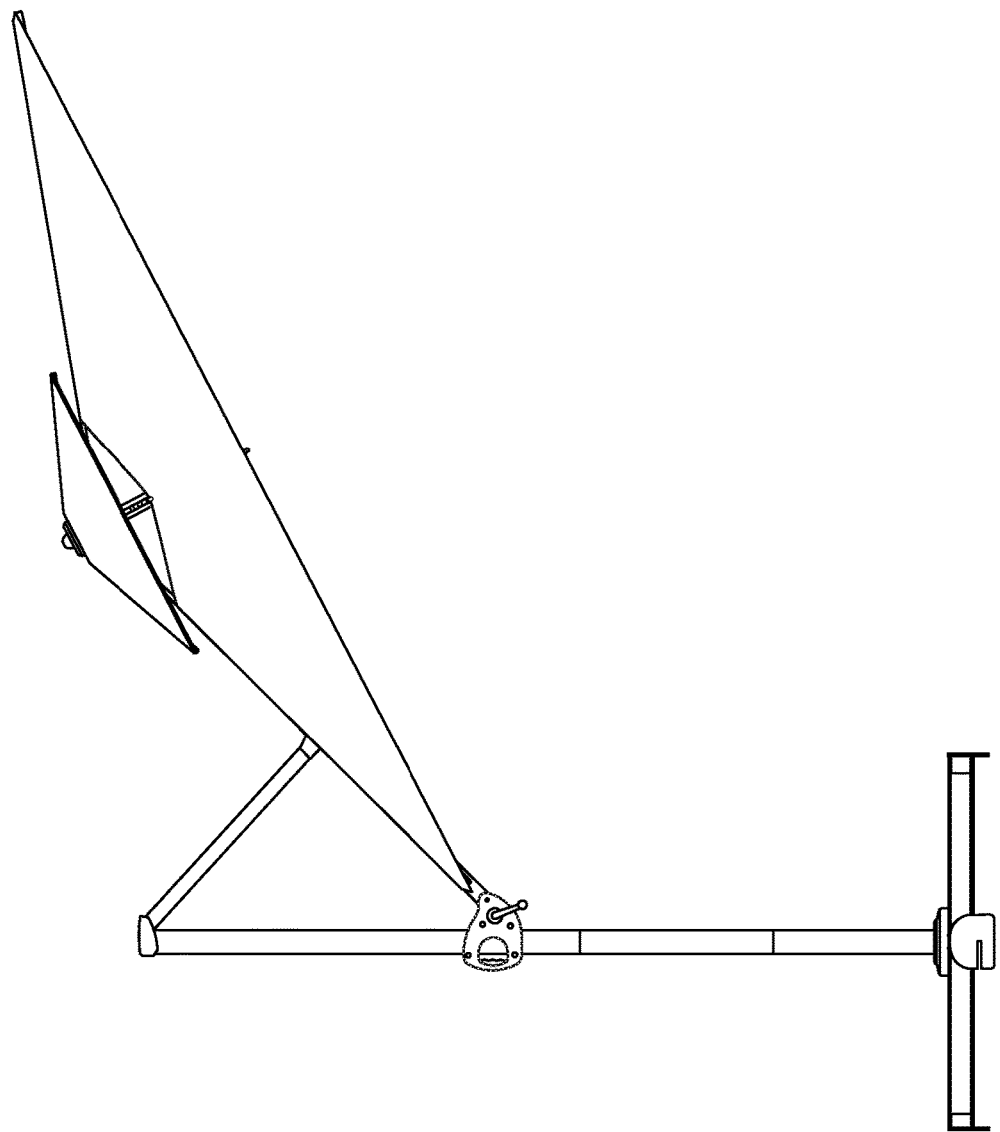
Figure 17D:
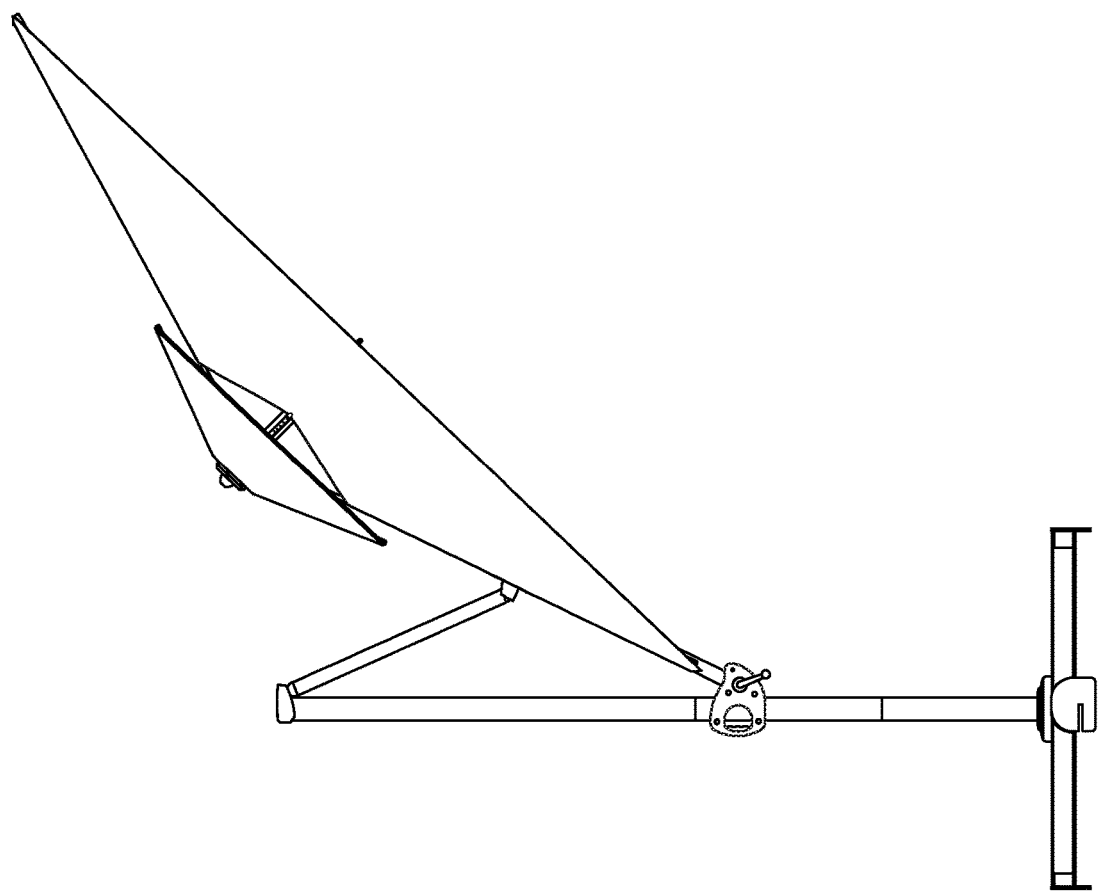

29) Central canopy 129 is for:
   a) Functioning as a water collector
      to collect rain water when used upside down
      in the directions of arrows 142 and 143
      (see FIG. 16A);
   b) Functioning as a wind blocker
      to block wind
      (see FIG. 20D);
   c) Functioning as a privacy screen
      to provide privacy
      (see FIG. 20E);
   d) Functioning as an awning
      to angledly block rain and sun beams
      (see FIG. 20A);
   e) Functioning as a canopy
      to vertically block rain and sun beams
      (see FIG. 20H);
   f) Functioning as a wind redirector
      to redirect wind in and out of canopy
      in the directions of arrows 144, 145, 146, 147 and 148
      (see FIG. 16B, FIG. 16C, and FIG. 16D);
   g) Functioning as a wind resistor
      to protect the canopy from blowing when corners are attached to ground with ropes and stakes
      in the direction of arrow 149
      (see FIG. 16D).

30) Adjustable water-collector wind-blocker privacy-screen double-awning multi-angle ring canopy system 130 is for:
   Performing the combined functions of its components.

31) Ring-canopy-rib intersector 131 is for:
   Connecting multi-canopy-hanging central tube 121 to first ring-canopy-supporting ribs 132.

32) First ring-canopy-supporting ribs 132 is for:
   Folding and unfolding ring canopy 137
   to form 9 new canopy shapes
   (see FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

33) Second ring-canopy-supporting ribs 133a respectively are for:
   Folding and unfolding ring canopy 137
   to form 9 new canopy shapes
   (see FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

Third ring-canopy-supporting ribs 133b respectively are for:
   Folding and unfolding ring canopy 137
   to form 9 new canopy shapes
   (see FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

Figure 1B:
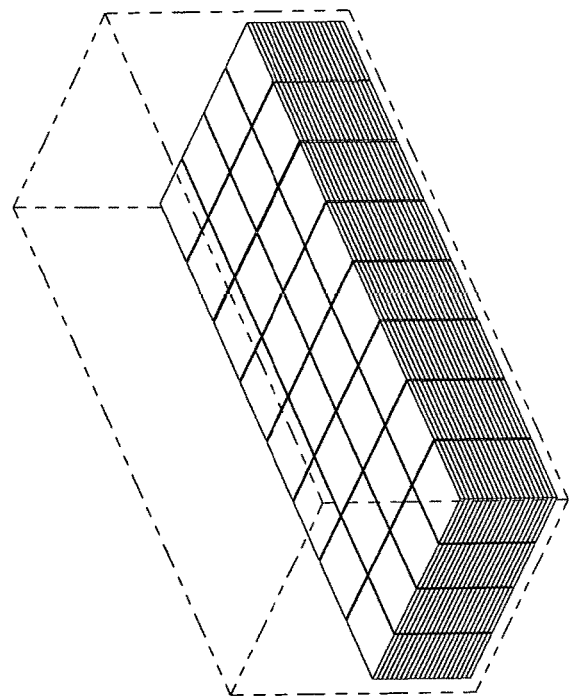
Figure 4A:
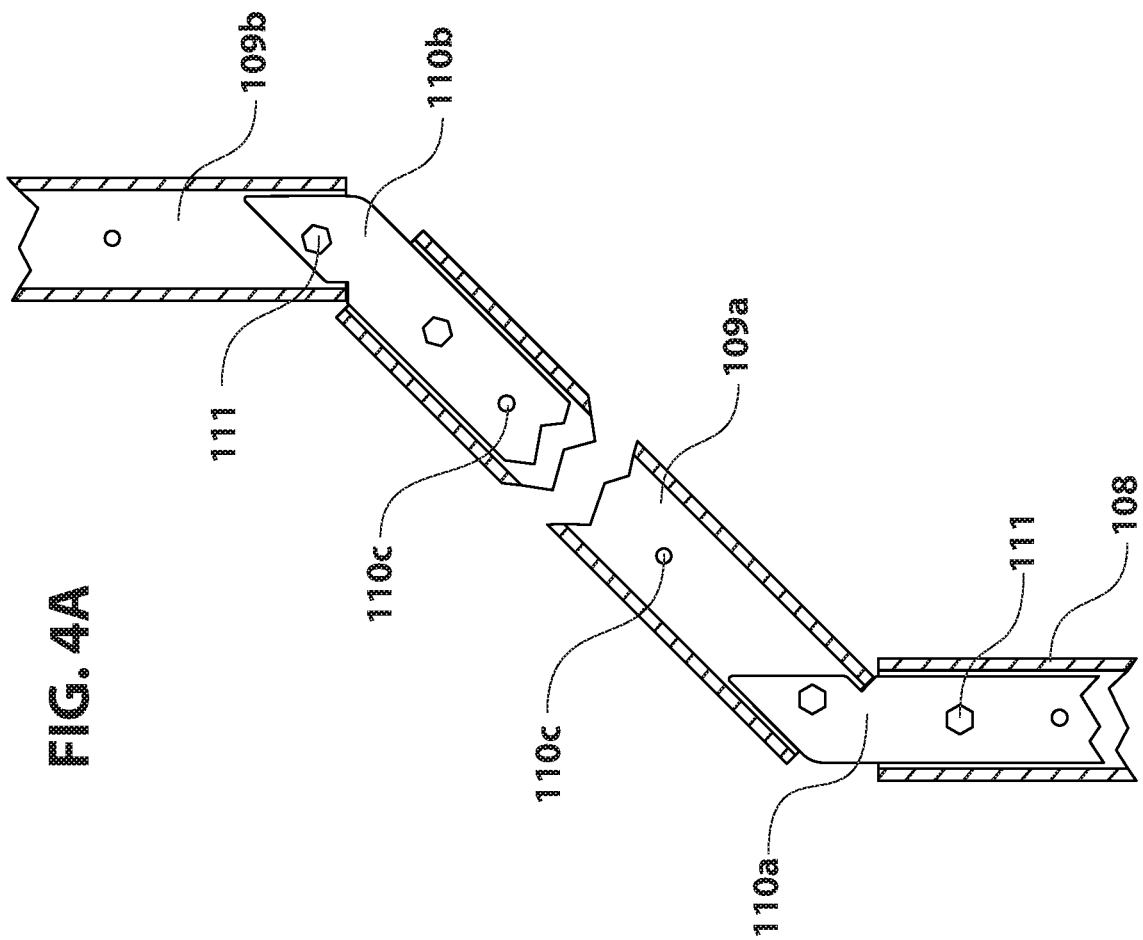
FIG. 4A and FIG. 4B illustrate cross-sectional and side views of the first mounting inner core and second mounting inner core and how they connect the lower post, middle post, and upper post together in different configurations.
Figure 4B:
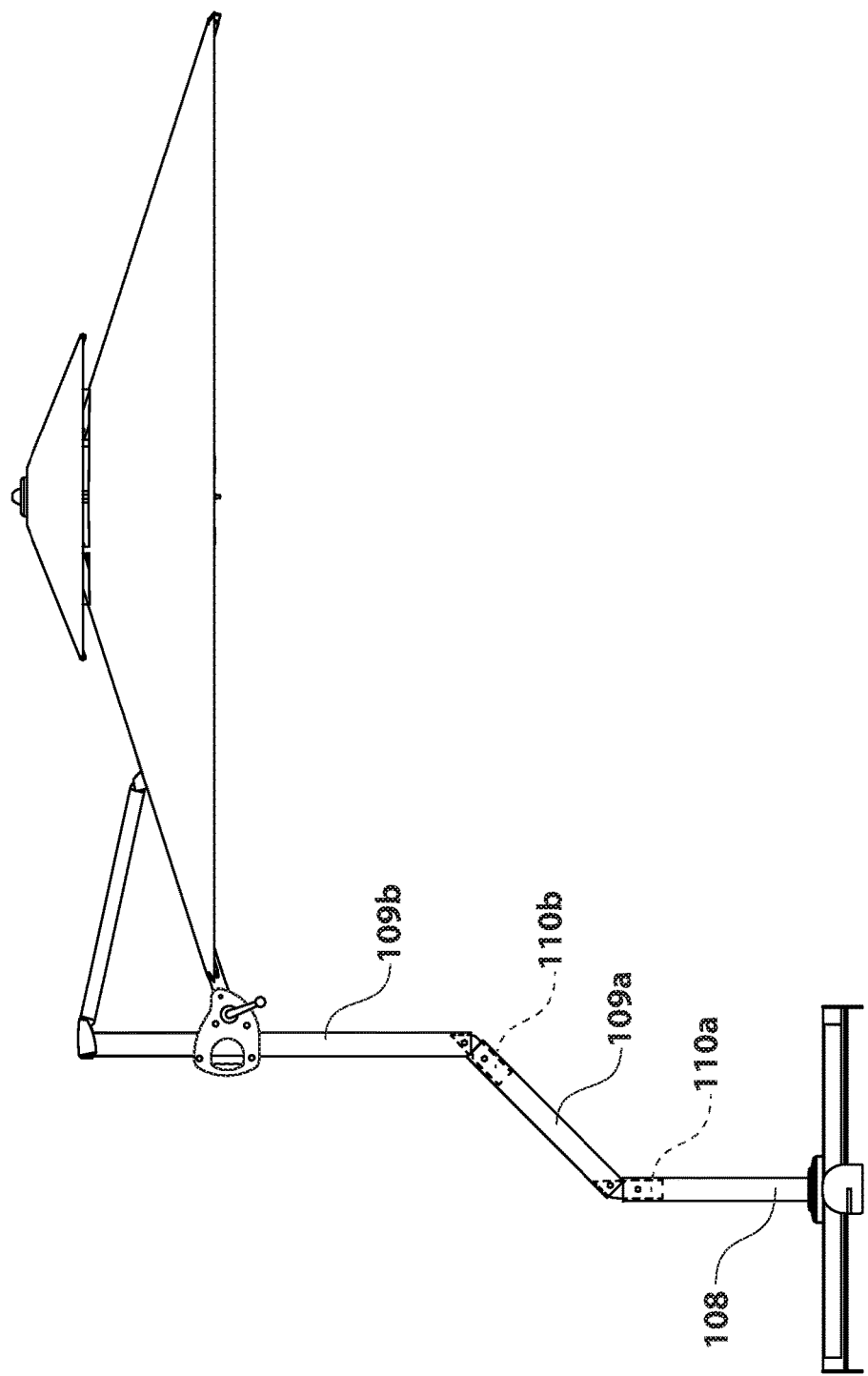
Figure 4C:
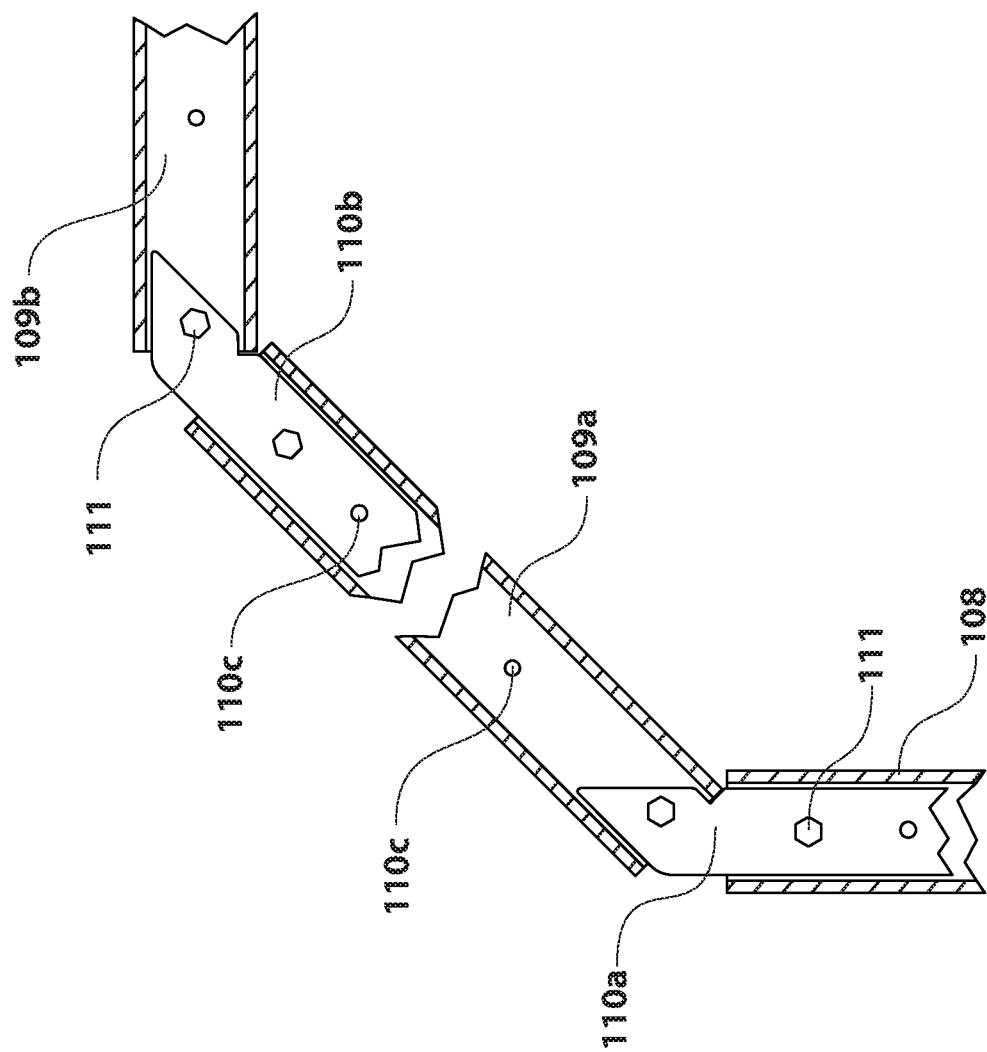
Figure 7:
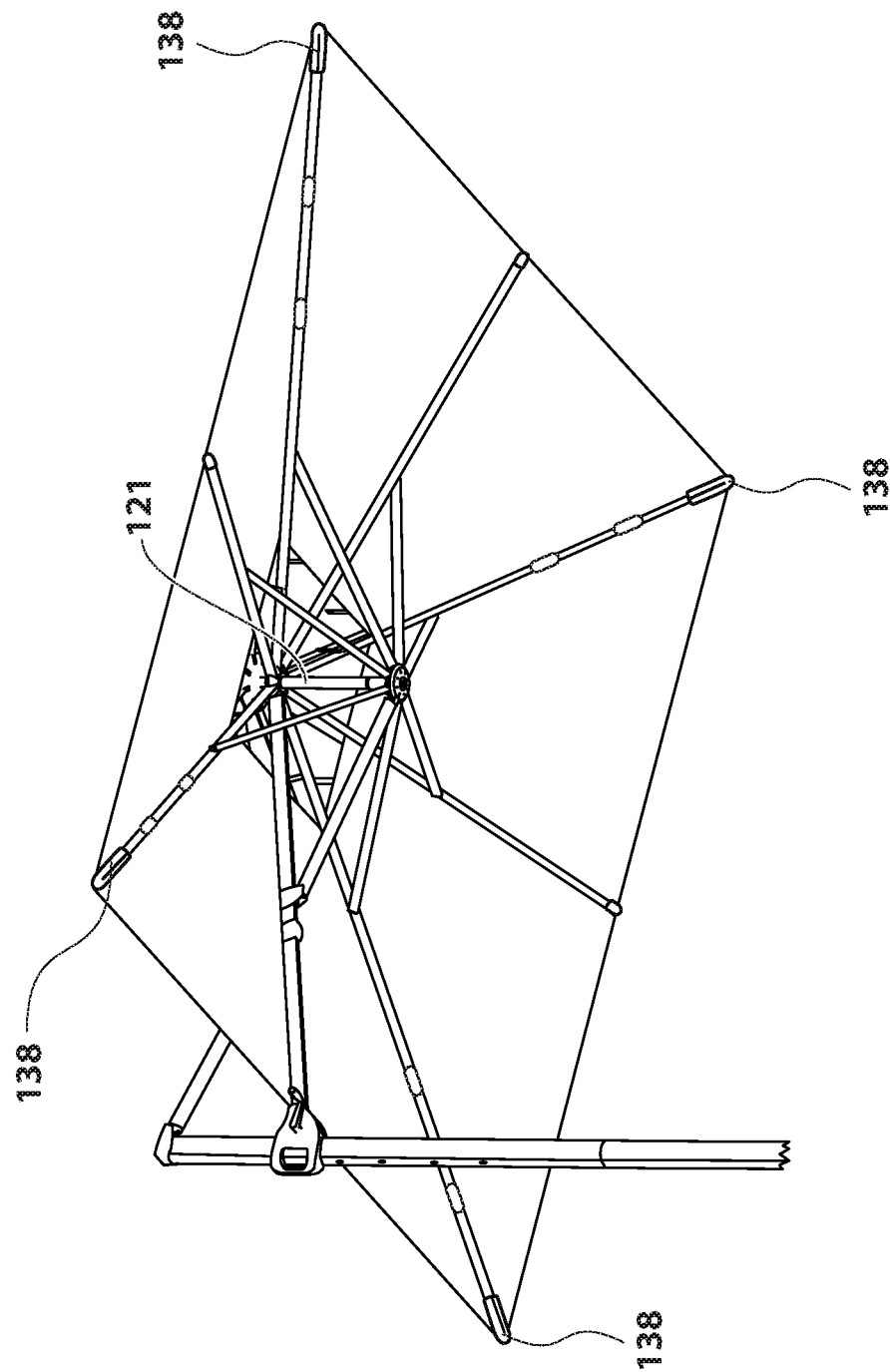
FIGS. 7 and 8 illustrate perspective views of the adjustable water-collector wind-blocker privacy-screen double-awning central canopy system and the adjustable water-collector wind-blocker privacy-screen double-awning multi-angle ring canopy system.
Figure 8:
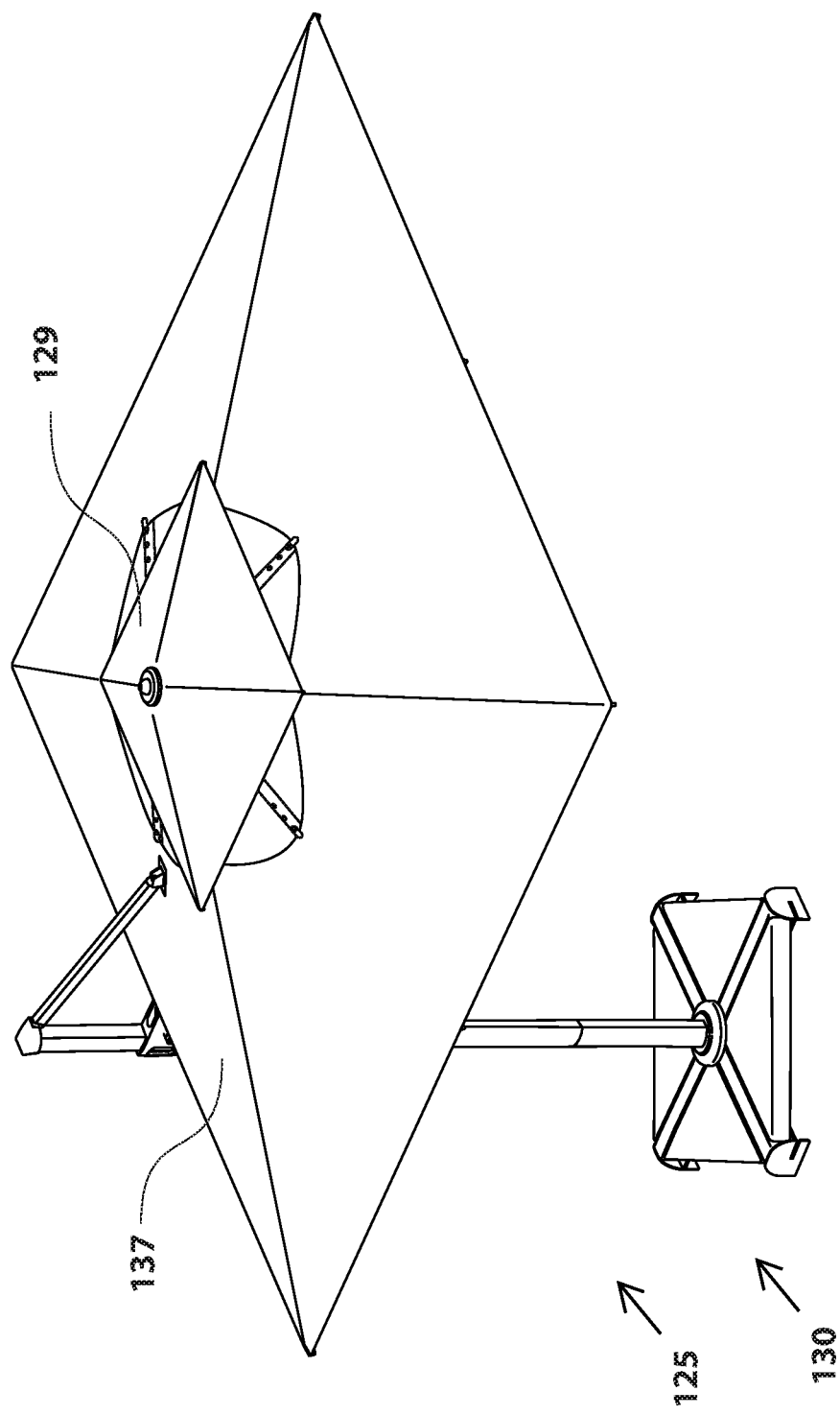

34) First conjoined-double-coil caps 134a respectively are for:
   a) Allowing manufacturers to fold long ribs into shorter first ring-canopy-supporting ribs 132 and shorter second ring-canopy-supporting ribs 133a
      to reduce the length and volume of the shipping package of the multi-angle multi-function umbrella in a shipping container
      to save money from expensive shipping costs
      (see FIG. 1A (Prior Art) and FIG. 1B);
   b) Connecting first ring-canopy-supporting ribs 132 to second ring-canopy-supporting ribs 133a
      to provide strength and structure to the multi-angle multi-function umbrella
      (see FIG. 10A and FIG. 10B); and
   c) Allowing the multi-angle multi-function umbrella to be configured in multiple arrangements
      to provide multiple privacy and protection options
      (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

First conjoined-double-coil axles 134b respectively are for:
   a) Pivotably connecting first conjoined-double-coil caps 134a to first ring-canopy-supporting ribs 132 and second ring-canopy-supporting ribs 133a
      to allow the canopy to be configured in multiple ways
      (see FIG. 10A and FIG. 10B); and
   b) Allowing the multi-angle multi-function umbrella to be configured in multiple arrangements,
      to provide multiple privacy and protection options
      (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

First conjoined-double-coil springs 134c respectively are for:
   a) Springingly pivoting first ring-canopy-supporting ribs 132 and second ring canopy-supporting ribs 133a
      to help lock first ring-canopy-supporting ribs 132 and second ring canopy-supporting ribs 133a
      to provide safety and security to occupants
      (see FIG. 10C and FIG. 10D); and
   b) Allowing the multi-angle multi-function umbrella to be configured in multiple arrangements,
      to provide multiple privacy and protection options
      (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A). Second conjoined-double-coil caps 134d respectively are for:

a) Allowing manufacturers to fold long ribs into shorter first ring-canopy-supporting ribs 132 and shorter second ring-canopy-supporting ribs 133a
   to reduce the length and volume of the shipping package of the multi-angle multi-function umbrella in a shipping container
   to save money from expensive shipping costs
   (see FIG. 1A (Prior Art) and FIG. 1B);
b) Connecting second ring-canopy-supporting ribs 132 to third ring-canopy-supporting ribs 133a
   to provide strength and structure to the multi-angle multi-function umbrella
   (see FIG. 10A and FIG. 10B); and
c) Allowing the multi-angle multi-function umbrella to be configured in multiple arrangements to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

Second conjoined-double-coil axles 134e respectively are for:
a) Pivotably connecting second conjoined-double-coil caps 134a to second ring-canopy-supporting ribs 132 and third ring-canopy-supporting ribs 133a
to allow the canopy to be configured in multiple ways
(see FIG. 10A and FIG. 10B); and
b) Allowing the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

Second conjoined-double-coil springs 134f respectively are for:
a) Springingly pivoting first ring-canopy-supporting ribs 132 and second ring canopy-supporting ribs 133a
to help lock second ring-canopy-supporting ribs 132 and third ring canopy-supporting ribs 133a
to provide safety and security to occupants
(see FIG. 10C and FIG. 10D); and
b) Allowing the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

35) Ring-canopy-arm intersector 135 is for:
Slidably connecting multi-canopy-hanging central tube 121 to ring-canopy rib-supporting arms 136.

36) Ring-canopy-rib-supporting arms 136 is for:
Supporting first ring-canopy-supporting ribs 132 and second ring-canopy-supporting ribs 133.

37) Ring canopy 137 is for:
a) Functioning as a water collector
to collect rain water when used upside down
in the directions of arrows 142 and 143
(see FIG. 16A);
b) Functioning as a wind blocker
to block wind
(see FIG. 20D);
c) Functioning as a privacy screen
to provide privacy
(see FIG. 19F);
d) Functioning as an awning
to angledly block rain and sun beams
(see FIG. 20B);
e) Functioning as a canopy
to vertically block rain and sun beams
(see FIG. 20F);
f) Functioning as a wind redirector
to redirect wind in and out of canopy
in the directions of arrows 144, 145, 146, 147, and 148
(see FIG. 16B, FIG. 16C, and FIG. 16D);
g) Functioning as a wind resistor
to protect the canopy from blowing when corners are attached to ground with ropes and stakes
in the direction of arrow 149
(see FIG. 16D).

38) Four zipper pockets 138 are for:
Connecting the four corners of ring canopy 137 to the four tips of second ring-canopy-supporting ribs 133, respectively.

39) Canopy-size-adjusting flaps 139 are for:
Adjustably being attached to first ring-canopy-supporting ribs 132, respectively
to adjust ring canopy 137 to multiple different sizes.

40) Canopy-size-adjusting holes 140 is for:
Screwing together first ring-canopy-supporting ribs 132 and canopy-size adjusting flaps 139
to adjust ring canopy 137 to multiple different sizes.

Variation

Figure 22B:
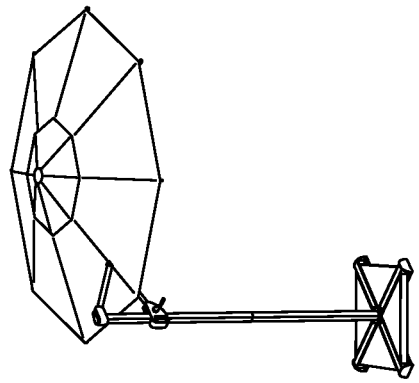
FIG. 22B illustrates a perspective view of an equivalent of the central canopy and an equivalent of the ring canopy.
Figure 22F:
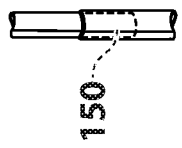
FIG. 22E and FIG. 22F illustrate perspective views of an equivalent of the combination of the lower post, middle post, upper post, and the first and second mounting inner cores.
Figure 22E:
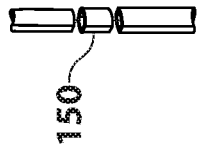
Figure 22A:
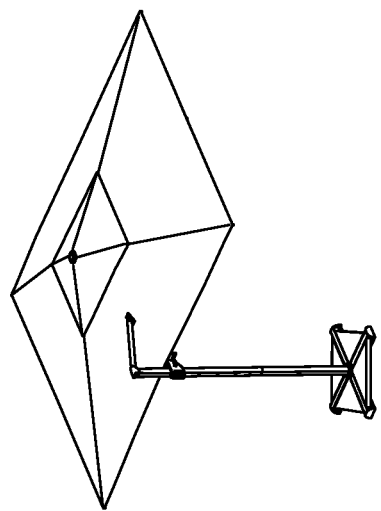
FIG. 22A illustrates a perspective view of an equivalent of one of the four wedging plates of the multi-angle multi-function umbrella.
Figure 22D:
FIG. 22D illustrates a perspective view of an equivalent of the combination of the first ribs, second ribs, third ribs, first caps, first axles, first springs, second caps, second axles, and second springs.
Figure 22C:
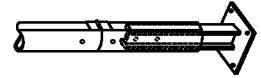
FIG. 22C illustrates a perspective view of an equivalent of the combination of the lower post, middle post, upper post, and the first and second mounting inner cores.

Any component of the multi-angle multi-function umbrella can have any shape and size. Any component of the multi-angle multi-function umbrella can be made of any material or any combination of any materials. Any component of the multi-angle multi-function umbrella can be made of any flexible, semi-flexible, bendable, semi-bendable, rigid, or semi-rigid material(s). The multi-angle multi-function umbrella can have at least one post, each equivalent to lower post 108, middle post 109a, or upper post 109b. The multi-angle multi-function umbrella can have at least one inner core, each equivalent to mounting inner core 110a or 110b. The multi-angle multi-function umbrella can have at least one rib, each equivalent to one of central-canopy-supporting ribs 127. The multi-angle multi-function umbrella can have at least one rib, each equivalent to one of ring-canopy-supporting ribs 132, 133a, or 133b. FIG. 22A illustrates a perspective view of an equivalent of one of four multi-base-connecting fence-wedging deck-wedging plates 105 of the multi-angle multi-function umbrella. FIG. 22B illustrates a perspective view of an equivalent of central canopy 129 and an equivalent of ring canopy 137. FIG. 22C illustrates a perspective view of an equivalent of the combination of lower post 108, middle post 109a, upper post 109b, and first and second mounting inner cores 110a and 110b. The equivalent comprises a lower post, an upper post hinged to the lower post, and an inner core having an I-shape cross-section and welded to mounting plate 104. The inner core is for being inserted into and crewed to the lower and the upper posts. FIG. 22D illustrates a perspective view of an equivalent of the combination of first ribs 132, second ribs 133a, third ribs 133b, first caps 134a, first axles 134b, first springs 134c, second caps 134d, second axles 134e, and second springs 134f. The equivalent comprises first ribs, second ribs, caps, axles, and springs. FIG. 22E and FIG. 22F illustrate perspective views of an equivalent of the combination of lower post 108, middle post 109a, upper post 109b, and first and second mounting inner cores 110a and 110b. The equivalent comprises a lower post, an upper post, and a tubular inner core 150 welded to mounting plate 104. Inner core 150 has a diameter smaller than that of the lower post and larger than that of the upper post.

MAJOR ADVANTAGES OF THE INVENTION

The present invention substantially departs from the conventional concepts and designs of the prior art. In doing so, the present invention provides a multi-angle multi-function umbrella (having: 1) Multi-function fence-mountable balcony-mountable bumper-mountable hitch-mountable base system, 2) Multi-function fence-mountable balcony-mountable bumper-mountable hitch-mountable post system, 3) Height-adjusting angle-adjusting multi-canopy-deploying system, 4) Adjustable water-collector wind-blocker privacy-screen double-awning central canopy system, and 5) Adjustable water-collector wind-blocker privacy-screen double-awning multi-angle ring canopy system) having many unique and significant features, functions, and advantages, which overcome all the disadvantages of the prior art, as follows:

1) It is yet another object of the new invention to provide a multi-angle multi-function umbrella, having
first conjoined-double-coil caps 134a.
Therefore, the multi-angle multi-function umbrella:
a) Can allow manufacturers to divide long ribs into shorter first ring-canopy-supporting ribs 132 and shorter second ring-canopy-supporting ribs 133a
to reduce the length and volume of the shipping package of the multi-angle multi-function umbrella in a shipping container to save money from expensive shipping costs
(see FIG. 1A (Prior Art) and FIG. 1B);
b) Can connect first ring-canopy-supporting ribs 132 to second ring-canopy-supporting ribs 133a,
to provide strength and structure to the multi-angle multi-function umbrella
(see FIG. 10A and FIG. 10B); and
c) Can allow the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

2) It is still yet another object of the new invention to provide a multi-angle multi-function umbrella, having
first conjoined-double-coil axles 134b.
Therefore, the multi-angle multi-function umbrella:
a) Can pivotably connect first conjoined-double-coil caps 134a to first ring-canopy-supporting ribs 132 and second ring-canopy-supporting ribs 133a
to allow the canopy to be configured in multiple ways
(see FIG. 10A and FIG. 10B); and
b) Can allow the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

3) It is even yet another object of the new invention to provide a multi-angle multi-function umbrella, having
first conjoined-double-coil springs 134c.
Therefore, the multi-angle multi-function umbrella:
a) Can springingly pivot first ring-canopy-supporting ribs 132 and second ring canopy-supporting ribs 133a
to help lock first ring-canopy-supporting ribs 132 and second ring canopy-supporting ribs 133a
to provide safety and security to occupants
(see FIG. 10C and FIG. 10D); and
b) Can allow the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

4) It is yet another object of the new invention to provide a multi-angle multi-function umbrella, having
second conjoined-double-coil caps 134d.
Therefore, the multi-angle multi-function umbrella:
a) Can allow manufacturers to fold long ribs into shorter second ring-canopy supporting ribs 133a and shorter third ring-canopy-supporting ribs 133b
to reduce the length and volume of the shipping package of the multi-angle multi-function umbrella in a shipping container
to save money from expensive shipping costs
(see FIG. 1A (Prior Art), FIG. 1B, FIG. 3B, and FIG. 3C);
b) Can connect second ring-canopy-supporting ribs 133a to third ring-canopy-supporting ribs 133b,
to provide strength and structure to the multi-angle multi-function umbrella
(see FIG. 10A and FIG. 10B); and
c) Can allow the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

5) It is still yet another object of the new invention to provide a multi-angle multi-function umbrella, having
second conjoined-double-coil axles 134e.
Therefore, the multi-angle multi-function umbrella:
a) Can pivotably connect second conjoined-double-coil caps 134d to second ring-canopy-supporting ribs 133a and third ring-canopy-supporting ribs 133b
to allow the canopy to be configured in multiple ways
(see FIG. 10A and FIG. 10B); and
b) Can allow the multi-angle multi-function umbrella to be configured in multiple arrangements,
to provide multiple privacy and protection options
(see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

6) It is even yet another object of the new invention to provide a multi-angle multi-function umbrella, having
second conjoined-double-coil springs 134f.
Therefore, the multi-angle multi-function umbrella:
a) Can springingly pivot second ring-canopy-supporting ribs 133a and third ring canopy-supporting ribs 133b
to help lock second ring-canopy-supporting ribs 133a and third ring canopy-supporting ribs 133b
to provide safety and security to occupants
(see FIG. 10C and FIG. 10D); and
b) Can allow the multi-angle multi-function umbrella to be configured in multiple arrangements,
to provide multiple privacy and protection options (see FIG. 16H, FIG. 16I, FIG. 16J, FIG. 16K, FIG. 16L, FIG. 16M, FIG. 16N, FIG. 16O, FIG. 16P, FIG. 16Q, FIG. 16R, FIG. 16S, FIG. 16T, FIG. 16U, FIG. 16V, FIG. 16W, FIG. 16X, FIG. 16Y, FIG. 16Z, and FIG. 17A).

7) It is still another object of the new invention to provide a multi-angle multi-function umbrella, having
a first mounting inner core 110a.
Therefore, the multi-angle multi-function umbrella:
  a) Can allow lower post 108 and middle post 109a to angledly configure the multi-angle multi-function umbrella
    to increase functionality by providing additional configuration options
    (see FIG. 4A, FIG. 4B, FIG. 4C, FIG. 4D, FIG. 16A, FIG. 16E, FIG. 16F, and FIG. 16G);
  b) Can allow manufacturers to divide a long post into shorter lower post 108, shorter middle post 109a, and shorter upper post 109b
    to reduce the length and volume of the shipping package of the multi-angle multi-function umbrella in a shipping container to save money from expensive shipping costs
    (see FIG. 1A (Prior Art) and FIG. 1B);
  c) Can mount middle post 109a on lower post 108,
    to strengthen post
    (see FIG. 4B);
  d) Can mount middle post 109a on a fence,
    to provide shade and protection when a fence is accessible
    (see FIG. 19E);
  e) Can mount upper post 109a on a balcony,
    to provide shade and protection when a balcony is accessible
    (see FIG. 20E);
  f) Can mount upper post 109a on a bumper,
    to provide shade and protection when a bumper is accessible
    (see FIG. 19B);
  g) Can mount upper post 109a on a hitch,
    to provide shade and protection when a hitch is accessible
    (see FIG. 19C);
  h) Can mount upper post 109a on a tailgate,
    to provide shade and protection when a tailgate is accessible
    (see FIG. 19A);
  i) Can mount upper post 109a on a table,
    to provide shade and protection when a table is accessible
    (see FIG. 19D);
  j) Can mount upper post 109a on a column,
    to provide shade and protection when a column is accessible
    (see FIG. 19F); and
  k) Can mount upper post 109a on a wall,
    to provide shade and protection when a wall is accessible
    (see FIG. 20A).

8) It is still another object of the new invention to provide a multi-angle multi-function umbrella, having
a second mounting inner core 110b.
Therefore, the multi-angle multi-function umbrella:
  a) Can allow middle post 109a and upper post 109b to angledly configure the multi-angle multi-function umbrella
    to increase functionality by providing additional configuration options
    (see FIG. 4A, FIG. 4B, FIG. 4C, FIG. 16A, FIG. 16E, FIG. 16F, and FIG. 16G);
  b) Can allow manufacturers to divide a long post into shorter middle post 109a and shorter upper post 109b
    to reduce the length and volume of the shipping package of the multi-angle multi-function umbrella in a shipping container to save money from expensive shipping costs
    (see FIG. 1A (Prior Art) and FIG. 1B);
  c) Can mount upper post 109b on middle post 109a,
    to strengthen post
    (see FIG. 4B);
  d) Can mount middle post 109b on a fence,
    to provide shade and protection when a fence is accessible
    (see FIG. 19E);
  e) Can mount upper post 109b on a balcony,
    to provide shade and protection when a balcony is accessible
    (see FIG. 20E);
  f) Can mount upper post 109b on a bumper,
    to provide shade and protection when a bumper is accessible
    (see FIG. 19B);
  g) Can mount upper post 109b on a hitch,
    to provide shade and protection when a hitch is accessible
    (see FIG. 19C);
  h) Can mount upper post 109b on a tailgate,
    to provide shade and protection when a tailgate is accessible
    (see FIG. 19A);
  i) Can mount upper post 109b on a table,
    to provide shade and protection when a table is accessible
    (see FIG. 19D);
  j) Can mount upper post 109b on a column,
    to provide shade and protection when a column is accessible
    (see FIG. 19F); and
  k) Can mount upper post 109b on a wall,
    to provide shade and protection when a wall is accessible
    (see FIG. 20A).

9) It is a further object of the new invention to provide a multi-angle multi-function umbrella, having
core-securing bolts 111.
Therefore, the multi-angle multi-function umbrella:
  a) Can secure together lower post 108, upper post 109a, upper post 109b, and first and second mounting inner core 110a and 110b,
    to provide to provide height and strength to the multi-angle multi-function umbrella
    (see FIG. 4A); and
  b) Can secure first and second mounting inner cores 110a and 110b to a fence, a balcony, a bumper, a hitch, a tailgate, a table, a column, and a wall,
    to allow for multiple options of shade and protection
    (see FIG. 19E, FIG. 20F, FIG. 18A, FIG. 19C, FIG. 19A, FIG. 19D, FIG. 19F, and FIG. 20D).

10) It is an object of the new invention to provide a multi-angle multi-function umbrella, having
a mounting plate 104.

Figure 18A:
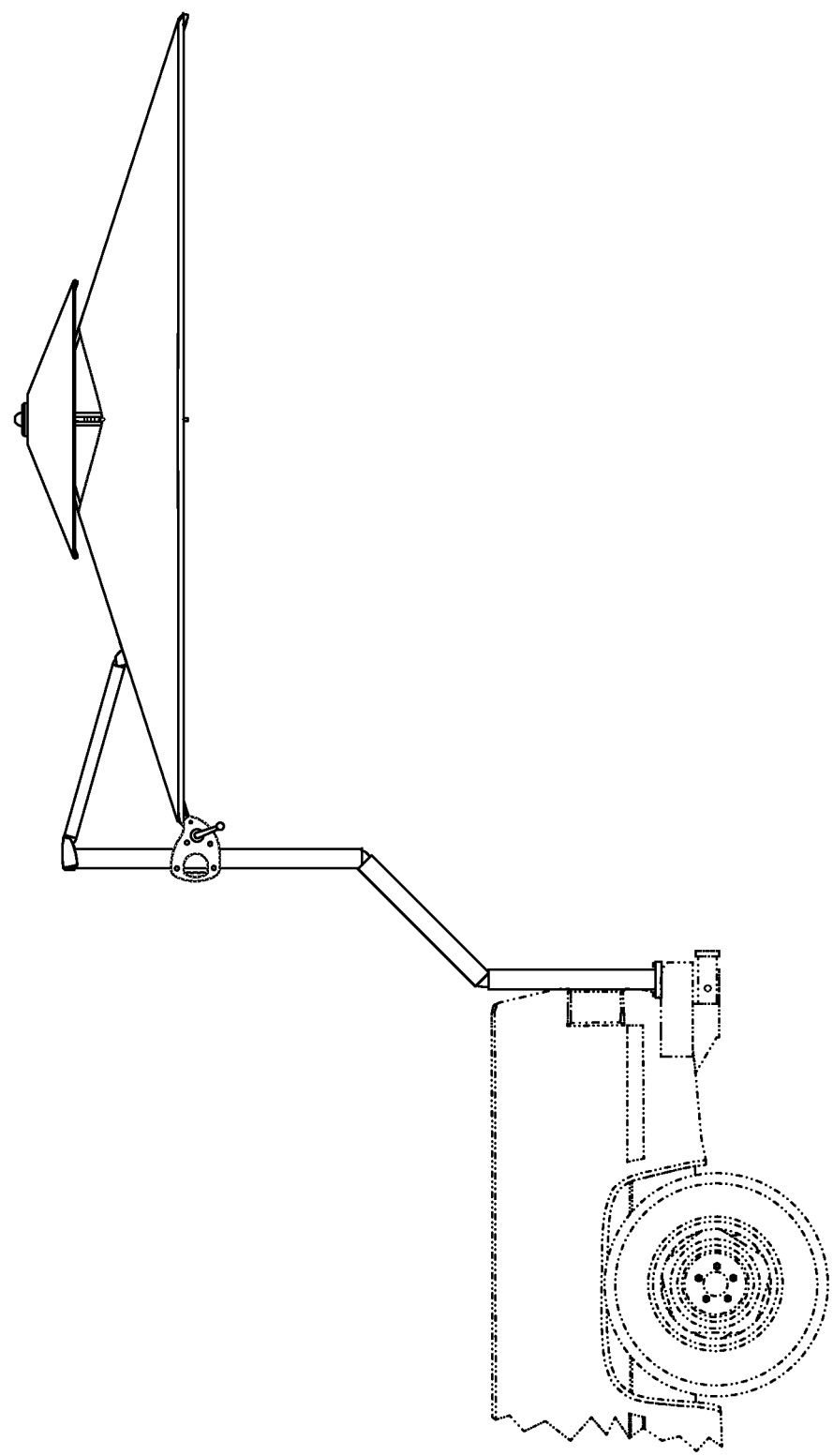
Figure 18B:
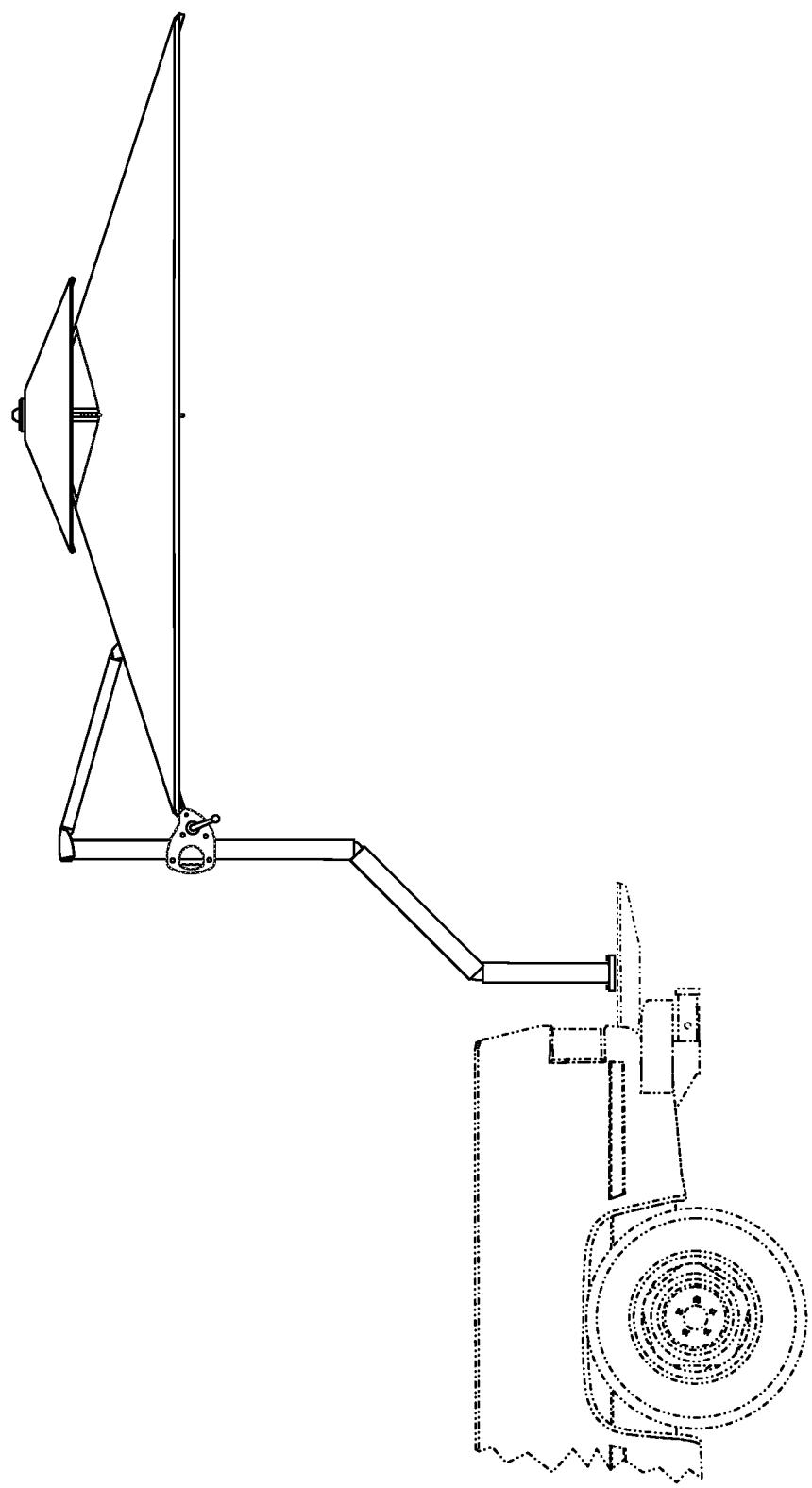
Figure 18D:
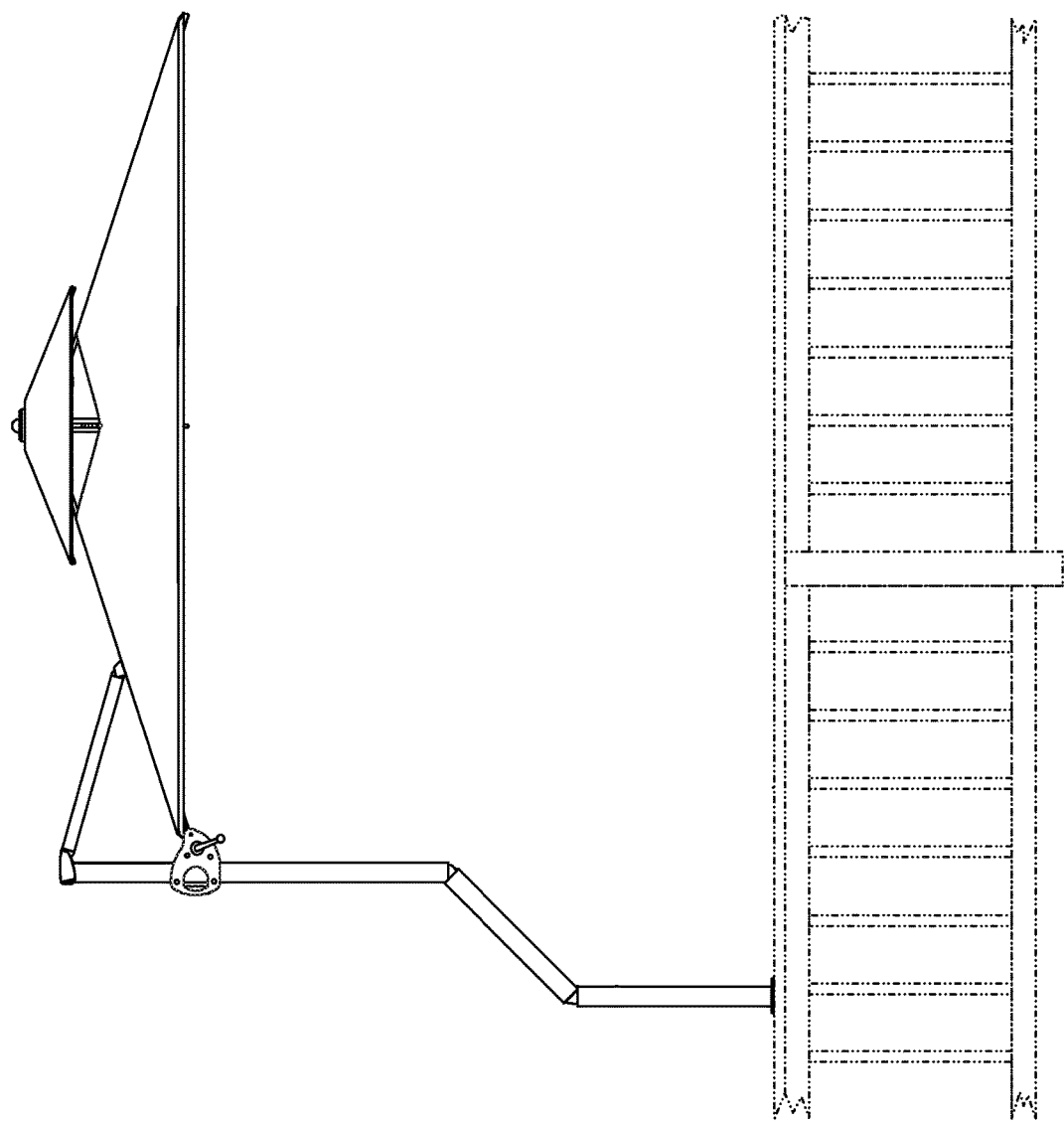
Figure 18F:
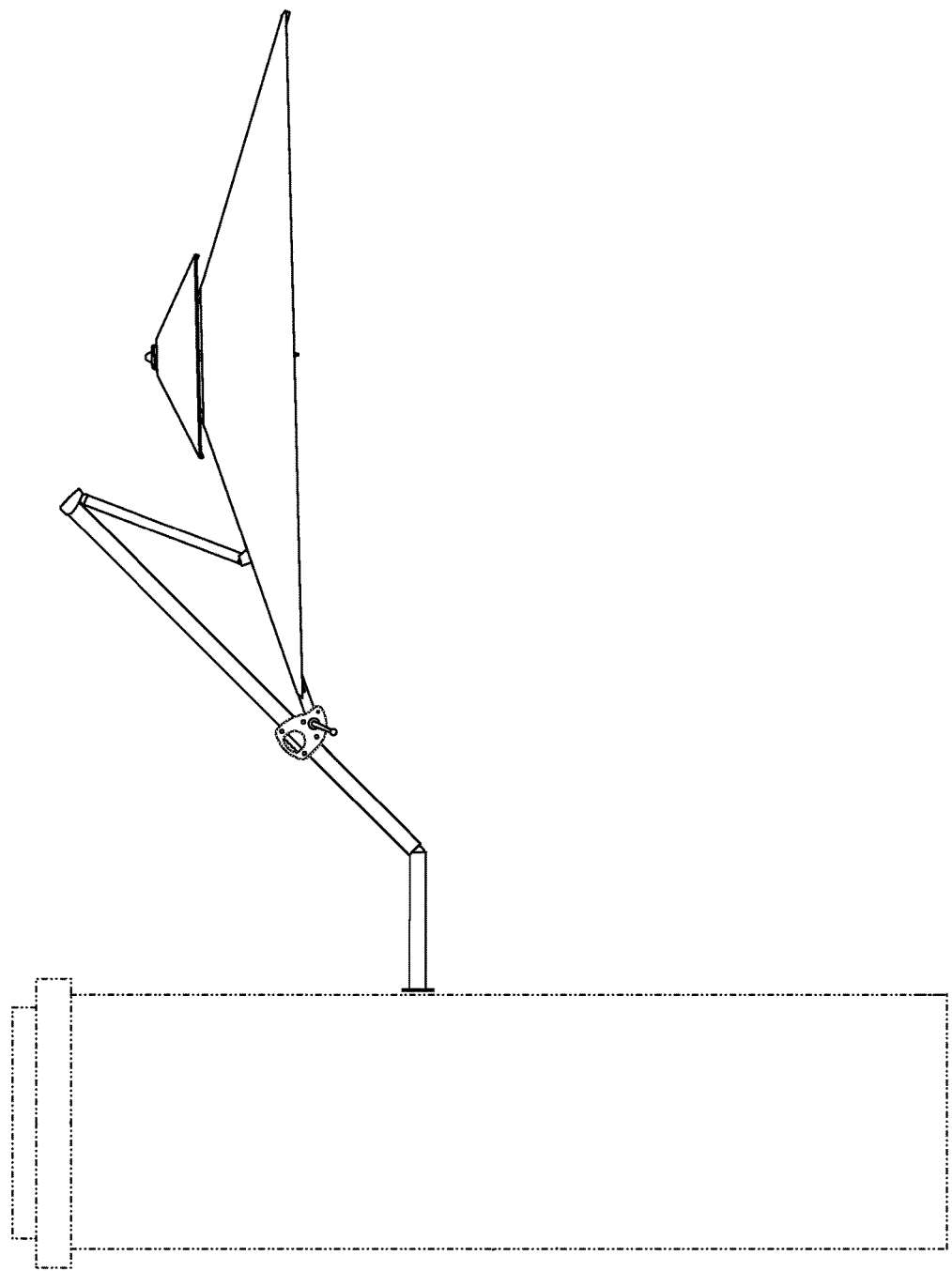
Figure 19B:
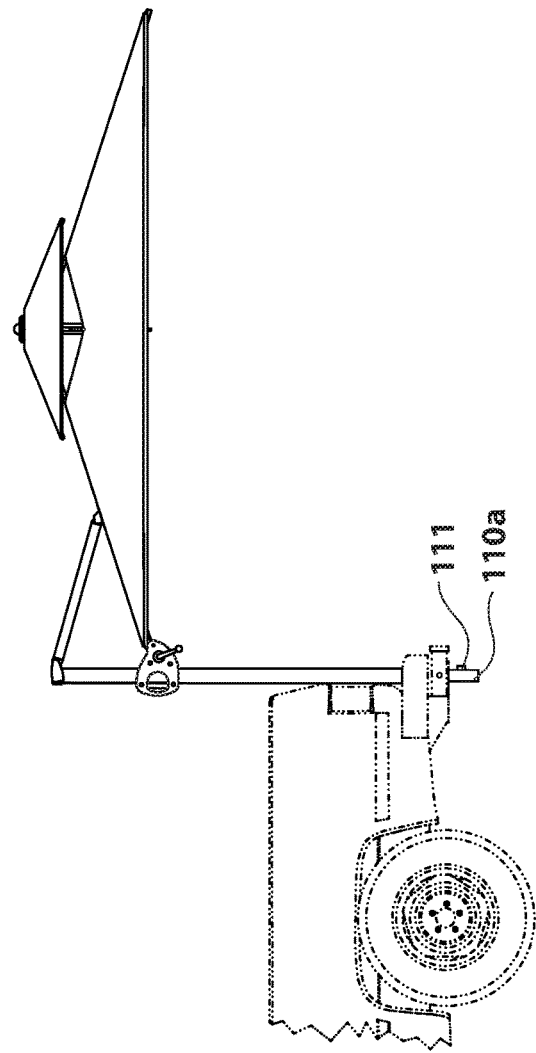
Figure 19C:
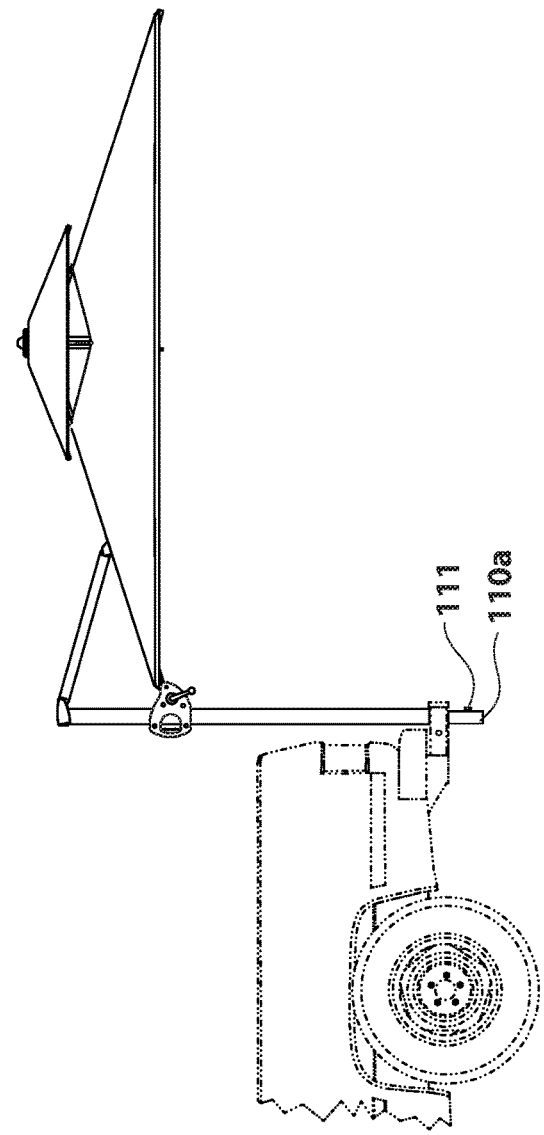
Figure 19F:
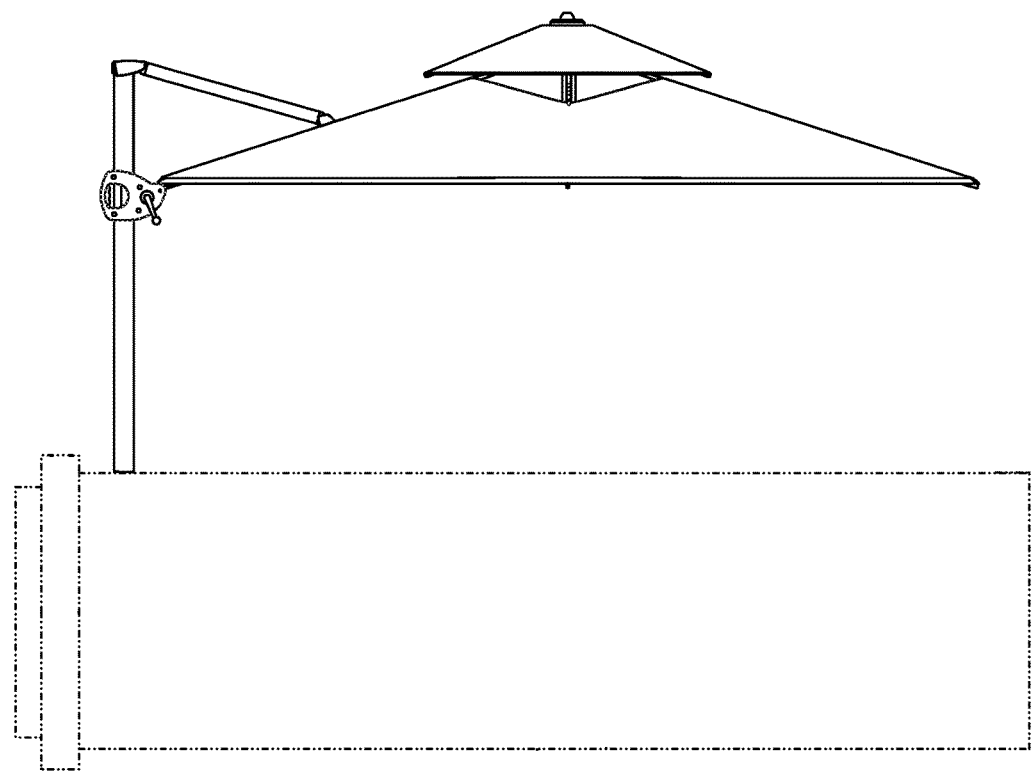
Figure 19G:
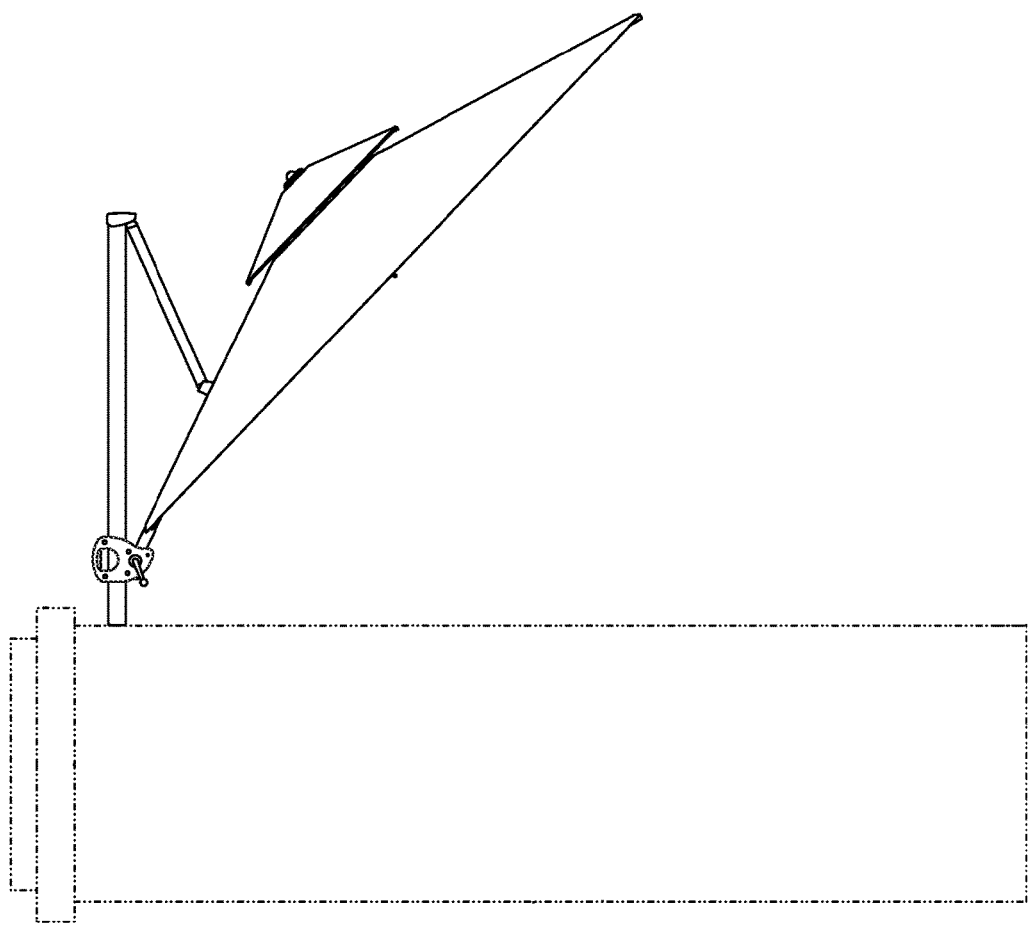
Figure 20A:
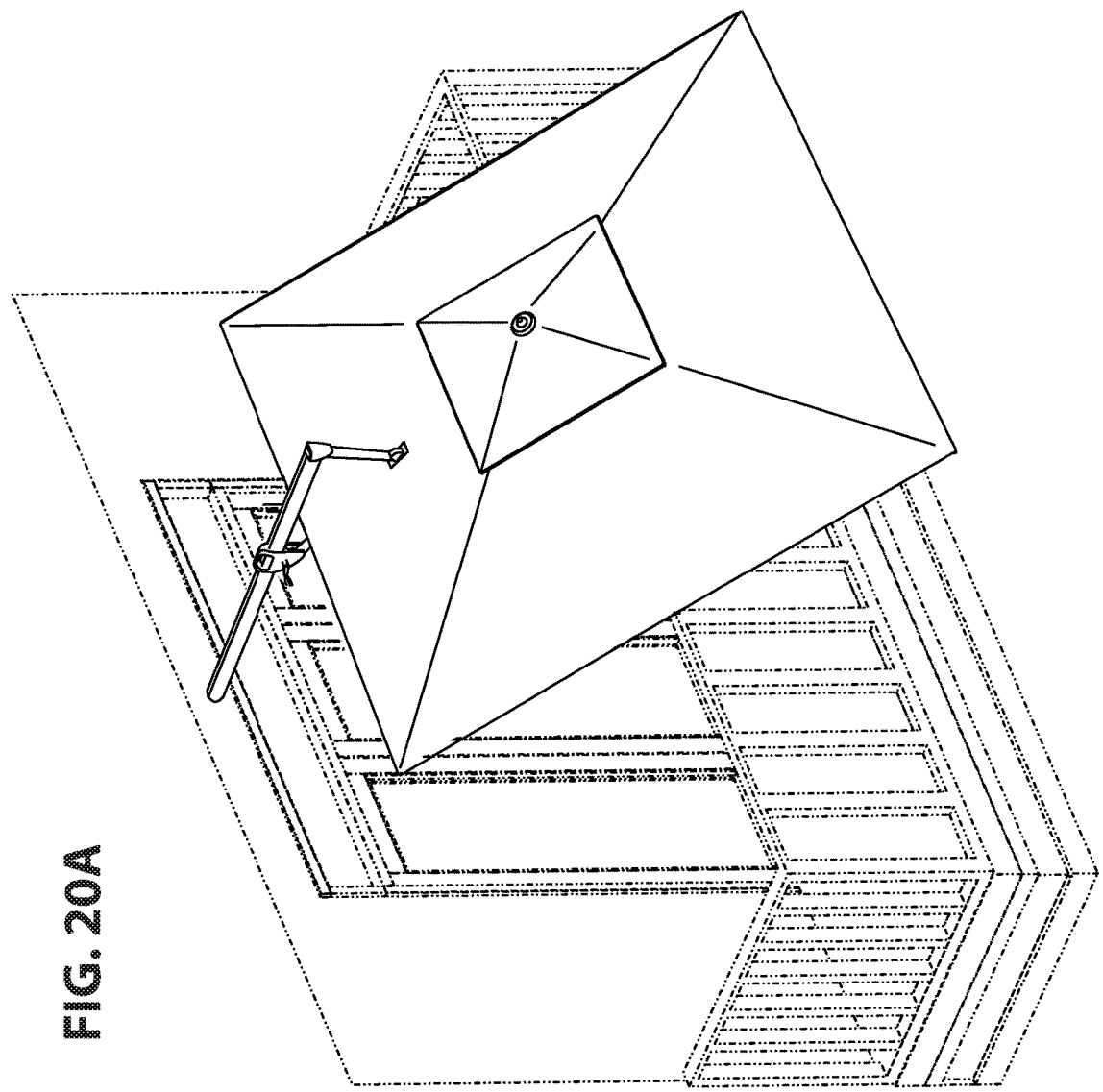
FIG. 20A, FIG. 20B, FIG. 20C, FIG. 20D, FIG. 20E, FIG. 20F, FIG. 20G, and FIG. 20H illustrate perspective views of how the multi-angle multi-function umbrella can be attached to a wall and balcony using the mounting plate or the first mounting inner core.
Figure 20B:
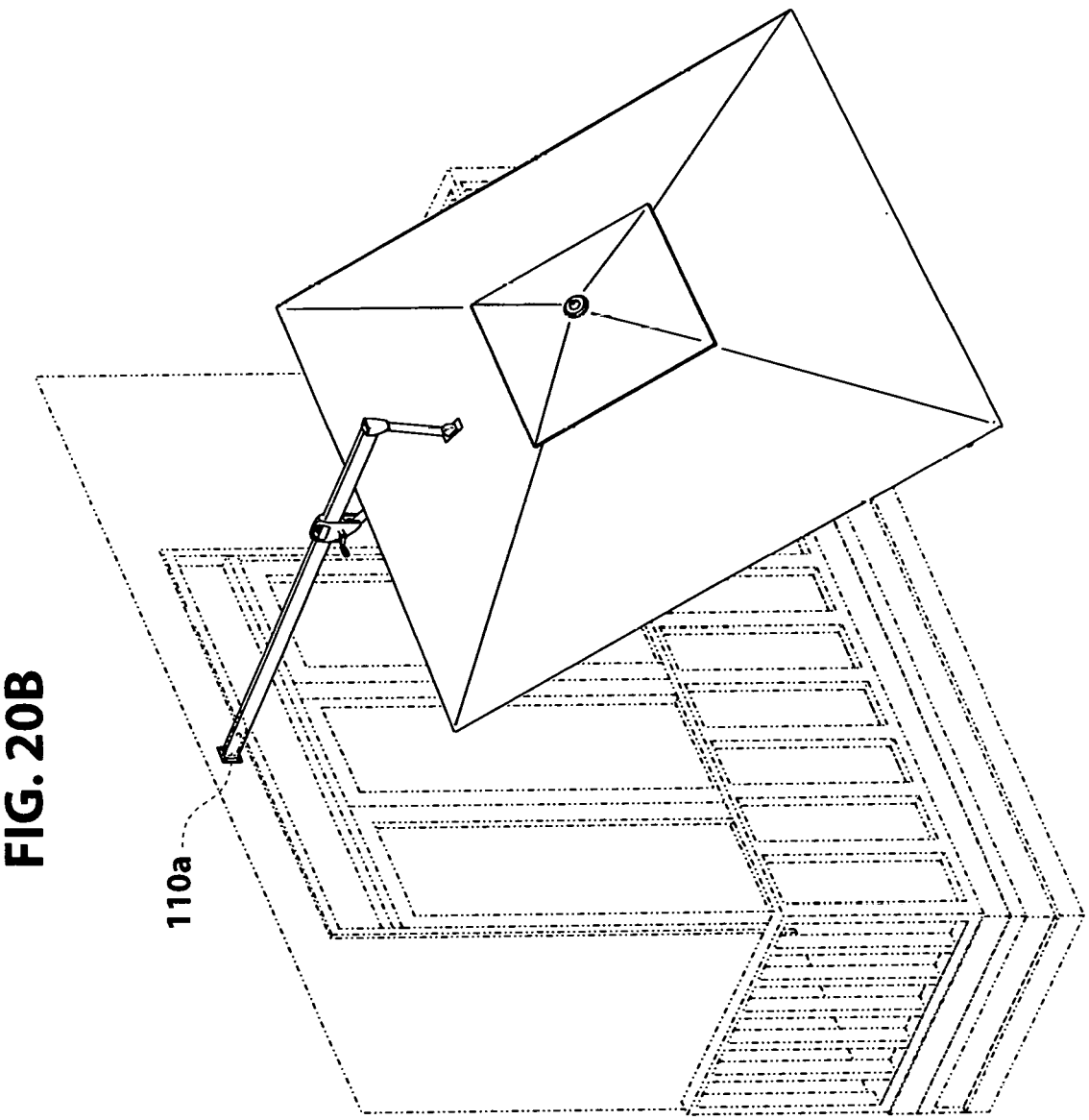
Figure 20C:
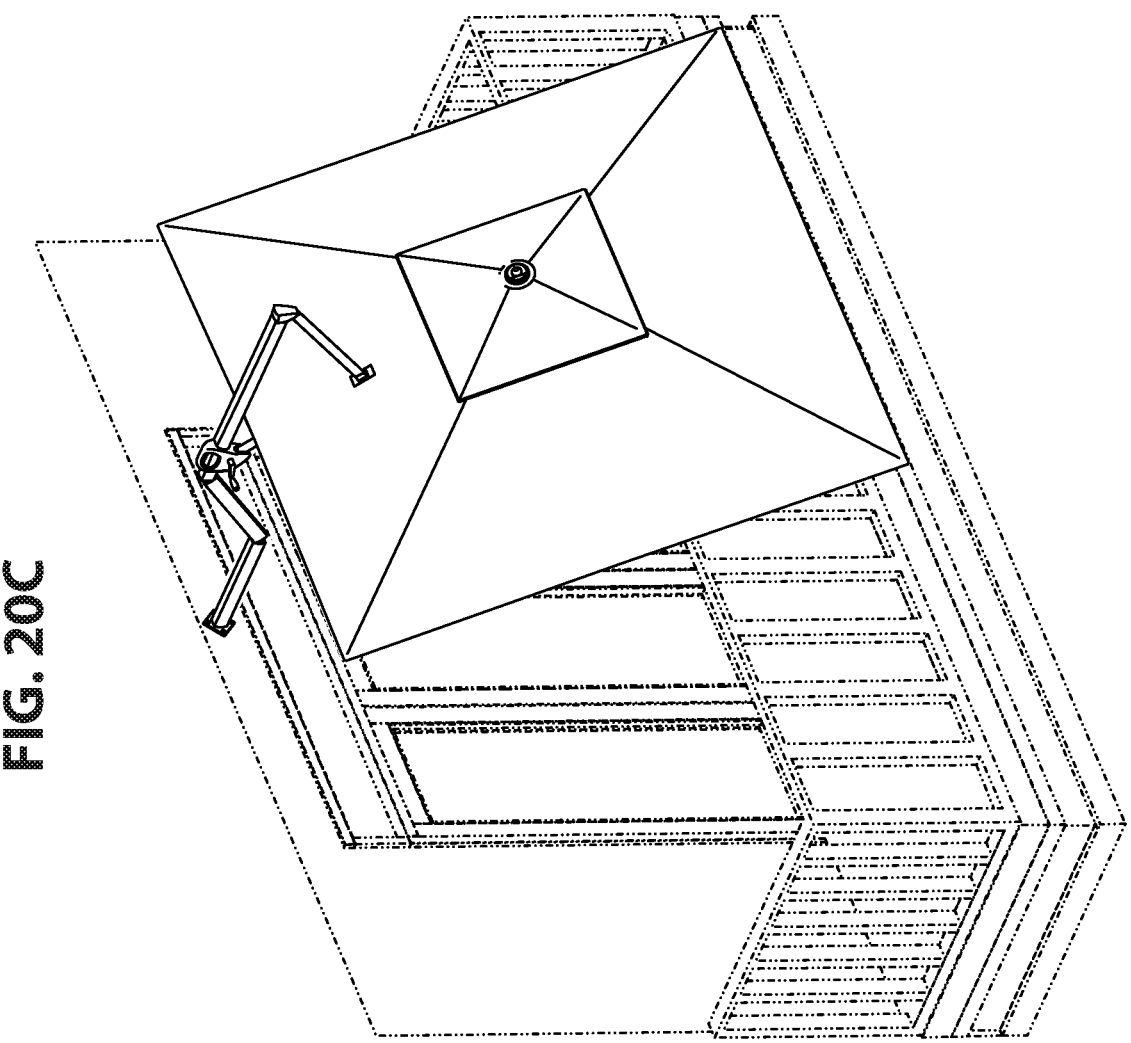
Figure 20D:
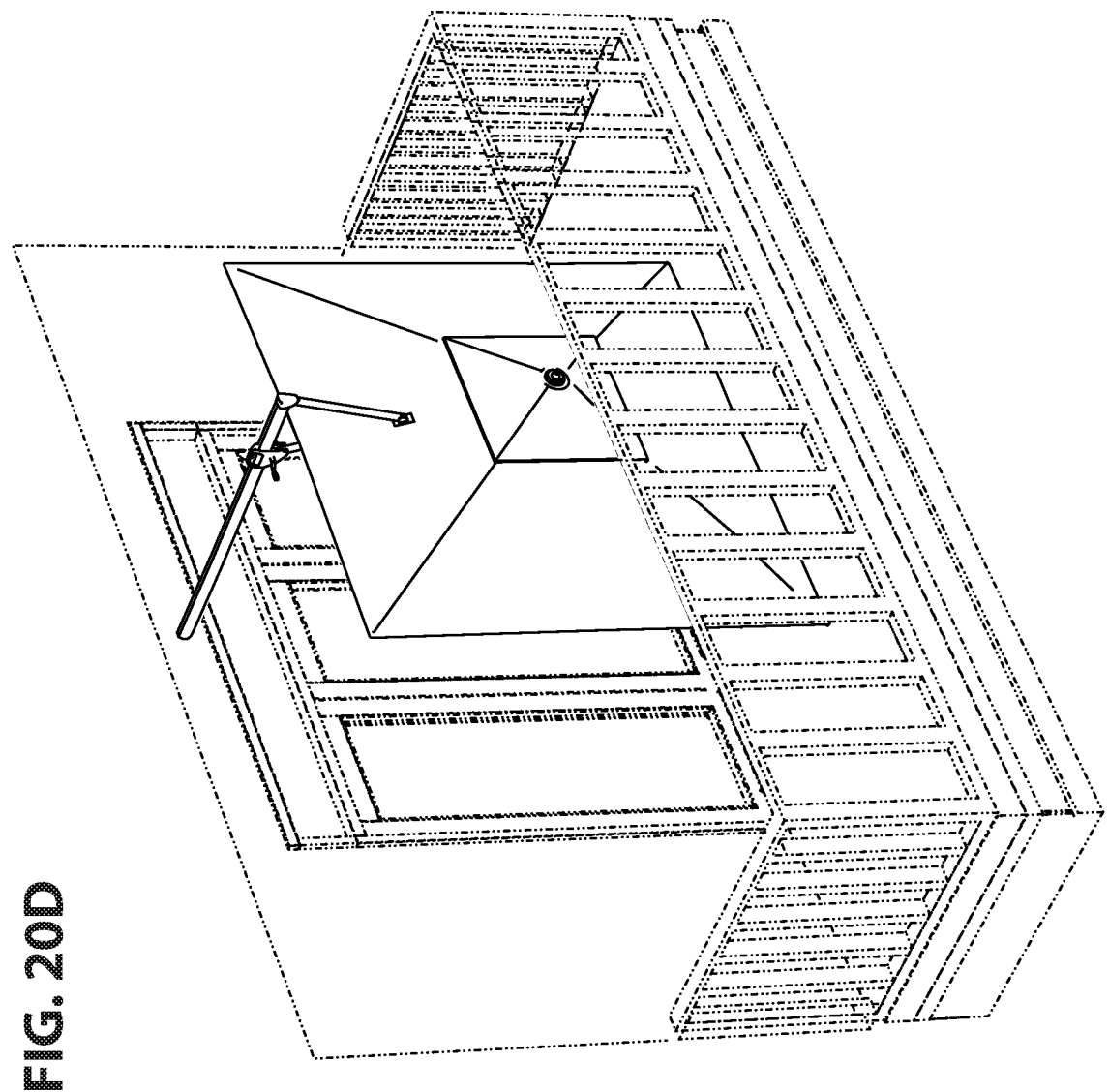
Figure 20E:
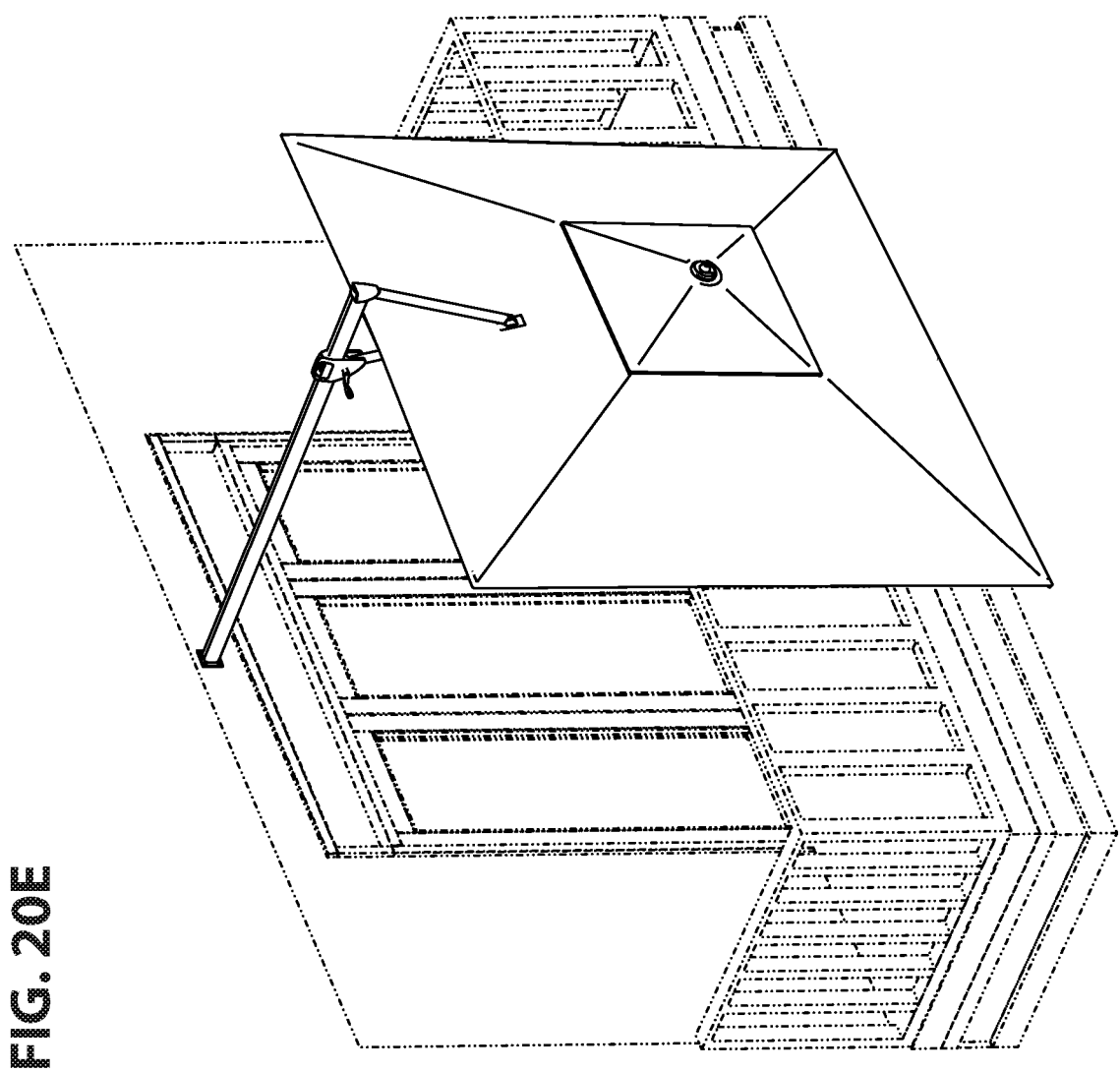
Figure 20F:
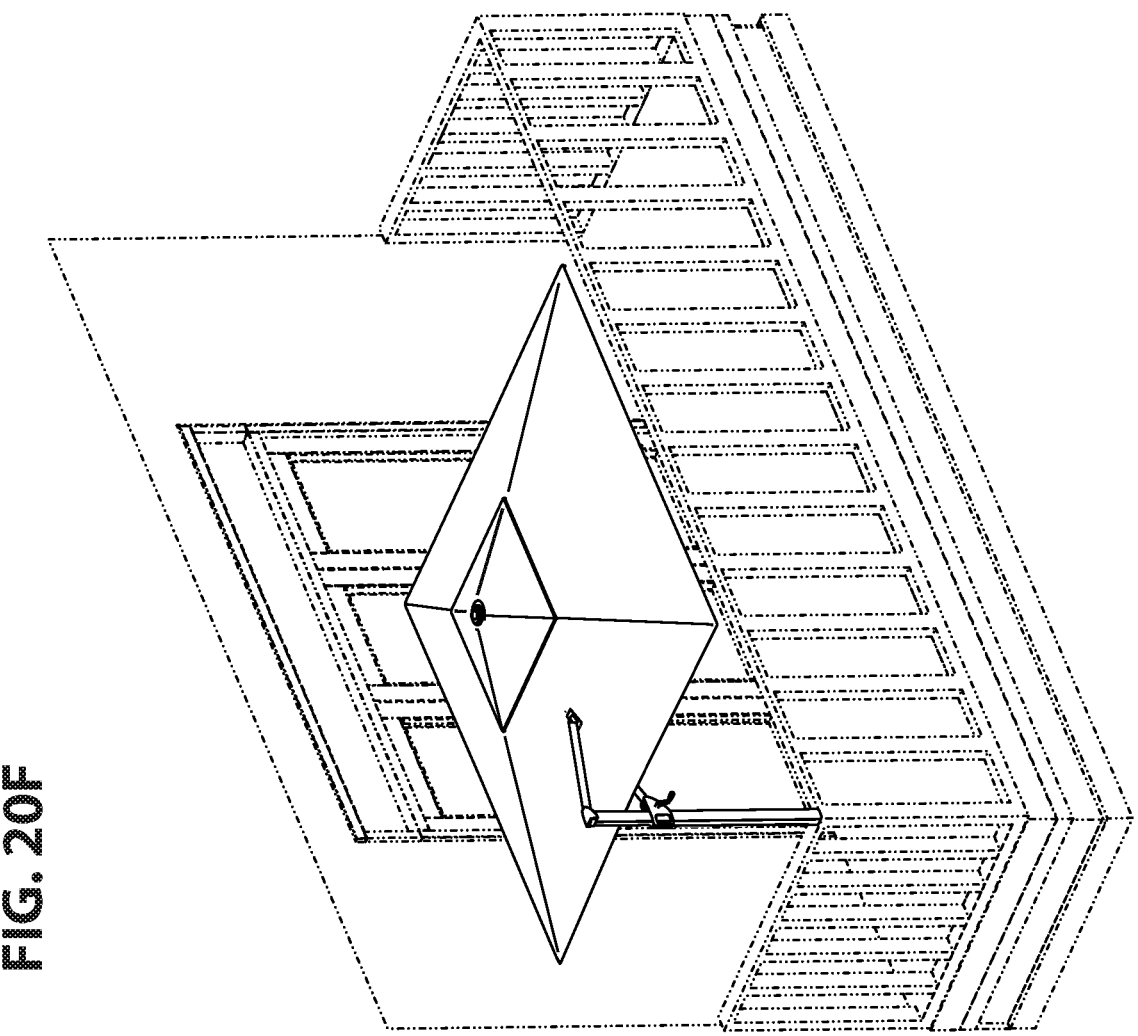
Figure 20G:
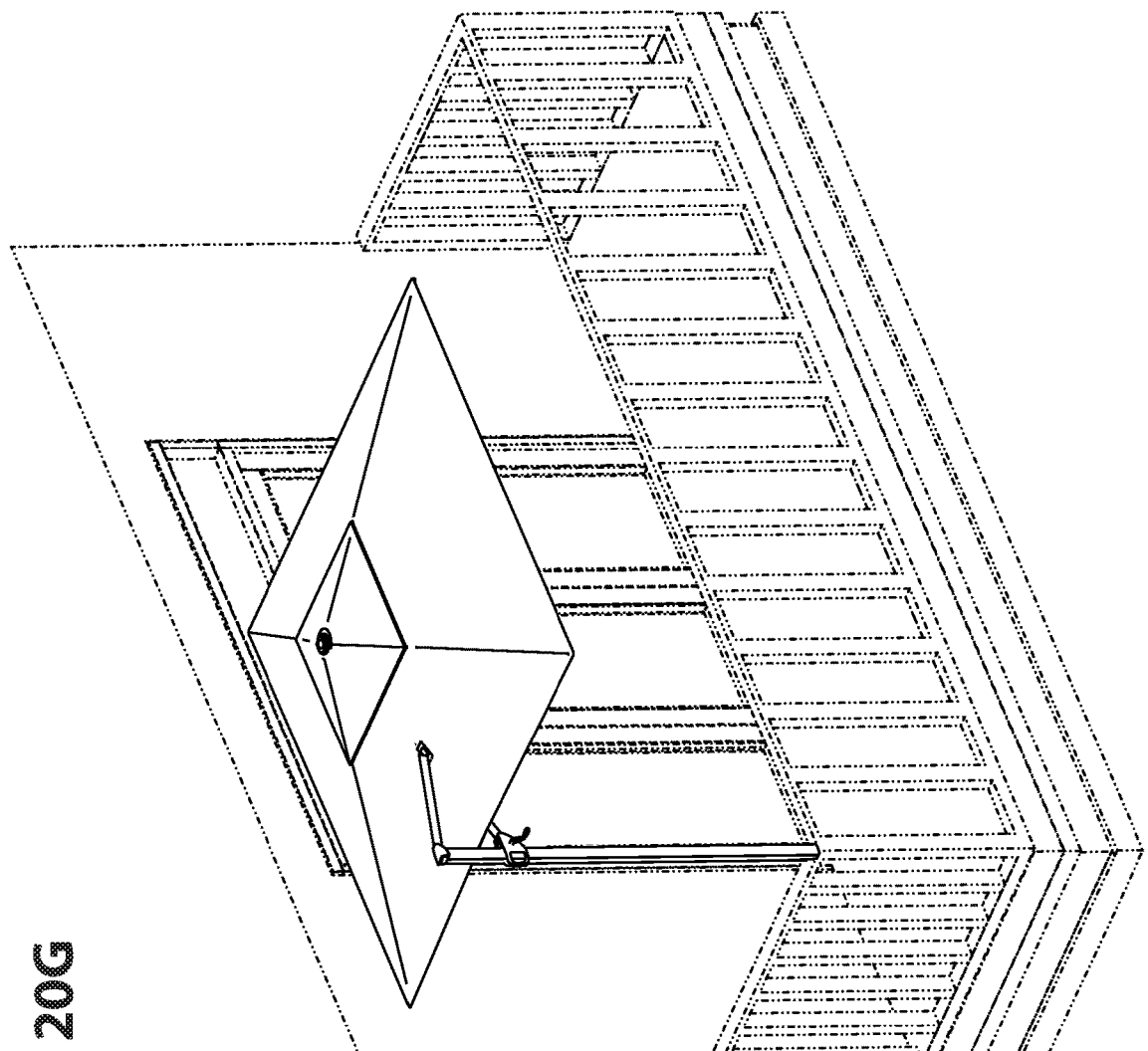
Figure 20H:
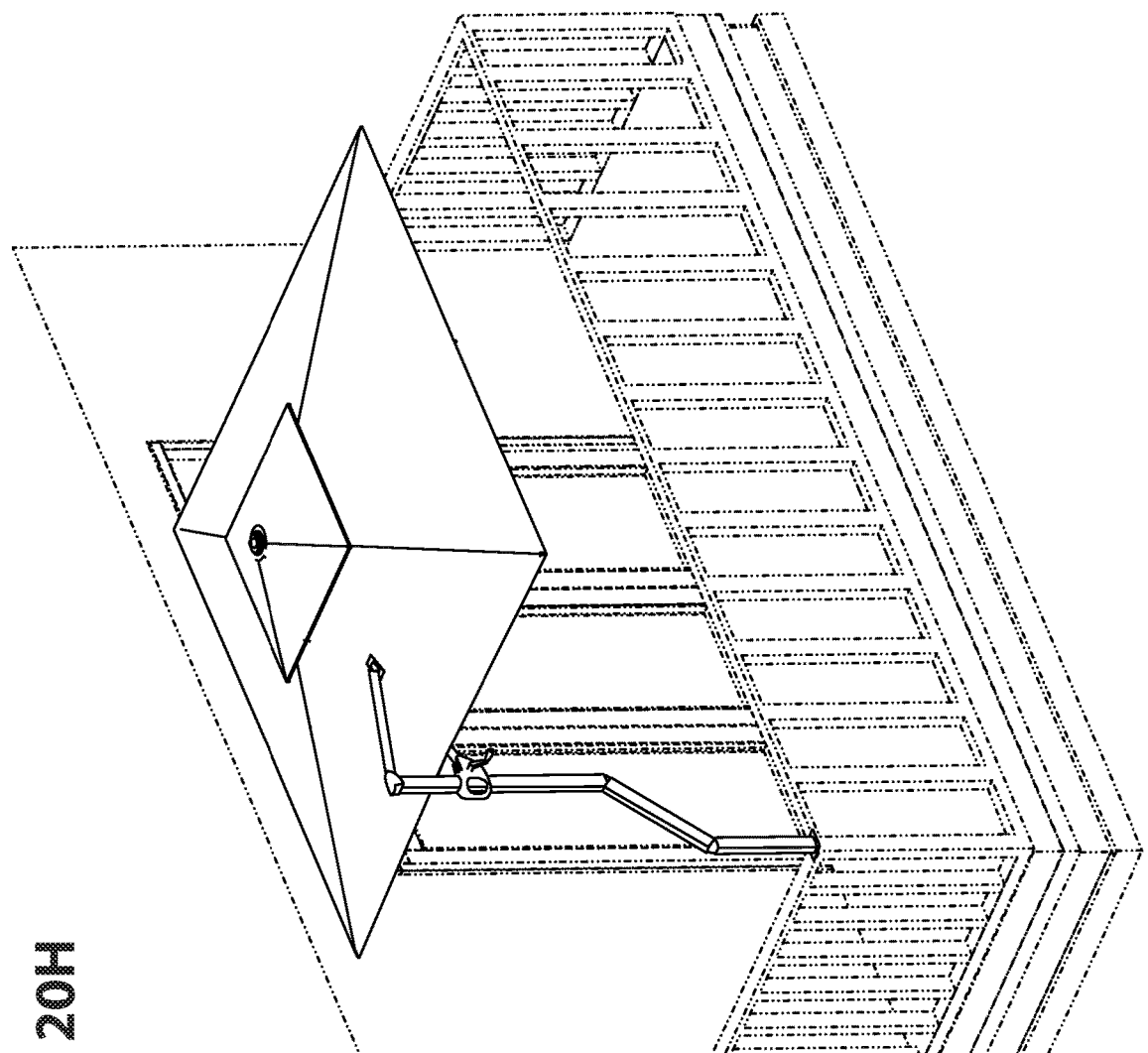
Figure 21E:
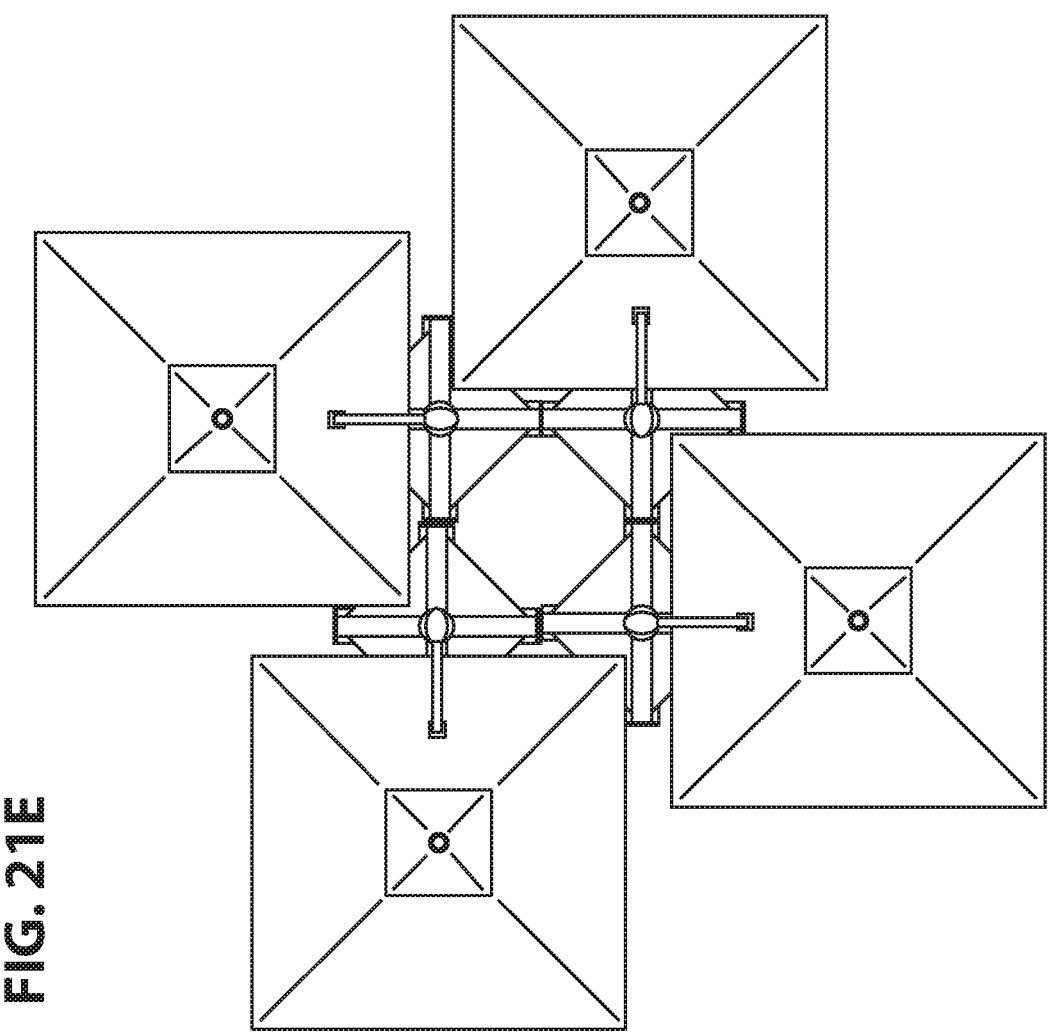
Figure 21F:
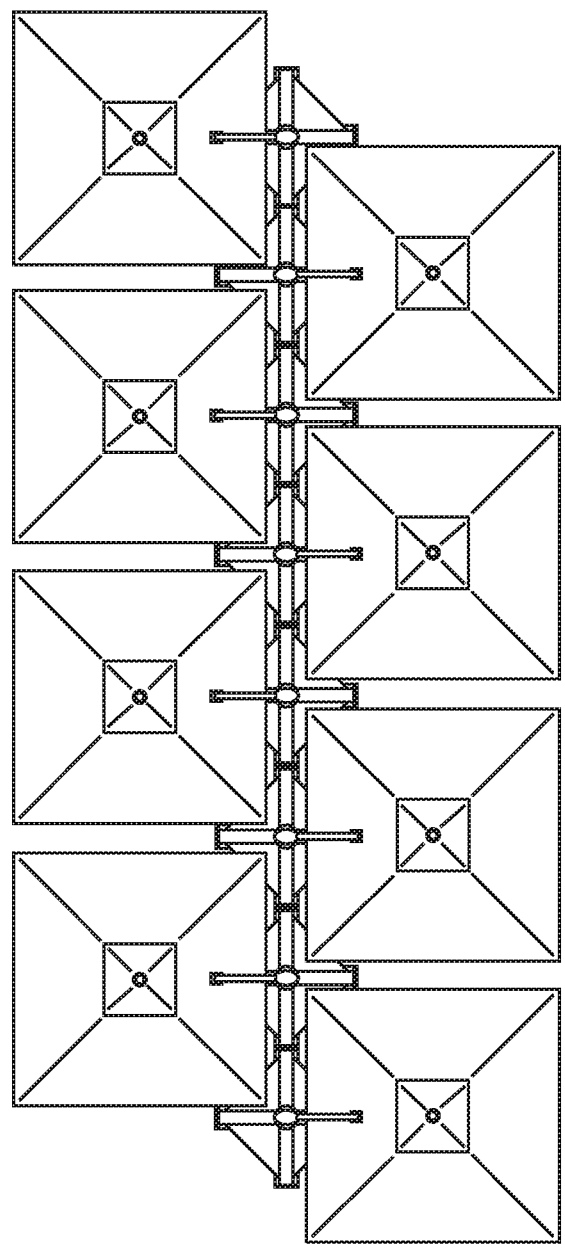
Figure 21G:
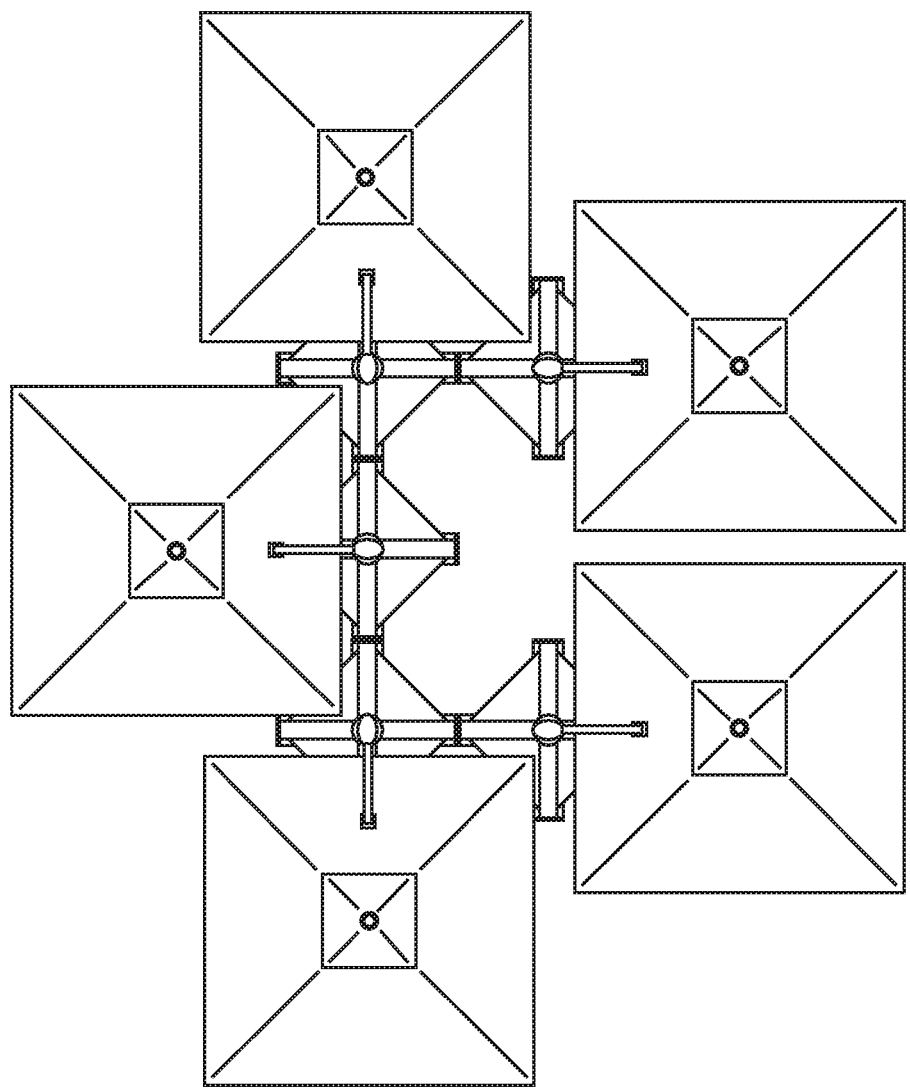

Therefore, the multi-angle multi-function umbrella:
  a) Can mount the multi-angle multi-function umbrella on first post-stabilizing foot 102 and second post-stabilizing foot 103,
    to stabilize the multi-angle multi-function umbrella from tipping over
    (see FIG. 2);
  b) Can mount the multi-angle multi-function umbrella on a fence,
    to provide shade and protection when a fence is accessible
    (see FIG. 18D);
  c) Can mount the multi-angle multi-function umbrella on a balcony,
    to provide shade and protection when a balcony is accessible
    (see FIG. 20F);
  d) Can mount the multi-angle multi-function umbrella on a bumper,
    to provide shade and protection when a bumper is accessible
    (see FIG. 18A);
  e) Can mount the multi-angle multi-function umbrella on a hitch,
    to provide shade and protection when a hitch is accessible
    (see FIG. 19C);
  f) Can mount the multi-angle multi-function umbrella on a tailgate,
    to provide shade and protection when a tailgate is accessible
    (see FIG. 18B); and
  g) Can mount the multi-angle multi-function umbrella on a table,
    to provide shade and protection when a table is accessible
    (see FIG. 18C).

11) It is another object of the new invention to provide a multi-angle multi-function umbrella, having
  four wedging plates 105.
  Therefore, the multi-angle multi-function umbrella:
    a) Can slidably hook wedging plates of other multi-angle multi-function water-collector wind blocker privacy-screen awning canopy space-saver umbrellas
      to secure four wedging plates 105 to the other space-saver umbrellas
      in the directions of arrows 141*a* and 141*b*,
      to provide various configuration options for additional shade and protection
      (see FIG. 21A, FIG. 21B, FIG. 21C, FIG. 21D, FIG. 21E, FIG. 21F, and FIG. 21G);
    b) Can slidably hook up to the two adjacent slats of a fence
      to secure four wedging plates 105 to the fence
      to prevent the multi-angle multi-function umbrella from moving or falling over
      (see FIG. 12); and
    c) Can slidably wedge between the two planks of a patio or deck
      to secure four wedging plates 105 to the patio or deck
      to prevent the multi-angle multi-function umbrella from moving or falling over
      (see FIG. 13 and FIG. 14).

12) It is an even further object of the new invention to provide a multi-angle multi-function umbrella, having
  central-canopy-rib-supporting arms 128.

Figure 9A:
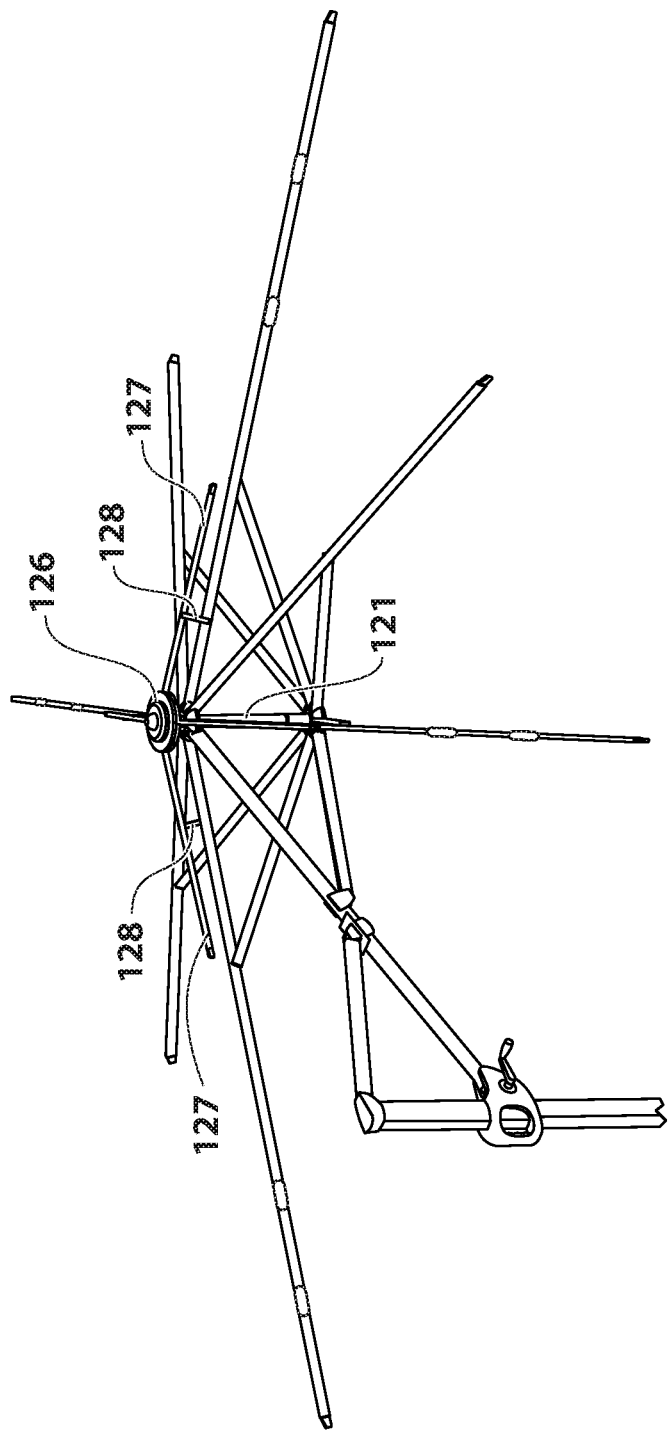
Figure 11A:
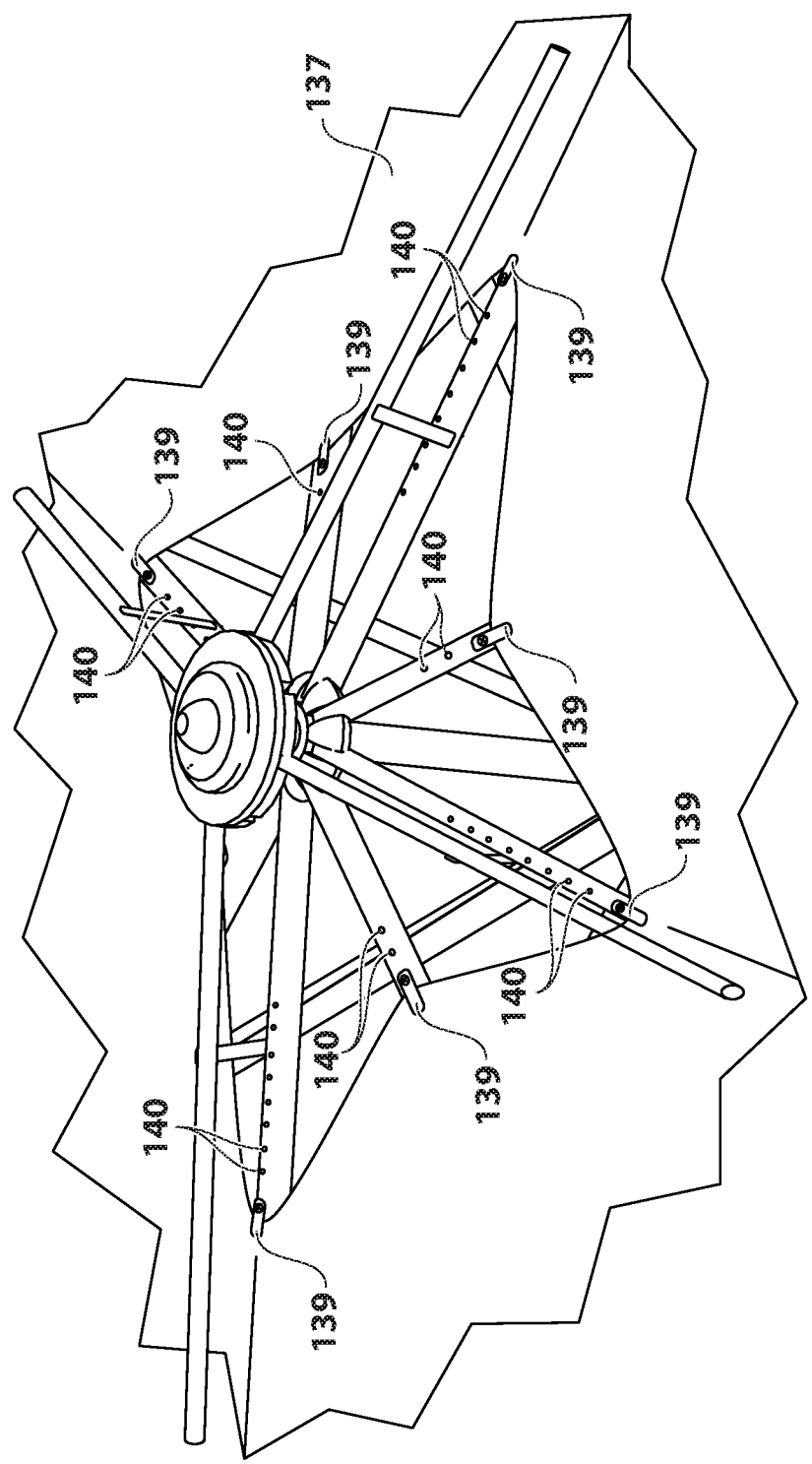
FIG. 11A and FIG. 11B illustrate sectional views of how to use the canopy-size-adjusting flaps and canopy-size-adjusting holes to adjust the size of the multi-angle multi-function umbrella.
Figure 11B:
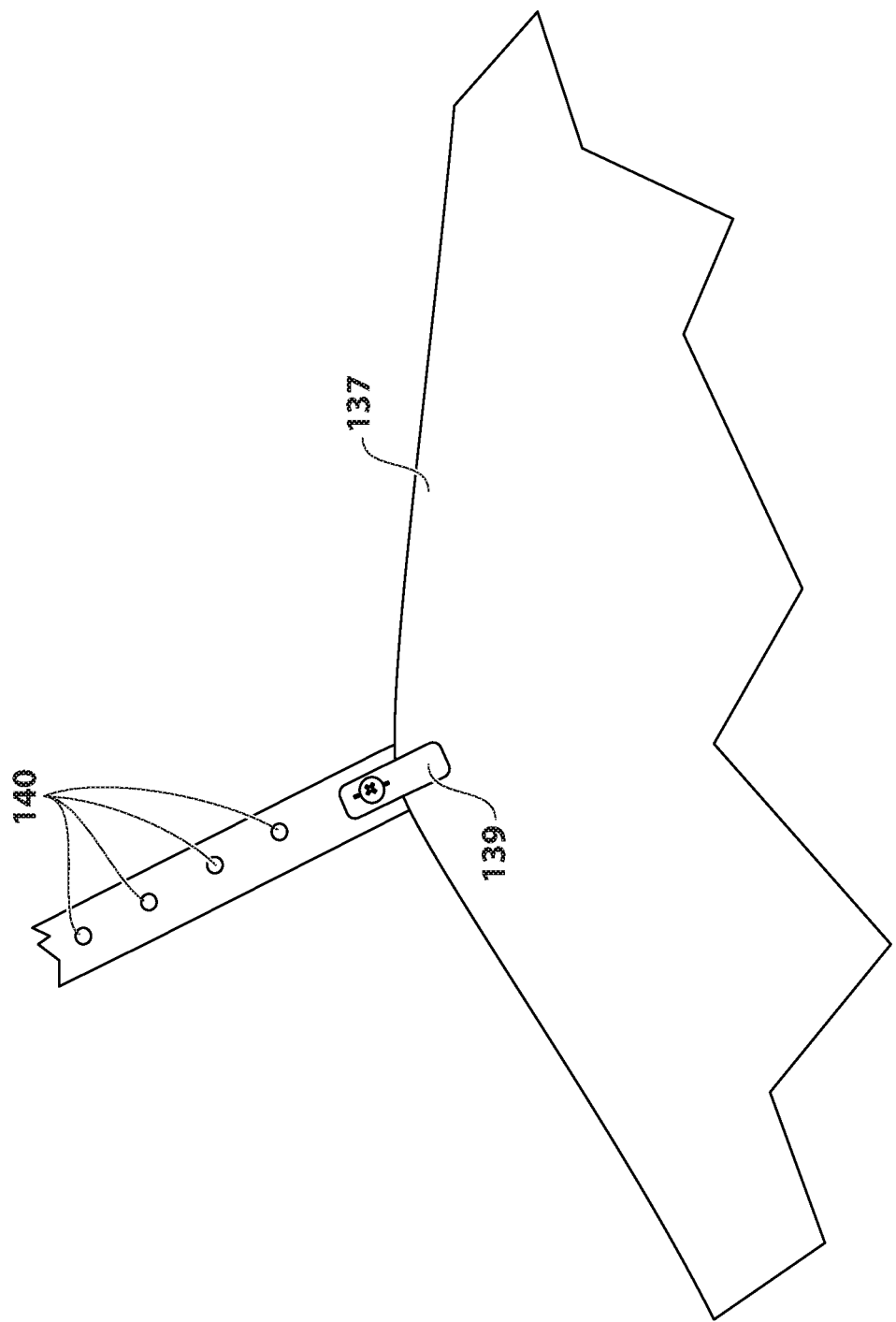
Figure 13:
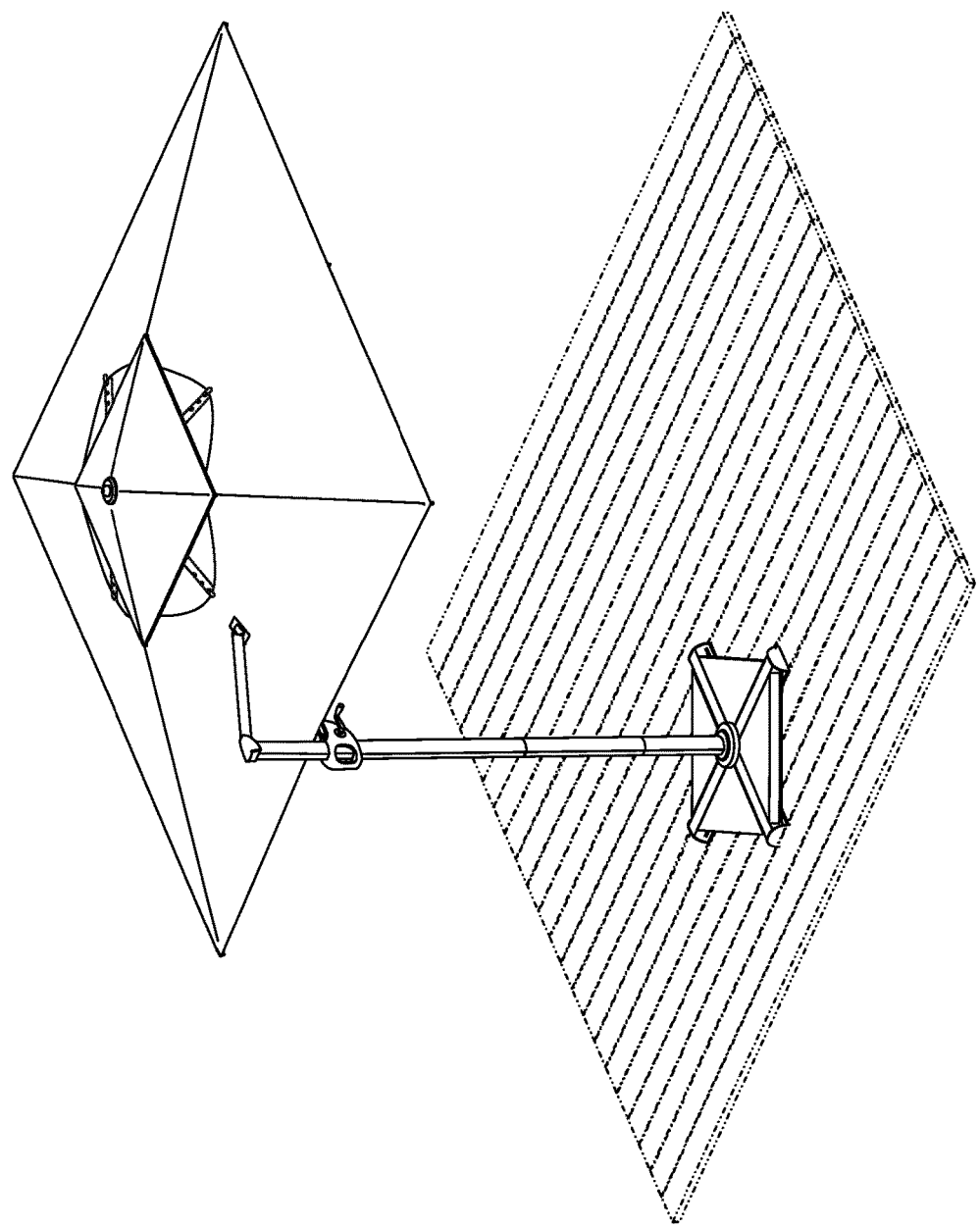
FIG. 13 and FIG. 14 illustrate how four wedging plates can be wedged between the planks of a patio or deck to lock multi-angle multi-function umbrella to the patio or deck.
Figure 14:
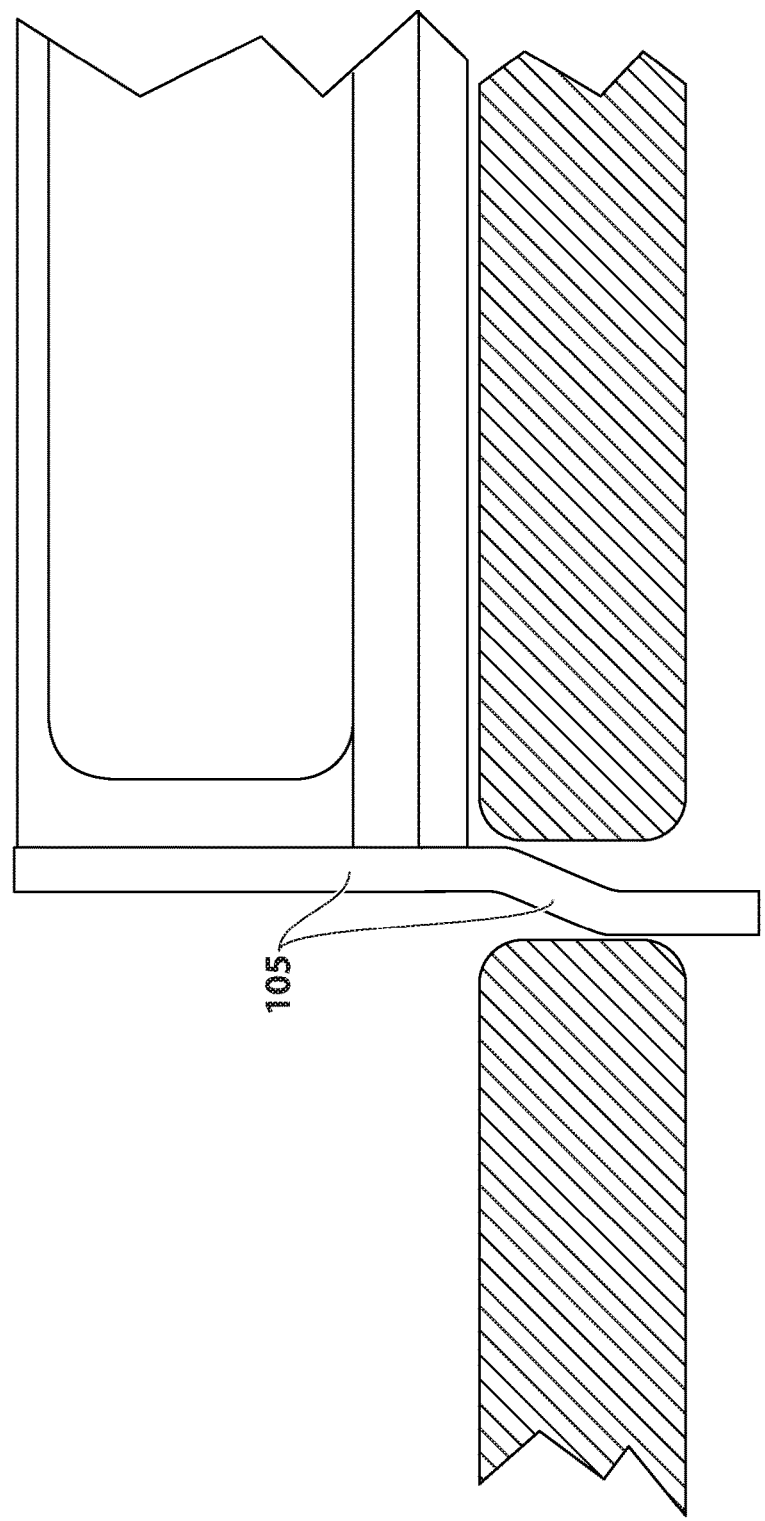
Figure 15:
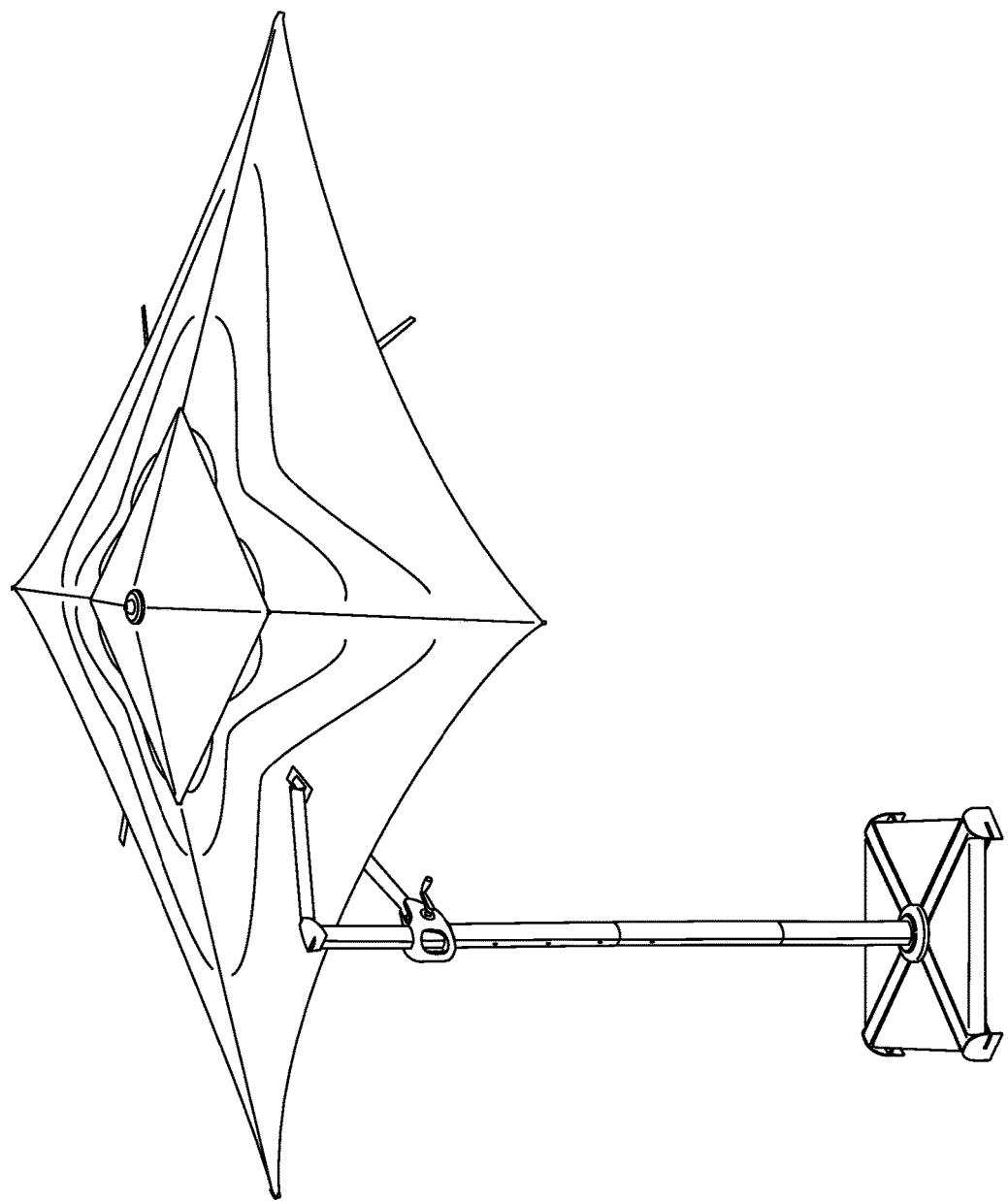
FIG. 15 illustrates a perspective view of how, by adjusting the canopy-size-adjusting flaps, and canopy-size-adjusting holes to create various sizes and configurations of the ring canopy.

Therefore, the multi-angle multi-function umbrella:
  a) Can support central-canopy-supporting ribs 127,
    to provide central canopy 129 structural support
    (see FIG. 9A and FIG. 9B);
  b) Can hingedly connect central-canopy-supporting ribs 127 and first ring-canopy-supporting ribs 132,
    to provide structural support
    (see FIG. 9A and FIG. 9B); and
  c) Can hingedly connect central-canopy-supporting ribs 127 and first ring-canopy-supporting ribs 132,
    to help make folding the multi-angle multi-function umbrella easier
    (see FIG. 9A and FIG. 9B).

13) It is still another object of the new invention to provide a multi-angle multi-function umbrella, having
  central canopy 129.
  Therefore, the multi-angle multi-function umbrella:
    a) Can function as a water collector
      to collect rain water when used upside down
      in the directions of arrows 142 and 143
      (see FIG. 16A);
    b) Can function as a wind blocker
      to block wind
      (see FIG. 20D);
    c) Can function as a privacy screen
      to provide privacy
      (see FIG. 20E);
    d) Can function as a awning
      to angledly block rain and sun beams
      (see FIG. 20A);
    e) Can function as a canopy
      to vertically block rain and sun beams
      (see FIG. 2011);
    f) Can function as a wind redirector
      to redirect wind in and out of canopy
      in the directions of arrows 144, 145, 146, 147, and 148
      (see FIG. 16B, FIG. 16C, and FIG. 16D); and
    g) Can function as a wind resistor
      to protect the canopy from blowing when corners are attached to ground with ropes and stakes
      in the direction of arrow 149
      (see FIG. 16D).

14) It is still further yet another object of the new invention to provide a multi-angle multi-function umbrella, having
  ring canopy 137.
  Therefore, the multi-angle multi-function umbrella:
    a) Can function as a water collector
      to collect rain water when used upside down
      in the directions of arrows 142 and 143
      (see FIG. 16A);
    b) Can function as a wind blocker
      to block wind
      (see FIG. 20D);
    c) Can function as a privacy screen
      to provide privacy
      (see FIG. 19F);
    d) Can function as an awning
      to angledly block rain and sun beams
      (see FIG. 20B);
    e) Can function as a canopy
      to vertically block rain and sun beams
      (see FIG. 20F);

f) Can function as a wind redirector
to redirect wind in and out of canopy
in the directions of arrows 144, 145, 146, 147, and 148
(see FIG. 16B, FIG. 16C, and FIG. 16D); and
g) Can function as a wind resistor
to protect the canopy from blowing when corners are attached to ground with ropes and stakes
in the direction of arrow 149
(see FIG. 16D).

15) It is even still further yet another object of the new invention to provide a multi-angle multi-function umbrella, having
canopy-size-adjusting flaps 139.
Therefore, the multi-angle multi-function umbrella:
Can adjustably be attached to first ring-canopy-supporting ribs 132, respectively
to adjust ring canopy 137 to multiple different sizes
(see FIG. 11A and FIG. 11B).

16) It is even further yet still another object of the new invention to provide a multi-angle multi-function umbrella, having
canopy-size-adjusting holes 140.
Therefore, the multi-angle multi-function umbrella:
Can screw together first ring-canopy-supporting ribs 132 and canopy-size-adjusting flaps 139
to adjust ring canopy 137 to multiple different sizes
(see FIG. 11A and FIG. 11B).

What is claimed is:

1. A multi-angle multi-function umbrella, comprising:
a first post-stabilizing foot;
a second post-stabilizing foot;
a mounting plate
for mounting on said first post-stabilizing foot and said second post-stabilizing foot
by being bolted on said first and said second post-stabilizing feet, or
for mounting on a fence
by being bolted on said fence, or
for mounting on a balcony
by being bolted on said balcony, or
for mounting on a bumper protection
by being bolted on said bumper, or
for mounting on a hitch
by being bolted on said hitch, or
for mounting on a tailgate
by being bolted on said tailgate, or
for mounting on a table
by being bolted on said table;
four base-stabilizing weights respectively
attached to said first post-stabilizing foot and said second post-stabilizing foot;
a lower post,
an upper post;
at least one inner core
for being attached to said mounting plate and inserted into and bolted to said lower post and said upper post, or
for allowing said lower post to be disassembled from said upper post to reduce the length and volume of shipping package of said umbrella in a shipping container to save money from shipping costs, or
for mounting said upper post on said lower post to give said umbrella more height, or
for mounting said upper post on a fence by being bolted to said upper post and being wedged into said fence, or
for mounting said upper post on a balcony by being bolted to said upper post and being wedged into said balcony, or
for mounting said upper post on a bumper by being bolted to said upper post and being wedged into said bumper, or
for mounting said upper post on a hitch by being bolted to said upper post and being wedged into said hitch, or
for mounting said upper post on a tailgate by being bolted to said upper post and being wedged into said tailgate, or
for mounting said upper post on a table by being bolted to said upper post and being wedged into said table, or
for mounting said upper post on a column by being bolted to said upper post and being wedged into said column, or
for mounting said upper post on a wall by being bolted to said upper post and being wedged into said wall;
a plurality of post-height-adjusting holes respectively drilled into said lower post, said upper post, and said at least one inner core;
a plurality of core-securing bolts
for respectively belted bolting through said lower post, said upper post, and said at least one inner core, or
for securing together said lower post, said upper post, said at least one inner core, or
for securing said at least one inner core to a fence, a balcony, a bumper, a hitch, a tailgate, a table, a column, or a wall;
a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;
a plurality of handle-locking post holes respectively drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and
said foldable multi-canopy-supporting arm;
a multi-canopy-hanging central tube;
a multi-canopy-deploying spool
sandwiched within said multi-canopy-supporting-arm intersector;
a multi-canopy-deploying crank
rotatably attached to said multi-canopy-deploying spool;
a multi-canopy-deploying rope
wound around said multi-canopy-deploying spool,
threaded through said multi-canopy-supporting-arm intersector, and
threaded through said multi-canopy-hanging central tube;

a central-canopy intersector
  attached to said multi-canopy-hanging central tube;
a plurality of central-canopy-supporting ribs respectively
  attached to said central-canopy intersector;
a plurality of central-canopy-rib-raising arms respectively
  pivotably attached to said central-canopy-supporting ribs;
a central canopy
  attached to said central-canopy-supporting ribs
  for functioning as a water collector to collect rain water when used upside down,
  for functioning as a Wind blocker to block wind,
  for functioning as a privacy screen to provide privacy,
  for functioning as an awning to angledly block rain and sun beams,
  for functioning as a canopy to vertically block rain and sun beams,
  for functioning as a wind redirector to redirect wind, and
  for functioning as a wind resistor;
a ring-canopy-rib intersector
  connected to said multi-canopy-hanging central tube;
a plurality of first ring-canopy-supporting ribs respectively
  pivotably connected to said ring-canopy-rib intersector and
  pivotably attached to said central-canopy-rib-raising arms;
a plurality of second ring-canopy-supporting ribs;
a plurality of third ring-canopy-supporting ribs;
a plurality of first conjoined-double-coil caps respectively
  slid on and pivotably connected to said first ring-canopy-supporting ribs and said second ring-canopy-supporting ribs
  for allowing said first ring-canopy-supporting ribs and said second ring-canopy-supporting ribs to be folded to reduce the length and volume of shipping package of said umbrella in a shipping container to save money from shipping costs,
  for connecting said first ring-canopy-supporting ribs to said second ring-canopy-supporting ribs to provide strength and structure to said umbrella, and
  for allowing said umbrella to be configured in multiple shapes;
a plurality of first conjoined-double-coil axles respectively
  riveted on said first conjoined-double-coil caps, said first ring-canopy-supporting ribs, and said second ring-canopy-supporting ribs
  for pivotably connecting said first conjoined-double-coil caps to said first ring-canopy-supporting ribs and said second ring-canopy-supporting ribs and
  for allowing said umbrella to be configured in multiple shapes;
a plurality of first conjoined-double-coil springs respectively
  springingly slid onto said first conjoined-double-coil axles
  for springingly locking said first ring-canopy-supporting ribs and said second ring canopy-supporting ribs, and
  for allowing said umbrella to be configured in multiple shapes;
a plurality of second conjoined-double-coil caps respectively
  slid on and pivotably connected to said second ring-canopy-supporting ribs and
said third ring-canopy-supporting ribs
  for allowing said second ring-canopy-supporting ribs and said third ring-canopy-supporting ribs to be folded to reduce the length and volume of shipping package of said umbrella in a shipping container to save money from shipping costs,
  for connecting said second ring-canopy-supporting ribs to said third ring-canopy-supporting ribs to provide strength and structure to said umbrella, and
  for allowing said umbrella to be configured in multiple shapes;
a plurality of second conjoined-double-coil axles respectively
  riveted on said second conjoined-double-coil caps, said second ring-canopy-supporting ribs, and said third ring-canopy-supporting ribs
  for pivotably connecting said second conjoined-double-coil caps to said second ring-canopy-supporting ribs and said third ring-canopy-supporting ribs and
  for allowing said umbrella to be configured in multiple shapes;
a plurality of second conjoined-double-coil springs respectively
  springingly slid onto said second conjoined-double-coil axles
  for springingly locking said second ring-canopy-supporting ribs and said third ring canopy-supporting ribs and
  for allowing said umbrella to be configured in multiple shapes;
a ring-canopy-arm intersector
  slidably attached to said multi-canopy-hanging central tube,
  said multi-canopy-deploying rope
  attached to said ring-canopy-arm intersector;
a plurality of ring-canopy-rib-raising arms respectively
  foldably attached to said ring-canopy-arm intersector;
a ring canopy
  attached to said first ring-canopy-supporting ribs and said second ring-canopy-supporting ribs
  for functioning as a water collector to collect rain water when used upside down,
  for functioning as a wind blocker to block wind,
  for functioning as a privacy screen to provide privacy,
  for functioning as an awning to angledly block rain and sun beams,
  for functioning as a canopy to vertically block rain and sun beams,
  for functioning as a wind redirector to redirect wind, and
  for functioning as a wind resistor;
four zipper pockets,
  said ring canopy having a plurality of corners and a plurality of inner edges,
  said four zipper pockets respectively sewn to said corners of said ring canopy;
a plurality of canopy-size-adjusting flaps respectively
  sewn to said inner edges of said ring canopy
  for adjustably being attached to said first ring-canopy-supporting ribs to adjust said ring canopy to multiple different sizes; and
a plurality of canopy-size-adjusting holes respectively
  drilled into said first ring-canopy-supporting ribs
  for attaching said canopy-size-adjusting flaps thereto to adjust said ring canopy to multiple different sizes.

2. The multi-angle multi-function umbrella of claim 1, further comprising
four wedging plates,
wherein
said four wedging plates respectively are welded to said first post-stabilizing foot and said second post-stabilizing foot,
wherein
said four wedging plates
each are formed into a semi-oval shape,
said wedging plates each have a recess and a bent lower portion disposed below said recess
for slidably fitting behind adjacent wedging plates,
for slidably hooking up to two adjacent fence slats, and
for slidably wedging between two patio or deck planks.

3. The multi-angle multi-function umbrella of claim 2, wherein
said four wedging plates
each are made of metallic material.

4. The multi-angle multi-function umbrella of claim 1, wherein
said at least one
inner core is
formed into an I shape.

5. The multi-angle multi-function umbrella of claim 1, wherein
said first and said second conjoined-double-coil caps each are
formed into a rectangular shape,
said first and said second conjoined-double-coil axles each are
formed into a cylindrical shape,
said first and said second conjoined-double-coil springs each are
formed into a double conjoined-coil-spring shape.

6. The multi-angle multi-function umbrella of claim 1, wherein
said first conjoined-double-coil caps each are
made of plastic material, metallic material, or plastic and metallic materials,
said first conjoined-double-coil axles each are
made of plastic material, metallic material, or plastic and metallic materials,
said first conjoined-double-coil springs each are
made of metallic material,
said second conjoined-double-coil caps each are
made of plastic material, metallic material, or plastic and metallic materials,
said second conjoined-double-coil axles each are
made of plastic material, metallic material, or plastic and metallic materials,
said second conjoined-double-coil springs each are
made of metallic material.

7. The multi-angle multi-function umbrella of claim 1, wherein
said mounting plate
is formed into a square shape.

8. The multi-angle multi-function umbrella of claim 1, wherein
said central-canopy-rib-raising arms each are
made of metallic material.

9. The multi-angle multi-function umbrella of claim 1, wherein
said multi-angle multi-function umbrella is
made of plastic material, metallic material, or plastic and metallic materials.

10. A multi-angle umbrella, comprising:
a first post-stabilizing foot;
a second post-stabilizing foot;
a mounting plate,
for mounting on said first post-stabilizing foot, said second post-stabilizing foot, a fence, a balcony, a bumper, a hitch, a tailgate, or a table by being bolted thereon;
four base-stabilizing weights respectively
attached to said first post-stabilizing foot and said second post-stabilizing foot;
a lower post,
an upper post;
at least one inner core
for being attached to said mounting plate and inserted into and bolted to said lower post and said upper post, or
for mounting said upper post on said lower post, or
for mounting said upper post on a fence, a balcony, a bumper, a hitch, a tailgate., or a table;
a plurality of post-height-adjusting holes respectively
drilled into said lower post, said upper post, and said at least one inner core;
a plurality of core-securing bolts
for respectively bolting through said lower post, said upper post, and
at least one inner core;
a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;
a plurality of handle-locking post holes respectively
drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and
said foldable multi-canopy-supporting arm;
a multi-canopy-hanging central tube;
a multi-canopy-deploying rope
threaded through said multi-canopy-supporting-arm intersector, and
threaded through said multi-canopy-hanging central tube;
a central-canopy intersector
attached to said multi-canopy-hanging central tube;
a plurality of central-canopy-supporting ribs respectively
attached to said central-canopy intersector;
a plurality of central-canopy-rib-raising arms respectively
pivotably attached to said central-canopy-supporting ribs;
a central canopy
attached to said central-canopy-supporting ribs;
a ring-canopy-rib intersector
connected to said multi-canopy-hanging central tube;
a plurality of first ring-canopy-supporting ribs respectively
pivotably connected to said ring-canopy-rib intersector and pivotably attached to said central-canopy-rib-raising arms;
a plurality of second ring-canopy-supporting ribs;
a plurality of third ring-canopy-supporting ribs;
a plurality of first conjoined-double-coil caps respectively
slid on and pivotably connected to said first ring-canopy-supporting ribs and said
second ring-canopy-supporting ribs;
a plurality of first conjoined-double-coil axles respectively
riveted on said first conjoined-double-coil caps, said first
ring-canopy-supporting ribs, and said second ring-canopy-supporting ribs;
a plurality of first conjoined-double-coil springs respectively
springingly slid onto said first conjoined-double-coil axles;
a plurality of second conjoined-double-coil caps respectively
slid on and pivotably connected to said second ring-canopy-supporting ribs and
said third ring-canopy-supporting ribs;
a plurality of second conjoined-double-coil axles respectively
riveted on said second conjoined-double-coil caps, said second
ring-canopy-supporting ribs, and said third ring-canopy-supporting ribs;
a plurality of second conjoined-double-coil springs respectively
springingly slid onto said second conjoined-double-coil axles;
a ring-canopy-arm intersector
slidably attached to said multi-canopy-hanging central tube,
said multi-canopy-deploying rope
attached to said ring-canopy-arm intersector;
a plurality of ring-canopy-rib-raising arms respectively
foldably attached to said ring-canopy-arm intersector;
a ring canopy
attached to said first ring-canopy-supporting ribs and
said second ring-canopy-supporting ribs;
four pockets,
said ring canopy having a plurality of corners and a plurality of inner edges,
said four pockets respectively sewn to said corners of said ring canopy;
a plurality of canopy-size-adjusting flaps respectively sewn to said inner edges of said ring canopy; and
a plurality of canopy-size-adjusting holes respectively drilled into said first ring-canopy-supporting ribs.

11. The multi-angle umbrella of claim 10,
further comprising
four wedging plates,
wherein
said four wedging plates respectively are welded
to said first post-stabilizing foot and said second post-stabilizing foot,
wherein
said four wedging plates
each are formed into a semi-oval shape,
said wedging plates each have a recess and a bent lower portion disposed below said recess
for slidably fitting behind adjacent wedging plates,
for slidably hooking up to two adjacent fence slats, and
for slidably wedging between two patio or deck planks.

12. The multi-angle umbrella of claim 11,
wherein
said four wedging plates
each are made of metallic material.

13. The multi-angle umbrella of claim 10,
wherein
said at least one inner core is
formed into an I shape.

14. The multi-angle umbrella of claim 10,
wherein
said first and said second conjoined-double-coil caps each are
formed into a rectangular shape,
said first and said second conjoined-double-coil axles each are
formed into a cylindrical shape,
said first and said second conjoined-double-coil springs each are
formed into a double-conjoined-coil-spring shape.

15. The multi-angle umbrella of claim 10,
wherein
said first conjoined-double-coil caps each are
made of plastic material, metallic material, or plastic and metallic materials,
said first conjoined-double-coil axles each are
made of plastic material, metallic material, or plastic and metallic materials,
said first conjoined-double-coil springs each are
made of metallic material,
said second conjoined-double-coil caps each are
made of plastic material, metallic material, or plastic and metallic materials,
said second conjoined-double-coil axles each are
made of plastic material, metallic material, or plastic and metallic materials,
said second conjoined-double-coil springs each are
made of metallic material.

16. The multi-angle umbrella of claim 10,
wherein
said bumper and hitch mounting plate is
formed into a square shape.

17. The multi-angle umbrella of claim 10,
wherein
said central-canopy-rib-raising arms each are
made of metallic material.

18. The multi-angle umbrella of claim 10,
wherein
said multi-angle umbrella is
made of plastic material, metallic material, or plastic and metallic materials.

19. A space-saver umbrella, comprising:
a first post-stabilizing foot;
a second post-stabilizing foot;
a mounting plate,
for mounting on said first post-stabilizing foot, said second post-stabilizing foot, a fence, a balcony, a bumper, a hitch, a tailgate, or a table by being bolted thereon;
a lower post,
said fence-balcony-bumper-and-hitch-mountable plate attached to said lower post;
an upper post;
at least one inner core
for being attached to said
mounting plate and inserted into and bolted to said lower post and said upper post;

a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;
a plurality of handle-locking post holes respectively
drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and
said foldable multi-canopy-supporting arm;
a multi-canopy-hanging central tube;
a multi-canopy-deploying rope
threaded through said multi-canopy-supporting-arm intersector, and
threaded through said multi-canopy-hanging central tube;
a central-canopy intersector
attached to said multi-canopy-hanging central tube;
a plurality of central-canopy-supporting ribs respectively
attached to said central-canopy intersector;
a plurality of central-canopy-rib-raising arms respectively
pivotably attached to said central-canopy-supporting ribs;
a central canopy
attached to said central-canopy-supporting ribs;
a ring-canopy-rib intersector
connected to said multi-canopy-hanging central tube;
a plurality of first ring-canopy-supporting ribs respectively
pivotably connected to said ring-canopy-rib intersector and
pivotably attached to said central-canopy-rib-raising arms;
a plurality of second ring-canopy-supporting ribs;
a plurality of third ring-canopy-supporting ribs;
a plurality of first conjoined-double-coil caps respectively
slid on and pivotably connected to said first ring-canopy-supporting ribs and said second ring-canopy-supporting ribs;
a plurality of first conjoined-double-coil axles respectively
riveted on said first conjoined-double-coil caps, said first ring-canopy-supporting ribs, and said second ring-canopy-supporting ribs;
a plurality of first conjoined-double-coil springs respectively
springingly slid onto said first conjoined-double-coil axles;
a plurality of second conjoined-double-coil caps respectively
slid on and pivotably connected to said second ring-canopy-supporting ribs and said third ring-canopy-supporting ribs;
a plurality of second conjoined-double-coil axles respectively
riveted on said second conjoined-double-coil caps, said second ring-canopy-supporting ribs, and said third ring-canopy-supporting ribs;
a plurality of second conjoined-double-coil springs respectively
springingly slid onto said second conjoined-double-coil axles;
a ring-canopy-arm intersector
slidably attached to said multi-canopy-hanging central tube,
said multi-canopy-deploying rope
attached to said ring-canopy-arm intersector;
a plurality of ring-canopy-rib-raising arms respectively
foldably attached to said ring-canopy-arm intersector;
a ring canopy
attached to said first ring-canopy-supporting ribs and said second ring-canopy-supporting ribs;
four pockets,
said ring canopy having a plurality of corners and a plurality of inner edges,
said four pockets respectively sewn to said corners of said ring canopy;
a plurality of canopy-size-adjusting flaps respectively
sewn to said inner edges of said ring canopy; and
a plurality of canopy-size-adjusting holes respectively
drilled into said first ring-canopy-supporting ribs.
20. The space-saver umbrella of claim 19,
further comprising
four wedging plates,
wherein
said four wedging plates respectively are welded to said first post-stabilizing foot and said second post-stabilizing foot,
wherein
said four wedging plates
each are formed into a semi-oval shape,
said wedging plates each have a recess and a bent lower portion disposed below said recess
for slidably fitting behind adjacent wedging plates,
for slidably hooking up to two adjacent fence slats, and
for slidably wedging between two patio or deck planks.

* * * * *